US012563647B2

(12) United States Patent
King et al.

(10) Patent No.: US 12,563,647 B2
(45) Date of Patent: Feb. 24, 2026

(54) FOOD PROCESSING MACHINES WITH MICROWAVE HEATING SYSTEMS AND MICROWAVE SUPPRESSION SYSTEMS

(71) Applicant: Alkar-RapidPak, Inc., Lodi, WI (US)

(72) Inventors: Stephen Michael King, Cottage Grove, WI (US); Thomas John Hansel, Madison, WI (US); Graeme Bunce, Goffstown, NH (US); Thomas Paulson, Pardeeville, WI (US); Thomas Victor Sonntag, Lodi, WI (US); Craig R. Bonneville, Black Earth, WI (US); Easten Lovelace, Pasco, WA (US); Shane Patrick Grady, Verona, WI (US); Paul Christopher Buschkopf, Sun Prairie, WI (US); Dalton Brian McGinness, Merrimack, NH (US)

(73) Assignee: Alkar-RapidPak, Inc., Lodi, WI (US)

( * ) Notice: Subject to any disclaimer, the term of this patent is extended or adjusted under 35 U.S.C. 154(b) by 971 days.

(21) Appl. No.: 17/511,845

(22) Filed: Oct. 27, 2021

(65) Prior Publication Data

US 2022/0346198 A1 Oct. 27, 2022

Related U.S. Application Data

(60) Provisional application No. 63/238,905, filed on Aug. 31, 2021, provisional application No. 63/197,003,
(Continued)

(51) Int. Cl.
*H05B 6/64* (2006.01)
*H05B 6/70* (2006.01)
(Continued)

(52) U.S. Cl.
CPC ......... *H05B 6/6473* (2013.01); *H05B 6/6435* (2013.01); *H05B 6/704* (2013.01);
(Continued)

(58) Field of Classification Search
CPC ............ H05B 2206/044; H05B 6/6435; H05B 6/6473; H05B 6/704; H05B 6/707;
(Continued)

(56) References Cited

U.S. PATENT DOCUMENTS

| | | | |
|---|---|---|---|
| 2,704,802 | A | 3/1955 | Blass |
| 3,263,052 | A | 7/1966 | Jeppson |

(Continued)

FOREIGN PATENT DOCUMENTS

| | | |
|---|---|---|
| AU | 7186187 | 10/1987 |
| AU | 7186187 A | 10/1987 |

(Continued)

OTHER PUBLICATIONS

PCT/US2018/064447, International Search Report and Written Opinion, dated Mar. 1, 2019.

(Continued)

*Primary Examiner* — Quang T Van
(74) *Attorney, Agent, or Firm* — Andrus Intellectual Property Law, LLP

(57) ABSTRACT

A food processing machine for processing a food product includes a processing module having a housing with a sidewall, opposing end walls, and a chamber between the end walls and a conveyor extending through the end walls and the chamber and configured to convey the food product through the chamber. A microwave generating device is coupled to the sidewall and configured to generate microwave energy. A waveguide assembly is configured to receive the microwave energy, direct the microwave energy along a waveguide axis, and subsequently direct the microwave
(Continued)

energy in a transverse direction that is transverse to the vertical direction through the sidewall and into the chamber such that the microwave energy heats the food products.

18 Claims, 35 Drawing Sheets

Related U.S. Application Data filed on Jun. 4, 2021, provisional application No. 63/179,796, filed on Apr. 26, 2021, provisional application No. 63/179,793, filed on Apr. 26, 2021.

(51) Int. Cl.
*H05B 6/74* (2006.01)
*H05B 6/78* (2006.01)
*H05B 6/76* (2006.01)

(52) U.S. Cl.
CPC ............... *H05B 6/707* (2013.01); *H05B 6/74* (2013.01); *H05B 6/782* (2013.01); *H05B 6/76* (2013.01)

(58) Field of Classification Search
CPC . H05B 6/74; H05B 6/78; H05B 6/782; H05B 6/64; H05B 6/6402; H05B 6/647; H05B 6/701; A21B 1/24; A21B 1/245; A21B 1/26; A21B 1/43; A21B 1/48; A21B 2/00
USPC ....... 219/749, 756, 757, 759, 752, 754, 698, 219/699, 680
See application file for complete search history.

(56) References Cited

U.S. PATENT DOCUMENTS 3,300,615 A 1/1967 Smith
3,365,562 A 1/1968 Jeppson
3,430,022 A 2/1969 Cougoule
3,586,821 A 6/1971 Buob
3,665,141 A 5/1972 Schiffmann
3,704,523 A 12/1972 Guerga
3,767,884 A 10/1973 Osepchuk
3,772,491 A 11/1973 Gerling
3,857,009 A 12/1974 Macmaster
3,858,022 A * 12/1974 Smith ...................... H05B 6/76 219/699
3,909,574 A * 9/1975 Muller ..................... H05B 6/76 219/699
4,045,638 A 8/1977 Chiang
4,176,267 A 11/1979 Rueggeberg
4,182,946 A 1/1980 Bernard
4,336,434 A 6/1982 Miller
4,358,653 A 11/1982 Weiss
4,409,453 A 10/1983 Smith
4,458,126 A 7/1984 Dills
4,488,027 A 12/1984 Dudley
4,492,839 A 1/1985 Smith
4,508,947 A 4/1985 Eke
4,533,809 A 8/1985 Eke
4,570,045 A 2/1986 Jeppson
4,591,683 A 5/1986 Eke
4,598,689 A 7/1986 Eke
4,610,886 A 9/1986 Buller-Colthurst
4,647,746 A 3/1987 Eke
4,653,461 A 3/1987 Eke
4,661,670 A 4/1987 Eke
4,679,542 A 7/1987 Smith
4,691,088 A 9/1987 Eke
4,771,152 A 9/1988 Eke
4,812,606 A 3/1989 Eke
4,816,632 A 3/1989 Claesson
4,831,227 A 5/1989 Eke
4,874,914 A 10/1989 Eke
5,089,679 A 2/1992 Eke
5,160,819 A 11/1992 Ball
5,302,793 A 4/1994 Eke
5,434,391 A 7/1995 Eke
5,457,303 A 10/1995 Shute
5,512,312 A 4/1996 Forney
5,742,032 A 4/1998 Eke
5,945,022 A 8/1999 Volpe
5,958,278 A 9/1999 Engebritson
6,034,362 A 3/2000 Alton
6,153,868 A 11/2000 Marzat
6,233,841 B1 5/2001 Beach
6,242,726 B1 6/2001 Harris
6,274,858 B1 8/2001 Alton
6,365,885 B1 4/2002 Roy
6,452,142 B2 9/2002 Eke
6,604,452 B2 8/2003 Hanson
6,635,139 B2 10/2003 Bohn
6,768,089 B2 7/2004 Minobe
6,781,102 B1 8/2004 Proffitt
6,909,077 B2 6/2005 Eke
6,982,401 B2 1/2006 Hu
7,012,228 B1 3/2006 Eke
7,030,347 B2 4/2006 Lee
7,227,109 B2 6/2007 Eke
7,432,483 B2 10/2008 Wilson
7,507,938 B2 3/2009 McFadden
8,076,876 B2 12/2011 Lundell
8,101,893 B2 1/2012 Bogdan
8,893,705 B2 11/2014 Mcfadden
9,204,501 B1 12/2015 Cashman
9,585,203 B2 2/2017 Sadahira
9,622,298 B2 * 4/2017 Kimrey, Jr. ............... A61L 2/04
10,143,205 B2 12/2018 Buller-Colthurst
10,448,650 B2 10/2019 Van De Rijt
10,680,335 B2 6/2020 Bunce
11,291,210 B2 4/2022 Van De Rijt
11,412,584 B2 * 8/2022 Eke ...................... H05B 6/6476
11,751,296 B2 9/2023 Eke
2006/0081620 A1 4/2006 Eke
2006/0101755 A1 5/2006 Harris
2006/0124635 A1 6/2006 Risman
2007/0023413 A1 2/2007 Wilson
2007/0068939 A1 3/2007 Harris
2007/0137633 A1 6/2007 McFadden
2007/0194011 A1 8/2007 McFadden
2008/0190916 A1 8/2008 Beausse
2008/0202350 A1 8/2008 Maki
2012/0199580 A1 8/2012 Zbat
2013/0071527 A1 3/2013 Pesce
2013/0240510 A1 9/2013 Kimrey, Jr.
2013/0320002 A1 12/2013 Miller
2014/0103031 A1 4/2014 Peelamedu
2015/0136758 A1 5/2015 Yoshino
2015/0215996 A1 7/2015 Yoshida
2019/0182911 A1 6/2019 Eke
2022/0346198 A1 10/2022 King
2022/0369433 A1 11/2022 Eke et al.

FOREIGN PATENT DOCUMENTS

CA 1199978 1/1986
CA 1199978 A 1/1986
CN 113015280 A 6/2021
EP 0142958 5/1985
EP 0142958 A2 5/1985
EP 0174732 3/1986
EP 0174732 A1 3/1986
EP 0243025 10/1987
EP 0243025 A2 10/1987
EP 0592255 4/1994
EP 0592255 B1 1/1998
EP 1515591 3/2005
EP 1515591 A1 3/2005
EP 2335483 6/2011
EP 2335483 A1 6/2011
EP 4084578 A1 11/2022
EP 3720284 B1 10/2023
GB 1376744 12/1974

(56) References Cited

FOREIGN PATENT DOCUMENTS

| | | | |
|---|---|---|---|
| GB | 1376744 | A | 12/1974 |
| GB | 2143707 | | 2/1985 |
| GB | 2143707 | A | 2/1985 |
| GB | 2171580 | | 8/1986 |
| GB | 2171580 | A | 8/1986 |
| JP | 2003125745 | | 5/2003 |
| JP | 2003125745 | A | 5/2003 |
| JP | 3960612 | | 8/2007 |
| JP | 3960612 | B2 | 8/2007 |
| WO | 2014195450 | A1 | 12/2014 |
| WO | 2019113429 | A1 | 6/2019 |
| WO | 2019224391 | A1 | 11/2019 |
| WO | 2019224392 | A1 | 11/2019 |

OTHER PUBLICATIONS

EP 18885985.4, European Search Report and Opinion dated Sep. 22, 2021, 7 pages.

EP 21205674 Search Report and Opinion dated Mar. 22, 2022, 8 pages.

"H20 DMC303STD Operation and Maintenance Manual for High Temparature Applications" accessed from www.h2oop.com on Oct. 24, 2024.

Eke, Kenneth I., "Single Feed Multi-Magnetron Launch System," IPI'S 28 Microwave Power Symposium, Jun. 2014.

European Search Report in European Patent Application No. 18885985.4, mailed Sep. 22, 2021.

European Search Report in European Patent Application No. 21205674, mailed Mar. 22, 2022.

Examination Report in Canadian Patent Application No. 3,137,004, mailed Dec. 20, 2023.

International Search Report and Written Opinion in International Patent Application No. PCT/US2018/064447, mailed Mar. 1, 2019.

International Search Report and Written Opinion in corresponding International Patent Application No. PCT/US24/28356, mailed Oct. 25, 2024.

Tinga, Wayne R., et al., "Combination Microwave Ovens: An Innovative Design Strategy," Journal of Microwave Power and Electromagnetic Energy, 46 (4).

TURCK Inc. "BI5 S18-AP6X-H1141/D58/3D Inductive Sensor" Nov. 7, 2023.

Vollmen, Michael, "Physics of The Microwave Oven," Physics Education, 39 (1), Jan. 2004, pp. 74-81.

* cited by examiner

FOOD PROCESSING MACHINES WITH MICROWAVE HEATING SYSTEMS AND MICROWAVE SUPPRESSION SYSTEMS

CROSS-REFERENCE TO RELATED APPLICATIONS

The present disclosure is based on and claims priority to: U.S. Provisional Patent Application No. 63/179,793 filed Apr. 26, 2021; U.S. Provisional Patent Application No. 63/179,796 filed Apr. 26, 2021; U.S. Provisional Patent Application No. 63/197,003 filed Jun. 4, 2021; and U.S. Provisional Patent Application No. 63/238,905 filed Aug. 31, 2021; the disclosures of which are incorporated herein by reference in their entireties.

FIELD

The present disclosure relates to food processing machines, and specifically to ovens that process food products with microwave energy.

BACKGROUND

The following U.S. patent Application Publication is incorporated herein by reference in its entirety.

U.S. Patent Application Publication No. 2019/0182911 discloses a food processing machine for processing a food product. The machine includes a housing defining a cavity, a conveyor with a belt comprising metal for conveying the food product through the cavity in a longitudinal direction, and a convection heating system for heating air in the cavity such that heated air heats the food product as the food product is conveyed through the cavity. A microwave launch box system is configured to emit microwave energy into the cavity in a lateral direction transverse to the longitudinal direction to thereby further heat the food product as the food product is conveyed through the cavity.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is coupled to the sidewall and configured to generate microwave energy, and a head waveguide is configured to receive the microwave energy from the microwave generating device and direct the microwave energy in a vertical direction along a waveguide axis. A waveguide assembly is configured to receive the microwave energy from the head waveguide, direct the microwave energy along the waveguide axis, and subsequently direct the microwave energy in a transverse direction that is transverse to the vertical direction through the sidewall and into the chamber such that the microwave energy heats the food products.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is configured to generate microwave energy, and a waveguide assembly is configured to direct the microwave energy through the sidewall and into the chamber such that the microwave energy heats the food products. The waveguide assembly includes a rectangular waveguide; a mode converter downstream from the rectangular waveguide and configured to convert the mode of the microwave energy; a circular waveguide downstream from the mode converter, the circular waveguide having one or more tuning blocks configured to change the polarization of the microwave energy; and a bent waveguide downstream from the circular waveguide and configured to direct the microwave energy toward the sidewall and the chamber, wherein an end of the bent waveguide is coupled to the sidewall.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is configured to generate microwave energy, and a waveguide assembly is configured to direct the microwave energy through the sidewall and into the chamber such that the microwave energy heats the food products. The waveguide assembly includes a bent waveguide that directs the microwave energy toward the sidewall and the chamber and a cap covering an end of the bent waveguide. The cap is configured to prevent moisture and debris in the chamber from entering the waveguide assembly and the cap is further configured to maintain the polarization of the microwave energy passing therethrough.

In certain examples, a food processing machine for processing a food product includes a processing module having a housing with opposing end walls and a chamber between the end walls and a conveyor extending through the end walls and the chamber and configured to convey the food product through the chamber. A microwave generating device is configured to generate microwave energy and a waveguide assembly is configured to direct the microwave energy through the sidewall and into the chamber such that the microwave energy heats the food products. A suppression tunnel is configured to absorb microwave energy passing through one of the end walls and thereby reduce leakage of microwave energy from the food processing machine. The suppression tunnel includes a passageway that extends in a direction of the conveyance of the conveyor such that the conveyor extends through the passageway and the food products are conveyed through the passageway and a plurality of cross pipes each extending transverse to the direction of the conveyance and are positioned vertically above the conveyor. A pump is configured to convey coolant through the cross pipes such that the coolant absorbs microwave energy passing into the cross pipes.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
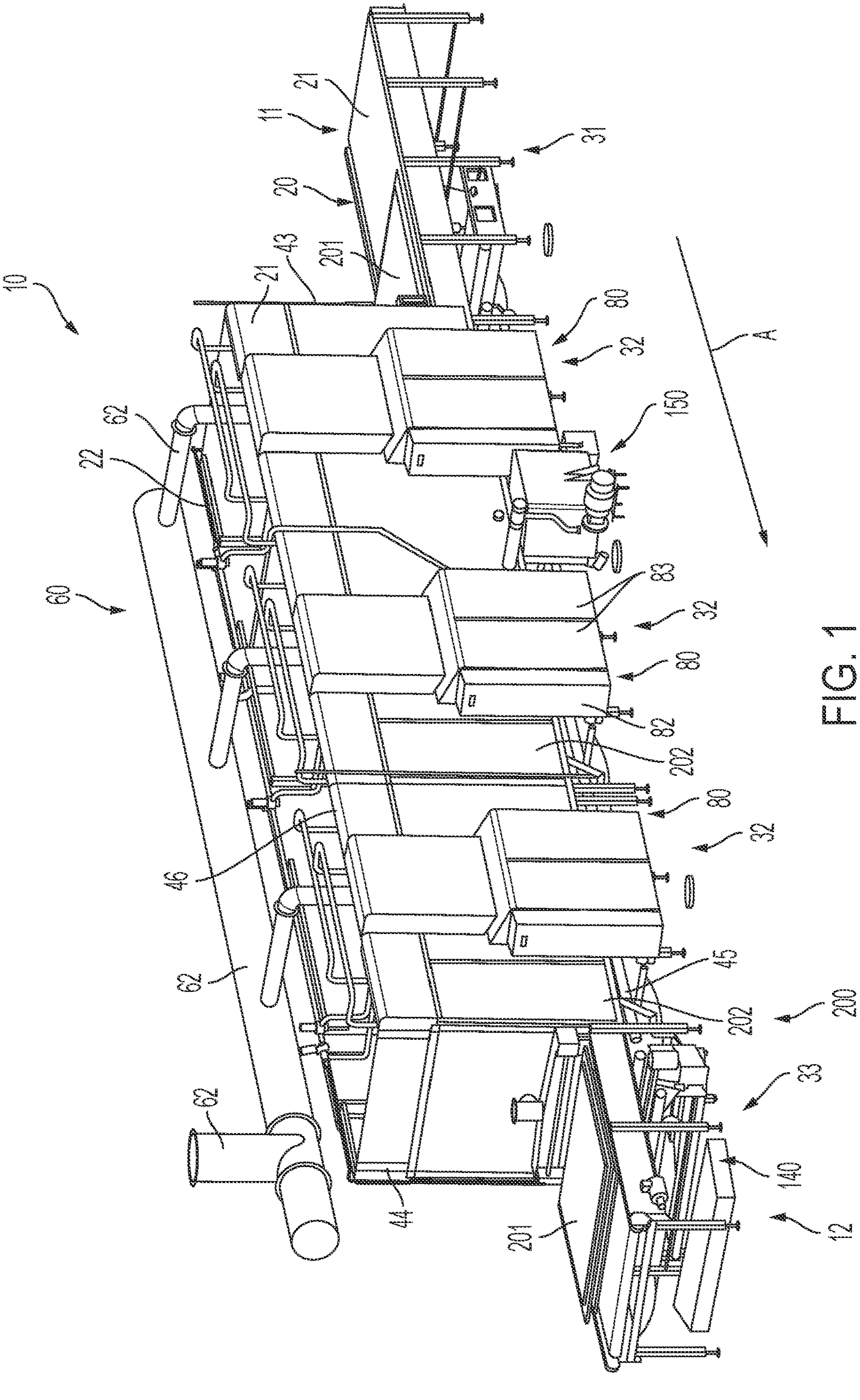
FIG. 1 is a perspective view of an example oven of the present disclosure.
Figure 2:
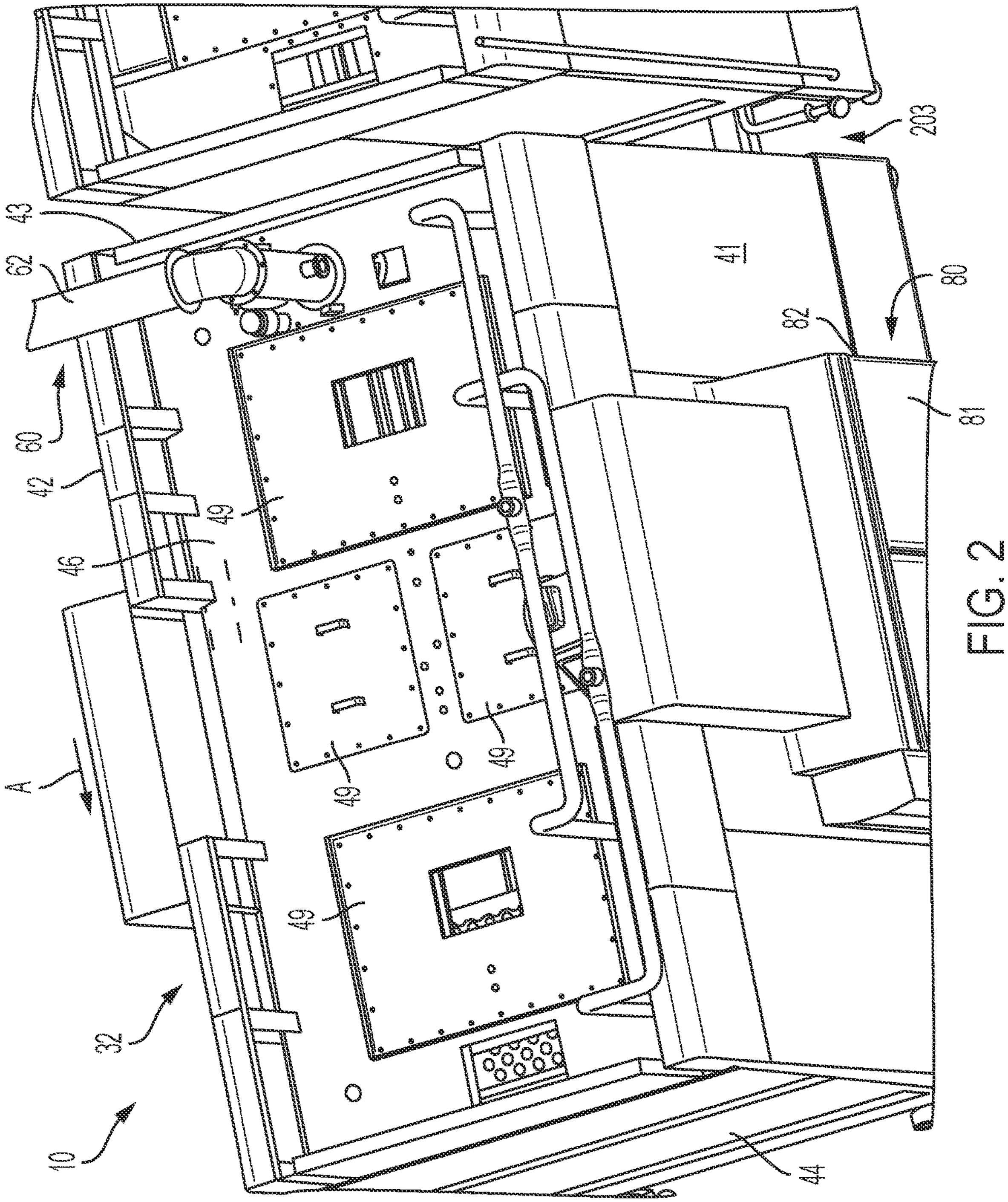
FIG. 2 is another perspective view of the oven of FIG. 1.

FIGS. 1-2 depicts an example food processing machine, e.g., oven 10, according to the present disclosure. The oven 10 has an upstream first end 11 and an opposite downstream second end 12. The oven 10 includes one or more modules (described further herein below) positioned between the ends 11, 12. Generally, a conveyor 20 extends between the ends 11, 12 and conveys food products (not depicted) from the first end 11 through various modules and to the second end 12. The direction the conveyor 20 conveys the food products is depicted by arrow A as the direction of conveyance. In one example, the conveyor 20 is an endless belt conveyor with a belt 21 on which the food products are placed. The belt 21 can be formed with metallic materials. Note that in other examples the conveyor 20 could convey other devices, e.g., chain, plates, hooks, troughs, non-metallic belts, through the oven 10.

Figure 6:
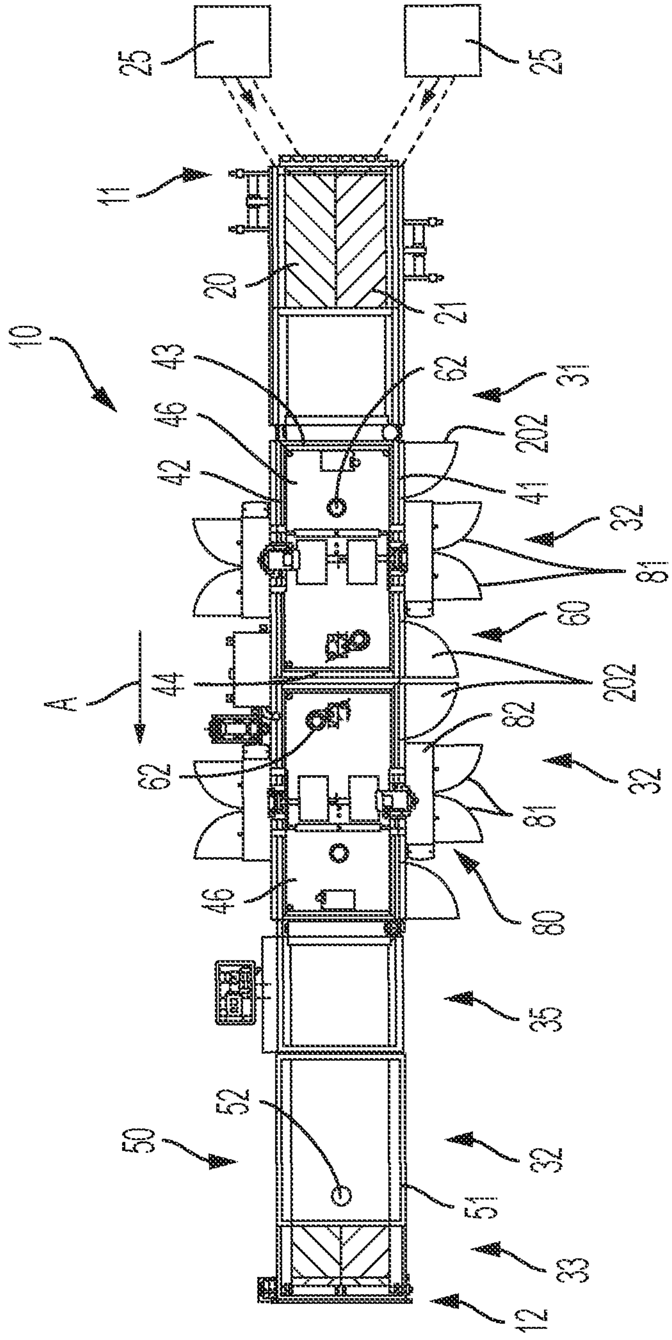
FIG. 6 is a top-down plan view of the oven of FIG. 5.

The oven 10 includes (stated in order from the first end 11 to the second end 12) an infeed module 31, one or more processing modules 32, and an outfeed module 33. Generally, the infeed module 31 receives food products from upstream infeed equipment or machines 25 (see FIG. 6). The food products are received onto the belt 21 and conveyed downstream by the conveyor 20 to other downstream modules 32, 33. The processing modules 32 process (e.g., heat, cook, sear, cool) the food products as the conveyor 20 conveys the food products through the processing modules 32. The outfeed module 33 dispenses the processed food products to downstream equipment or machines (not depicted) that may package the food products for shipping or further process the food products. Note that in other example ovens the infeed module 31 and/or the outfeed module 33 may be excluded such that the processing module 32 directly receives the food products therein and/or the processing module 32 directly dispenses the food products to other downstream machines, respectively.

Figure 3:
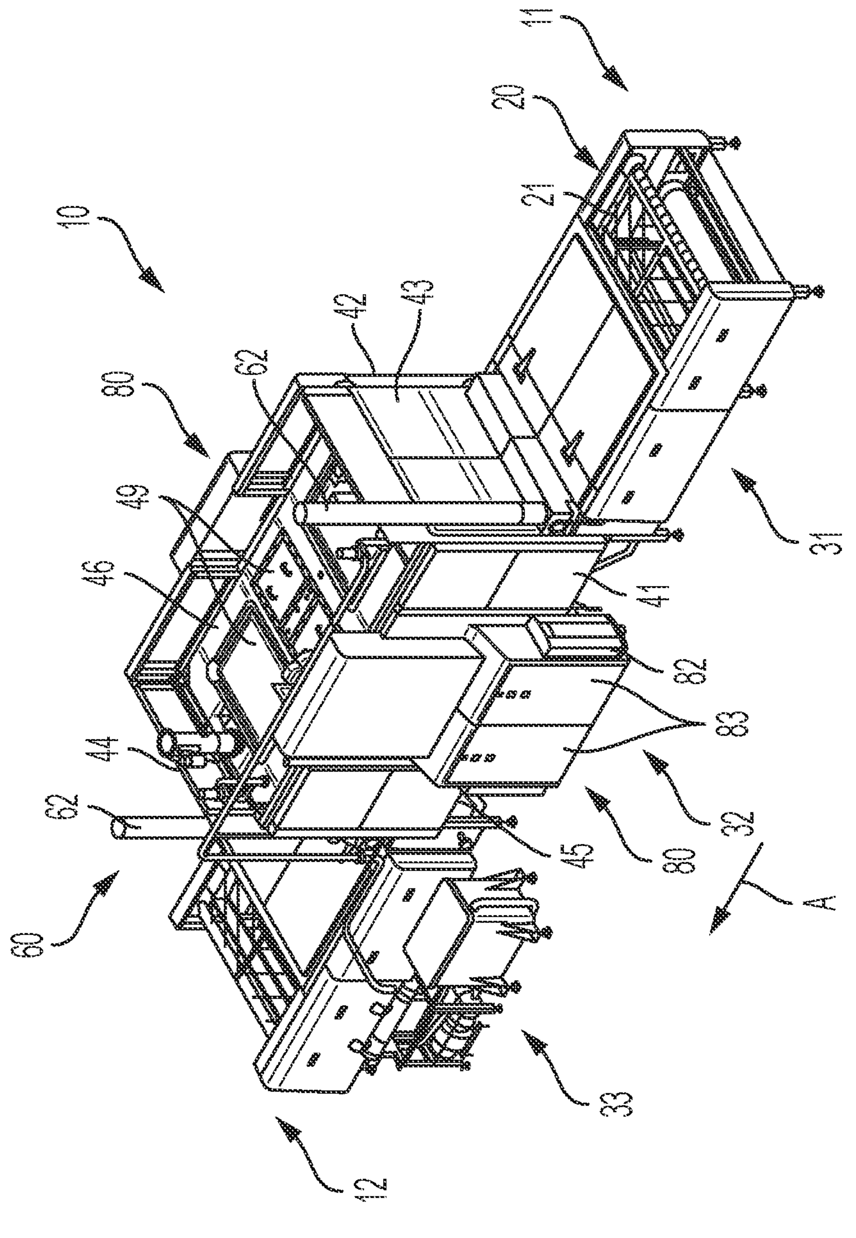
FIG. 3 is a perspective view of another example oven of the present disclosure.
Figure 4:
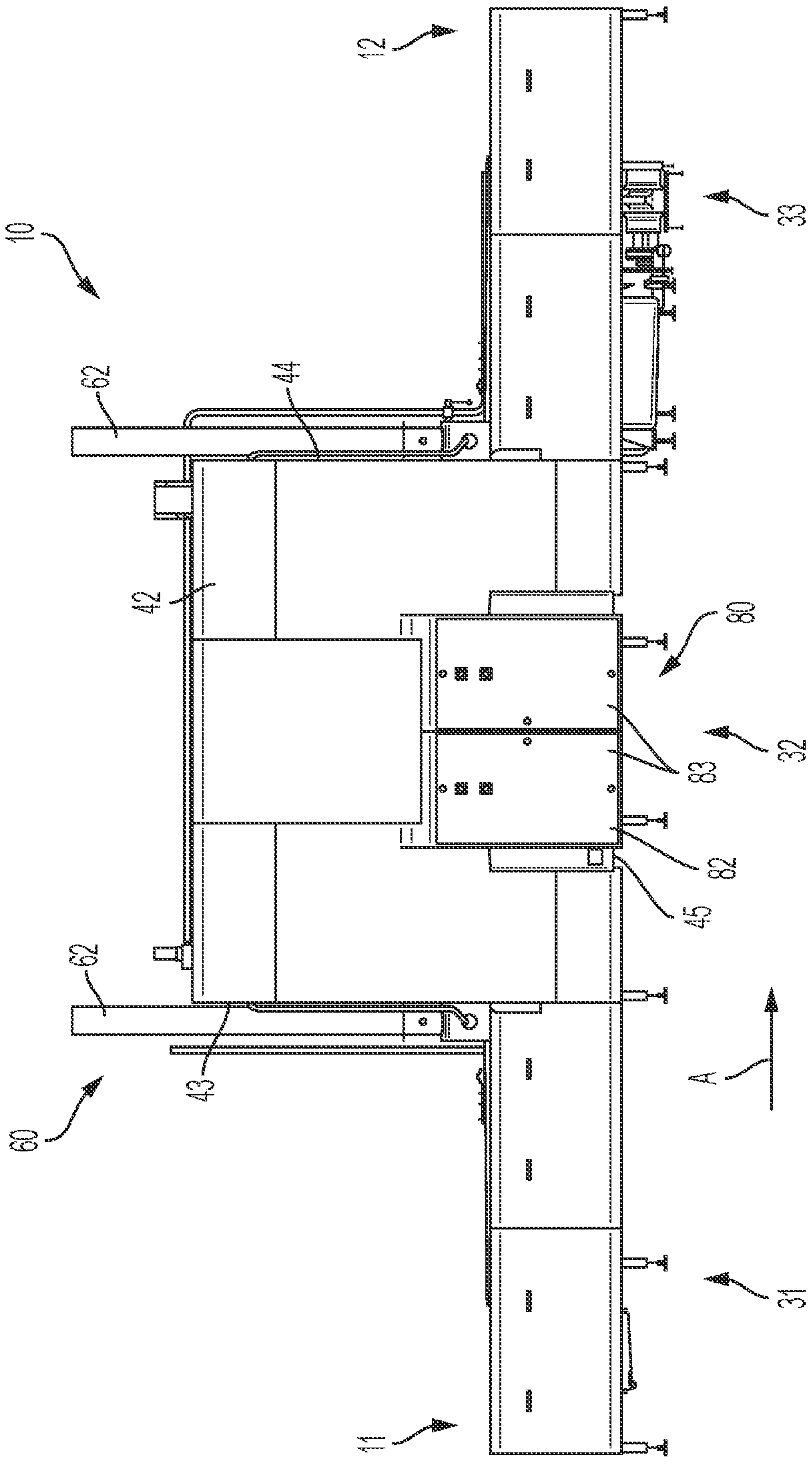
FIG. 4 is a side view of the oven depicted in FIG. 3.
Figure 5:
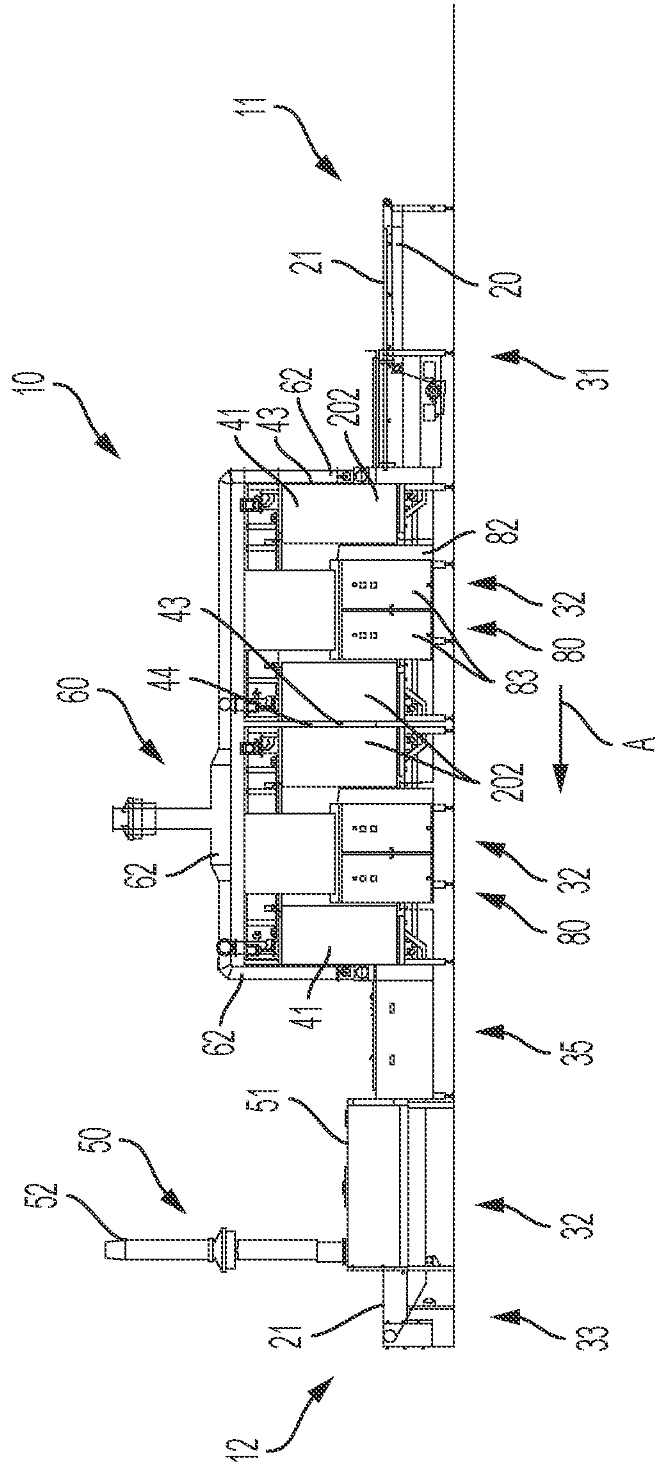
FIG. 5 is a side view of another example oven of the present disclosure.

As noted above, the processing modules 32 are for processing food products as the food products are conveyed therethrough. The oven 10 can include any number of processing modules 32, and the oven 10 depicted in FIG. 1 includes three processing modules 32. Note that the oven 10 depicted in FIGS. 3-4 includes one processing module 32, and the oven 10 depicted in FIGS. 5-6 includes two processing modules 32.

The number of processing modules 32 included in the oven 10 can be based on the recipe for processing the food products. For example, if the oven 10 will be processing food products that require only a short amount of cooking time via exposure to heated air and/or microwave energy (as will be described hereinbelow), the oven 10 may include only one or two processing modules 32. However, if the oven 10 will be processing food products that require a long cooking time and/or the recipe calls for the food products to be processed by other systems in addition to heating, the oven 10 may include seven or eight processing modules 32. The processing modules 32 can be configured to identically process the food product within each processing module 32 (e.g., each processing module 32 heats the air within the processing module to the same temperature to thereby cook the food products). Alternatively, each processing module 32 processes the food products differently (e.g., first processing module 32 may heat the air therein to a high temperature while the downstream second and third processing modules 32 heat the air therein to a lower temperature).

Figure 7:
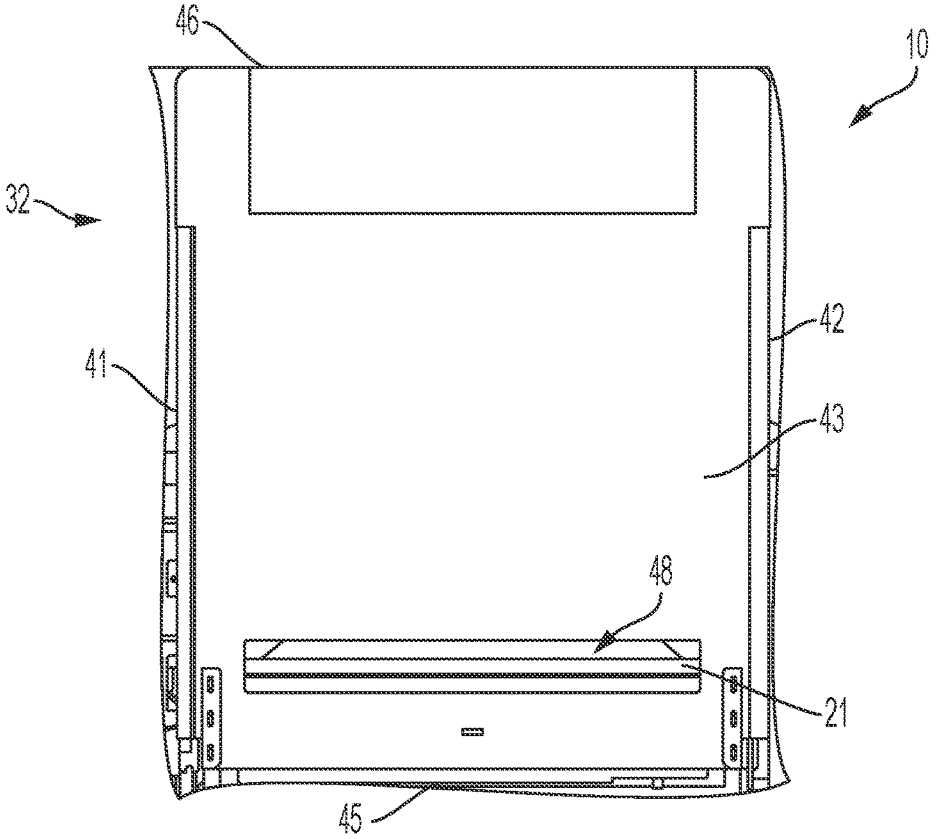
FIG. 7 is an end view of a first end wall of an example oven.
Figure 8:
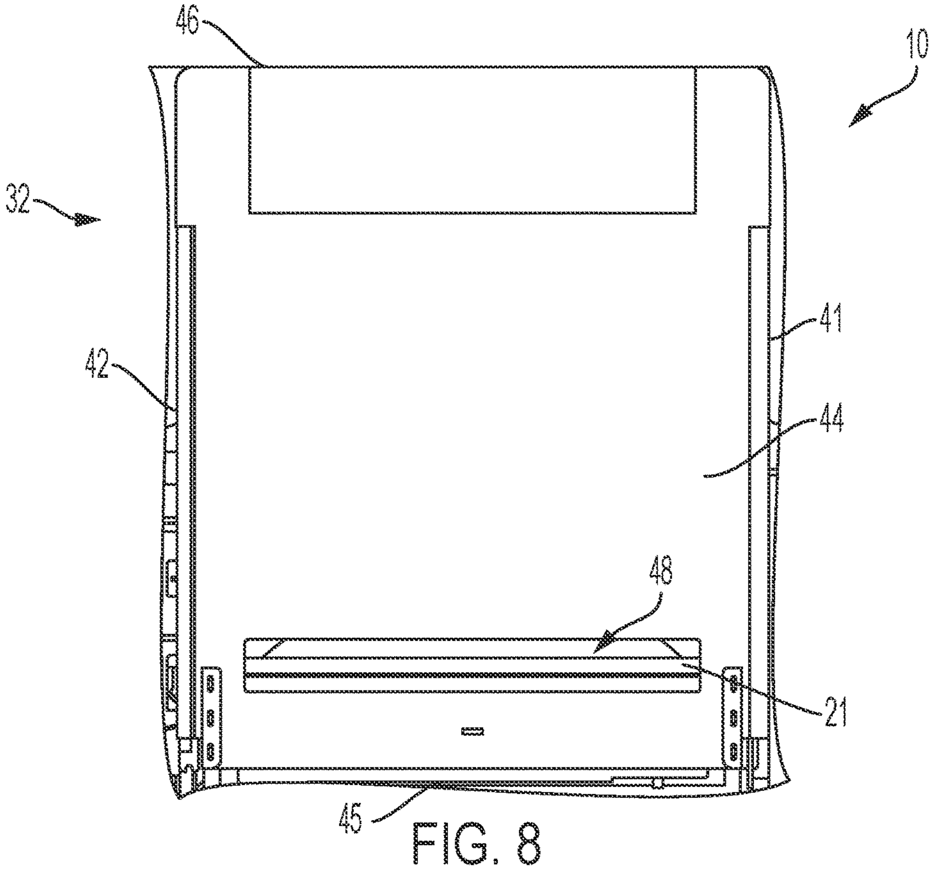
FIG. 8 is an end view of a second end wall of an example oven.
Figure 9:
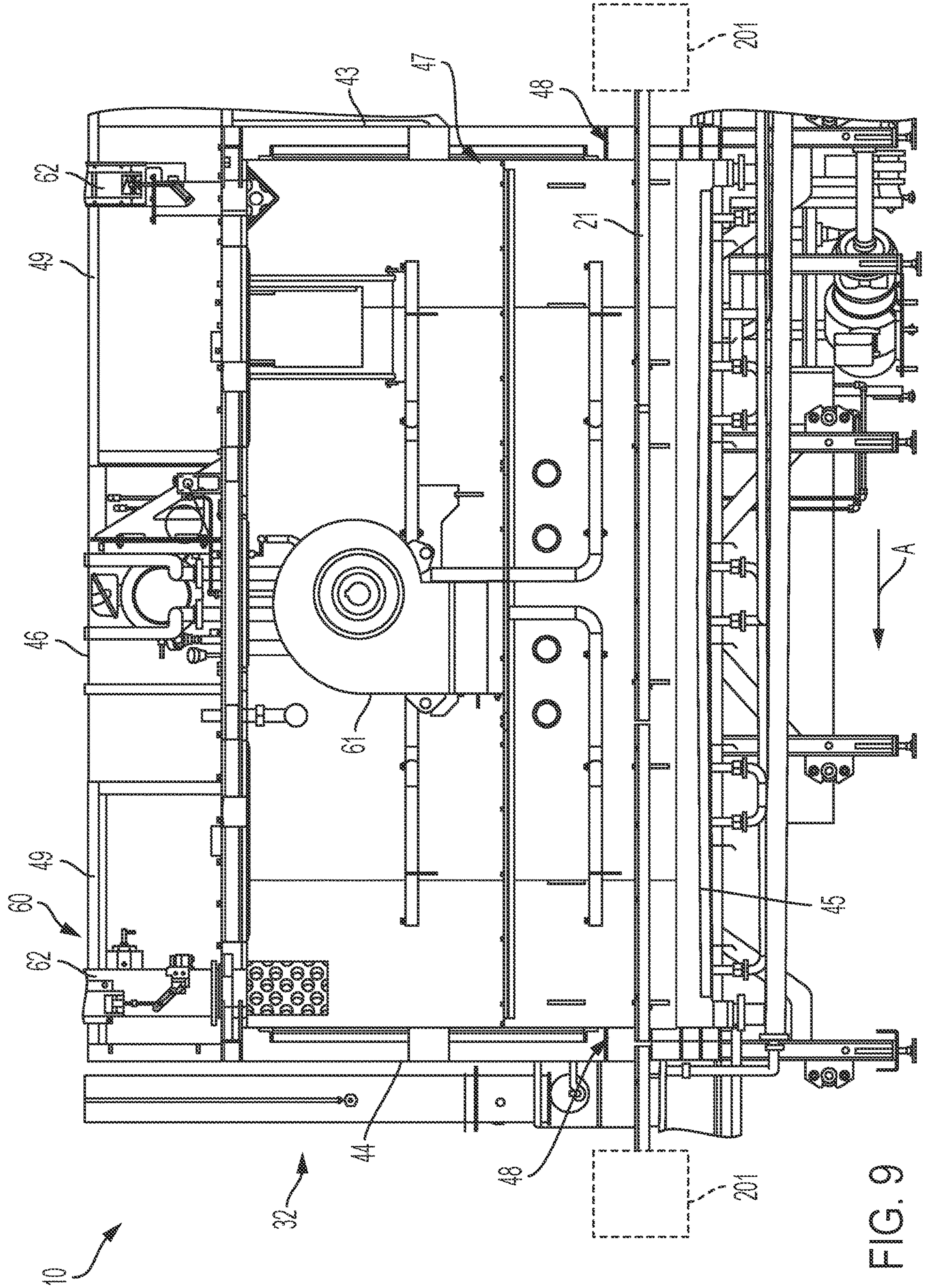
FIG. 9 is a cross-sectional view of an example oven.
Figure 10:
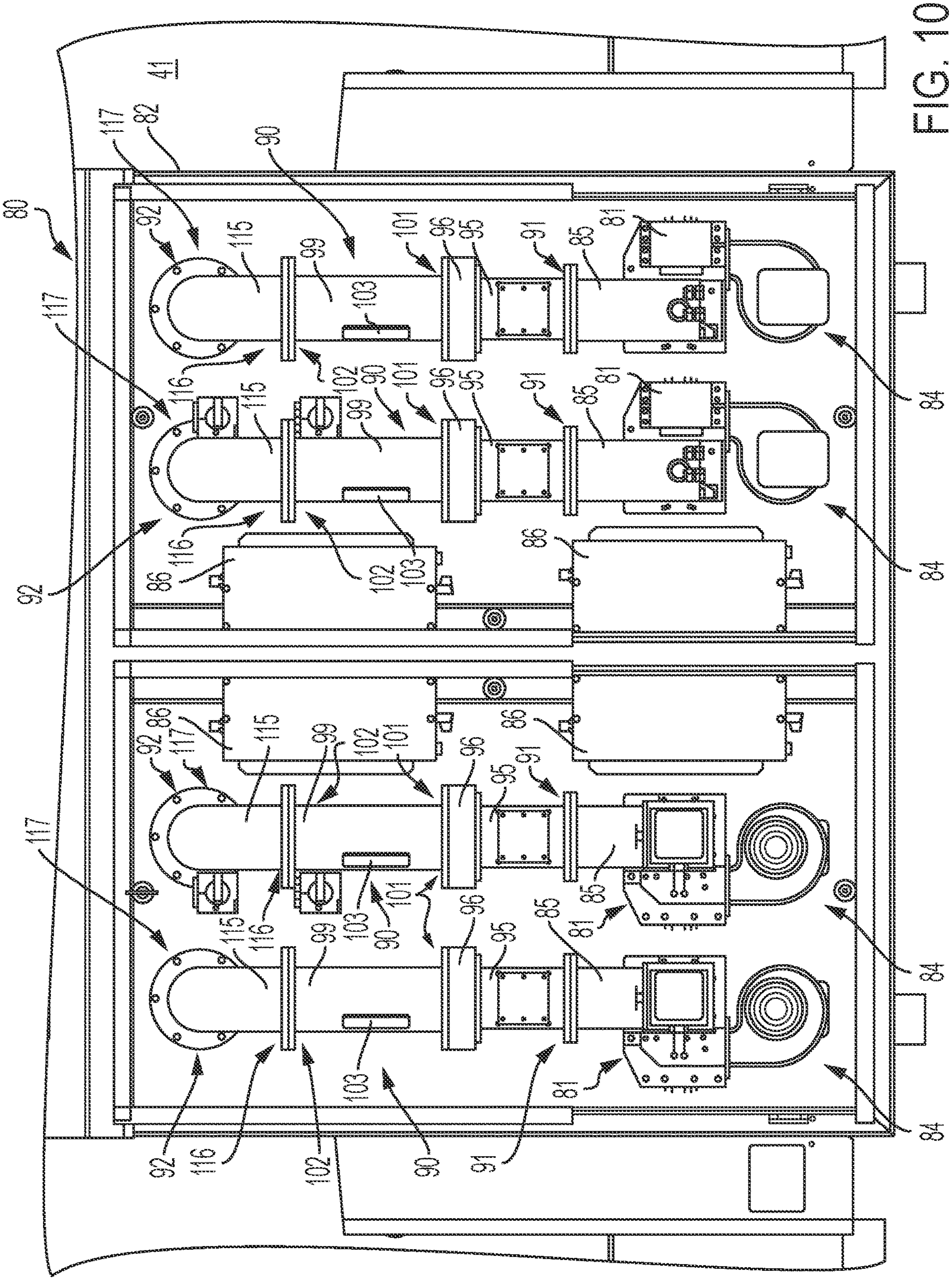
FIG. 10 is a side view of a microwave heating system. Access doors of a cabinet are excluded to expose waveguide assemblies and magnetron head assemblies.

FIGS. 7-9 depicts an example processing module 32 in greater detail. The processing module 32 includes a housing 40 with a first sidewall 41, an opposite second sidewall 42, an upstream first end wall 43, an opposite downstream second end wall 44, a bottom wall 45, and a top wall 46 such that the housing 40 has an interior chamber 47. Each end wall 43, 44 has an opening 48 through which the belt 21 extends and the food products pass. In certain examples, the sidewalls 41, 42 and/or the walls 43, 44, 45, 46 are insulated. In one example, the chamber 47 has a length of 130.70 inches (note that length is between the end walls 43, 44), a width of 63.40 inches (note that width is between the sidewalls 41, 42), and a height of 69.00 inches (note that height is between the top wall 46 and the bottom wall 45).

Returning to FIGS. 1-2, the processing module 32 includes systems for processing the food products. In one example, the processing module 32 includes one or more heating systems, such as a convection heating system 60 and/or a microwave heating system 80 (described herein below), for heating and thereby cooking the food products. The processing module 32 can include other systems for further processing the food products. For instance, a flavoring system (not depicted) adds flavor or smoke to the air within the chamber 47 to thereby add flavor to the food products. In another instance, a humidity system (not depicted) increases or decreases the humidity of the air within the chamber 47. Note that the processing module 32 can further be configured to cool the food products and/or dry the food products. Further note that the processing module 32 may process the food products using multiple systems within a single processing module 32. For example, a processing module 32 may heat the food products (e.g., with a convection heating system) while also increasing the humidity of the air within the chamber 47 (e.g., with a humidity system).

The convection heating system 60 is for heating the air within the chamber 47 (FIG. 9) to thereby heat and cook the food products. The system 60 includes air ducts 62 (see FIG. 1) that supply and exhaust air from the oven 10 and one or more fans 61 (FIG. 9) that circulate the air in the chamber 47 to thereby evenly heat the food products. The convection heating system 60 may heat the air within the chamber 47 in any suitable manner known in the art such as direct gas flame heating, indirect gas flame heating, and/or heating coils with heated thermal oil. One or more hatches or access panels 49 (FIG. 9) in the top wall 46 permit access to the chamber 47 and components therein. In certain examples, the fan 61 blows air through a diffuser (not depicted) that evenly distributes the air onto the belt 21 and therefore the products thereon. The diffuser can include a perforated panel through which the air is conveyed. In this example, the pressure of the air upstream of the perforated panel is greater than the pressure of the air downstream from the perforated panel. Other components of known convention heating systems may also be included. Reference is made to U.S. Pat. No. 6,604,452, which is hereby incorporated herein by reference, for other components and/or features of a known heating system that may be included within the system 60.

Referring now to FIGS. 10-17, the microwave heating system 80 is for emitting microwaves into the chamber 47 (FIG. 9) to thereby heat the food products. The microwave heating system 80 generally includes a microwave generating device, such as a magnetron 81 or solid-state microwave generator, that generates microwave energy and a waveguide assembly 90 that directs the microwave energy into the chamber 47 (FIG. 9). In the example depicted in FIGS. 10-17, the magnetron 81 and the waveguide assembly 90 are mounted to the first sidewall 41 (FIG. 1) and are enclosed within a cabinet 82 (FIG. 1). An operable access door 83 (FIG. 1) permits access into the cabinet 82. The number of magnetrons 81 and waveguide assemblies 90 can vary, and in the example depicted in FIG. 10, the system 80 includes four magnetrons 81 with a separate waveguide assembly 90 connected to each magnetron 81. Note that in certain examples, additional magnetrons 81 and waveguide assemblies 90 can be coupled to the second sidewall 42 (see FIG. 3-4).

The magnetron 81 is one component of the magnetron head assembly 84, and the magnetron head assembly 84 can include other components (e.g., transformer, capacitor, cooling fan/blower). The magnetron head assembly 84 includes a head waveguide 85 through which the microwave energy passes out of the magnetron head assembly 84. An example of the magnetron head assembly 84 is a 2450 MHz open frame magnetron head assembly manufactured by MKS (part numbers TXO and TXA). Power supply units 86 supply electrical power to the magnetron head assembly 84. The power supply units 86 are connected to the electrical systems of the building in which the oven 10 is operated. Note that in other examples, the magnetrons are configured to emit microwave energy at other frequencies, such as 915 MHz.

The waveguide assembly 90 has a first end 91 coupled to and configured to receive the microwave energy from the magnetron head assembly 84. The waveguide assembly 90 also has an opposite second end 92 coupled to the first sidewall 41 (see FIG. 10) through which the microwave energy passes into the chamber 47. Generally, the waveguide assembly 90 is configured to transform microwave energy into polarized, spinning microwave energy and guide the microwave energy into the chamber 47 to thereby heat and cook the food products that are conveyed through the chamber 47.

The ovens 10 and the systems described herein this present disclosure are improved ovens and systems over known prior art systems and these prior art systems have their own disadvantages such as: prior art systems may have a costly barriers to entry relative to microwave power; prior art systems may be inefficient at cooking thinner material; prior art systems may interfere with European cellular signal frequencies or require substantial shielding; and replacement of magnetrons in prior art systems may be costly. As such, the present inventors endeavored to develop waveguide assemblies 90 that effectively and efficiently deliver microwave energy having desired frequencies (e.g., 2450 MHz) into the chamber 47 of the oven 10. In addition, during research and experimentation, the present inventors recognized that some prior art systems that utilize microwave energy at 915 Mhz typically deliver the microwave energy through standard WR-975 waveguides (sized at 9.75 inches in length and 4.875 inches in width) and further recognized that when unitizing microwave energy at other frequencies, such as 2450 Mhz, the length and/or size of the waveguide can be reduced (e.g., standard WR-340 waveguides, waveguides with dimensions similar to WR-340 waveguides) thereby reducing the size and/or footprint of the microwave heating system 80. Thus, the present inventors developed the waveguide assemblies 90 of the present disclosure that effectively and efficiently convert and direct microwave energy (such as microwave energy having a frequency of 2450 Mhz) into the chamber 47 of the oven 10. Furthermore, the present inventors developed components of the waveguide assemblies 90 that convert the mode of the microwave energy and polarize the energy that passes therethrough. The present inventors recognized that polarizing the microwave energy creates an advantageous field pattern of the energy directed into the chamber 47 and improves "matching" of the microwave energy. The present inventors also endeavored to optimize the geometries of components of the waveguide assemblies 90 to improve the amount of microwave energy that effectively enters the chamber 47 and further reduce or minimize the amount of microwave energy that flows back to the magnetron 81. Through research and experimentation, the present inventor further recognized that in certain examples greater microwave energy transmission into the chamber 47 (e.g., in comparison to standard WR-340 waveguide) can be achieved by tailoring the geometries of components of the waveguide assemblies 90 for the frequency of the microwave energy propagating therethrough. In addition, in certain examples, tailoring the geometries of components of the waveguide assemblies 90 can help avoid poor field patterns in the chamber 47 which can produce "hot spots" and/or uneven cooking of the food products that would otherwise occur if standard waveguides are used.

Referring specifically to FIGS. 13-17, the example waveguide assembly 90 includes a rectangular waveguide 95 that receives the microwave energy from the head waveguide 85 (see FIG. 10) and guides the microwave energy downstream to a mode converter 96. The mode converter 96 couples microwave energy from the rectangular waveguide 95 and microwave energy propagates to a circular waveguide 99 (described hereinbelow). The mode converter 96 can convert TE10 mode microwave energy received from the rectangular waveguide 95 to TE11 mode. In certain examples, the TE11 mode is necessary for the microwave energy to propagate through the circular waveguide 99. The mode converter 96 has an opening 97 (FIG. 15) that permits passage of the microwave energy therethrough. The shape of the opening 97 can vary, and in certain examples, the shape is transitional between the interior cross-section of the rectangular waveguide 95 and the interior cross-section of the circular waveguide 99. Note that the rectangular waveguide 95 includes a mounting plate 107 (FIG. 14) to which a directional coupler 310 (FIG. 25) is coupled. The directional coupler 310 measures the amount of microwave energy that has entered the chamber 47 via the waveguide assembly 90 and amount of energy that is passes back to the magnetron 81 such that a controller 325 (see FIG. 25; described further herein) can determine how much of the energy is absorbed by the food products. As such, the efficiency of the system 80 and the amount of energy that is feed into the chamber 47 can be determined by the controller 325.

Figure 38:
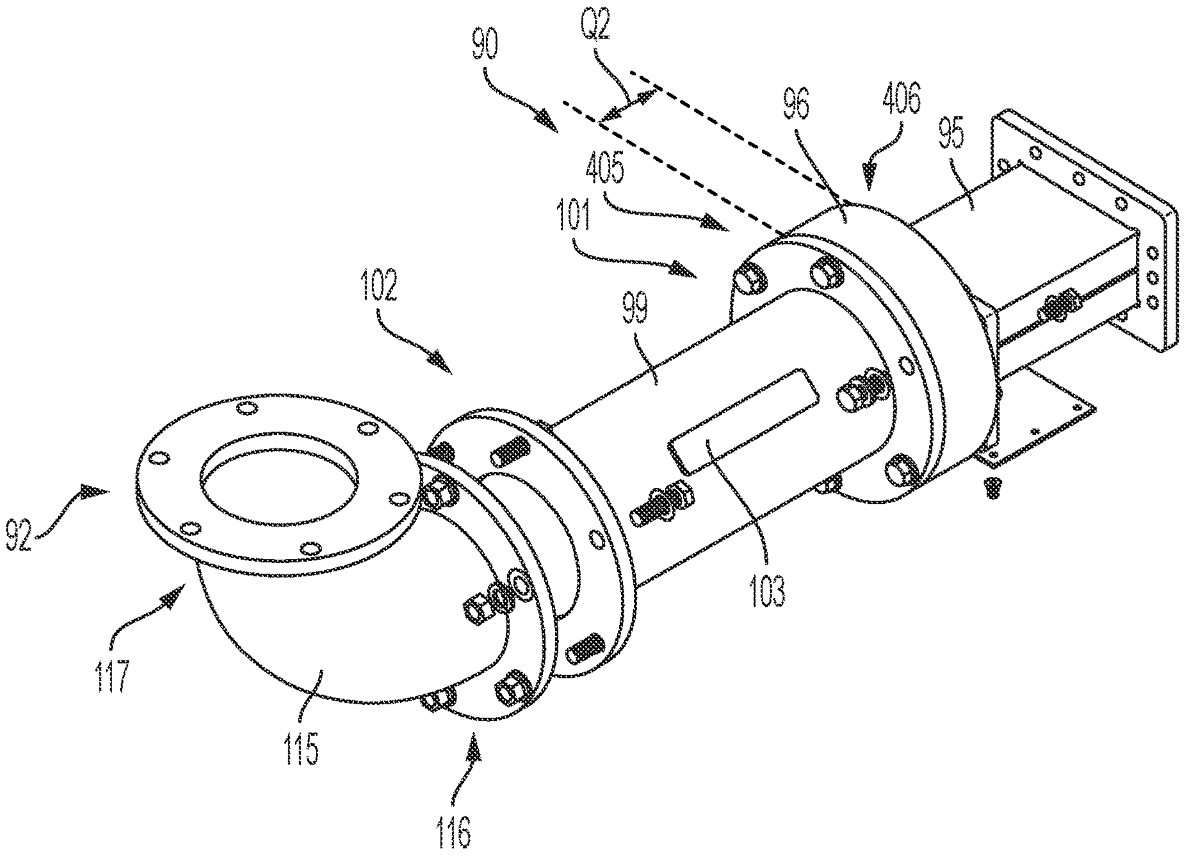
FIG. 38 is a perspective view of an example waveguide assembly of the present disclosure.
Figure 39:
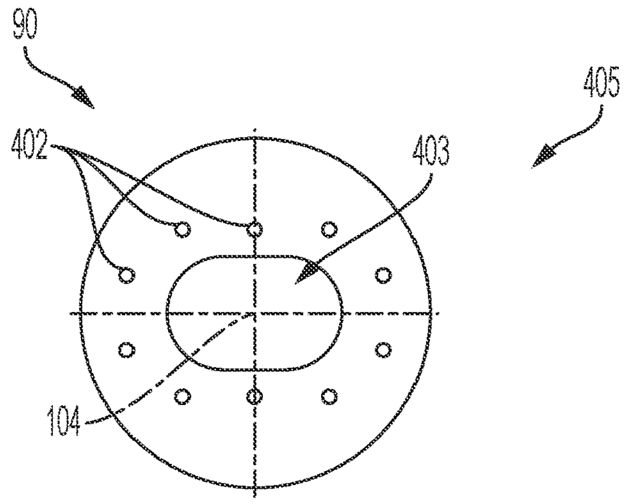
FIG. 39 is a first end view of an example mode converter.
Figure 40:
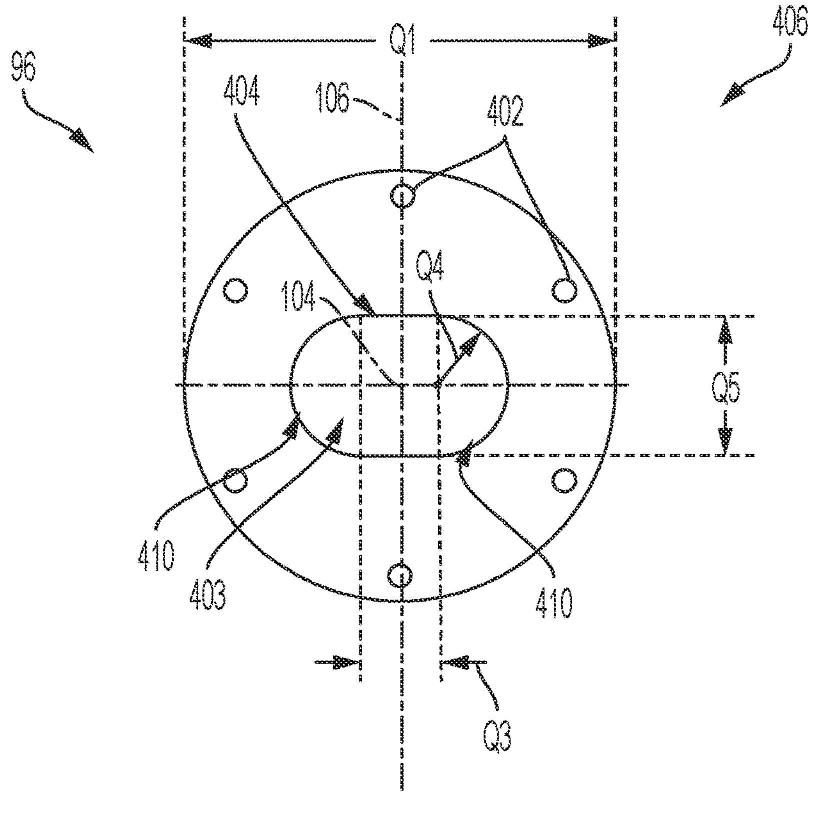
FIG. 40 is a second end view of an example mode converter.
Figure 41:
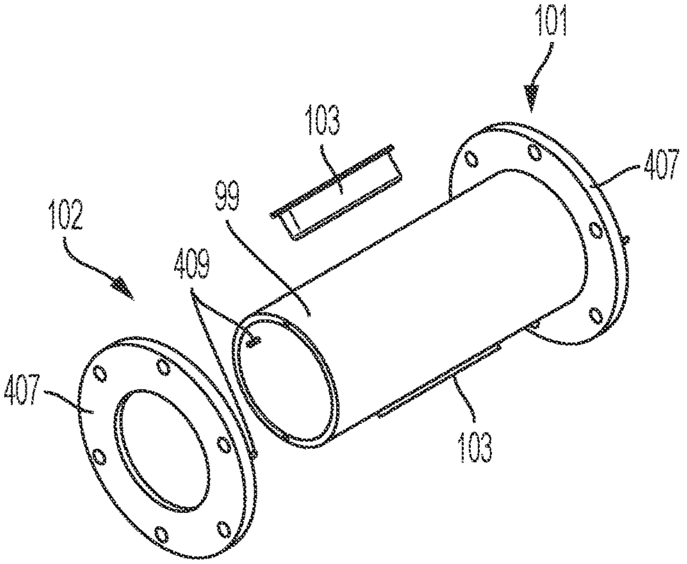
FIG. 41 is an exploded view of an example circular waveguide and opposing flanges.

Another example waveguide assembly 90 according to the present disclosure is depicted in FIG. 38. Note that the dimensions noted below with respect to different components of the waveguide assembly 90 (and other components of the oven 10) are not limiting on the present disclosure and one or more dimensions may vary in other examples of the waveguide assembly 90 and other components (e.g., cap 120) of the system. FIGS. 39-40 are opposing end views of the mode converter 96 depicted in FIG. 38. The mode converter 96 generally extends along a center axis 104 of the waveguide assembly 90 (see also FIG. 17), and the mode converter 96 has a plurality of holes 402 in which fasteners (e.g., bolts) are received to thereby couple the mode converter 96 to the rectangular waveguide 95 and the circular waveguide 99. In one example, the outside diameter of the mode converter 96 is 6.30 inches (see Q1 on FIG. 40), and the length of the mode converter between the opposing ends 405, 406 along the center axis 104 is 1.70 inches (see Q2 on FIG. 38). The mode converter 96 has a plate with an opening 403 through which the microwave energy passes such that the mode of the microwave energy is converted as noted above. The opening 403 has a cross-section that is generally rectangular with rounded ends. A rectangular center portion 404 of the opening 403 has sides having width of 1.20 inches (see Q3 on FIG. 40), and rounded end portions 410 of the opening 403 have a radius of 1.00 inches (see Q4 on FIG. 40). Note the one end of the radius is positioned on a centerline of the opening 403 and is offset from the center axis 104 by 0.60 inches. Also, note that the distance between the sides of the rectangular center portion 404 is 2.0 inches (see Q5 on FIG. 40). In certain examples, the thickness of the plate, the length and/or width of the opening 403, and the radii of the round ends of the opening 403 are important for proper conversion of the microwave energy. In one specific example, the mode converter 96 has all the specific dimensions noted above (+/− machining tolerances). In this specific non-limiting example, deviations from the noted dimensions can cause poor matching of the microwave energy in the chamber 47 and/or reduce the efficiency of microwave energy transmission in the chamber 47.

Figure 13:
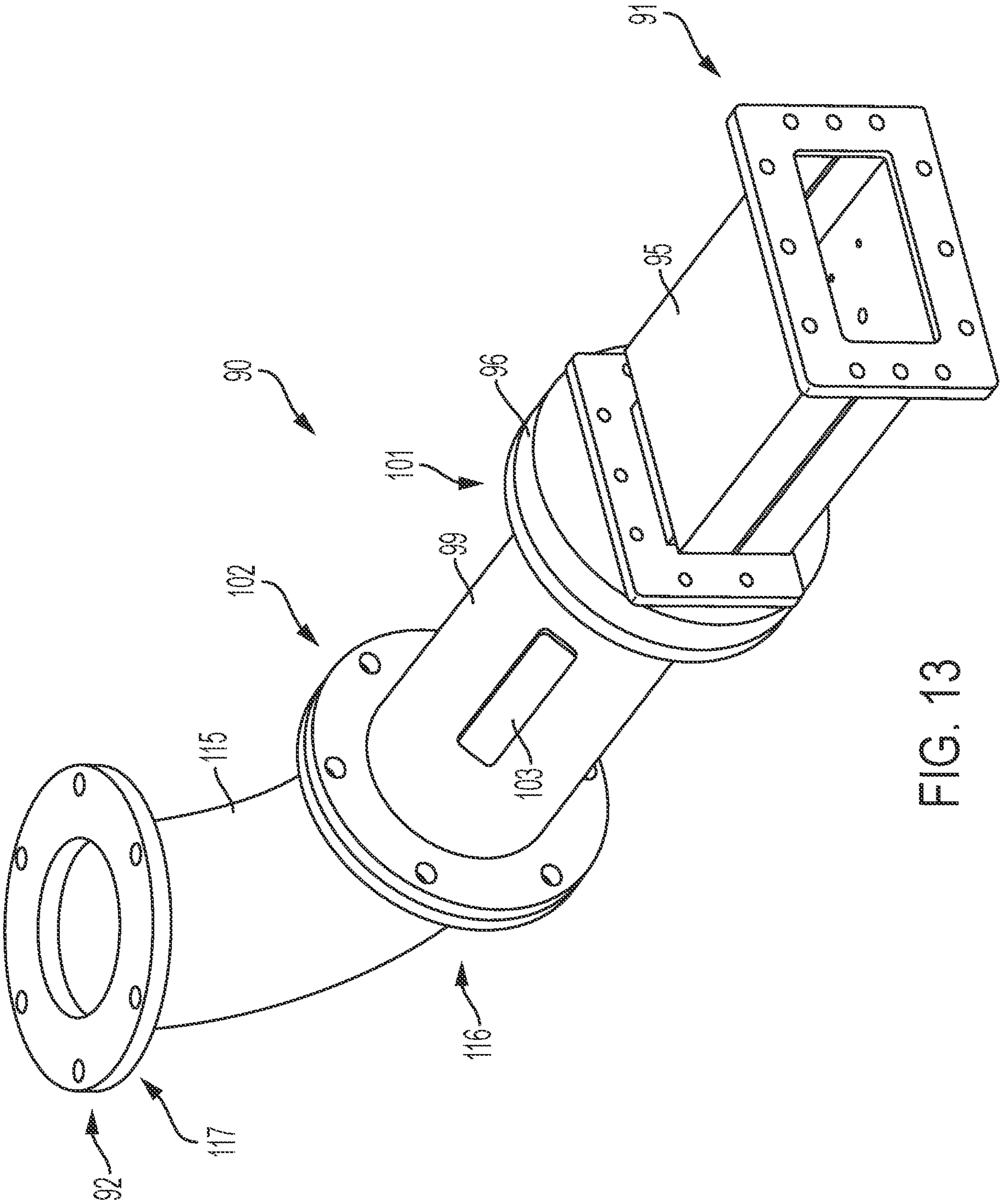
FIG. 13 is a perspective view of an example waveguide assembly.
Figure 15:
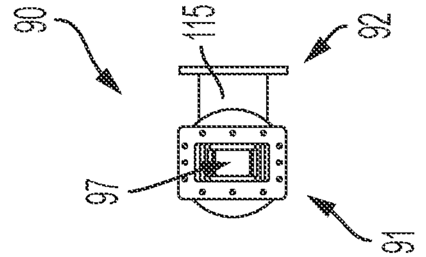
FIG. 15 is an end view of the waveguide assembly of FIG. 14.
Figure 17:
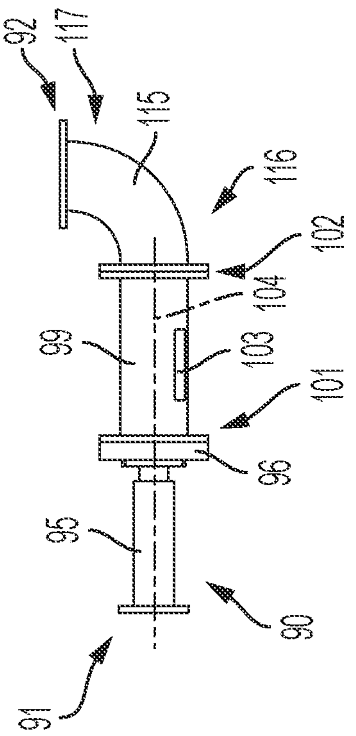
FIG. 17 is a side view of the waveguide assembly of FIG. 14.
Figure 14:
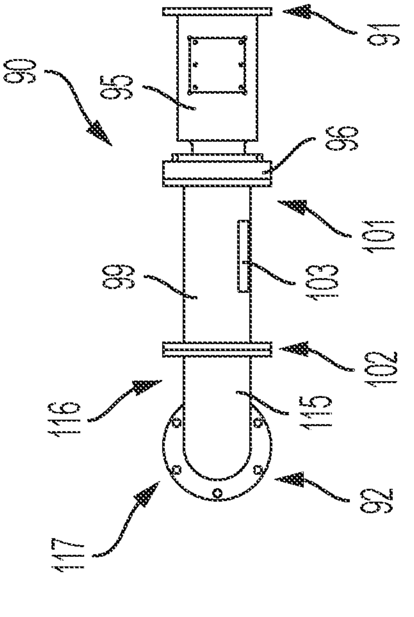
FIG. 14 is a top-down view of an example waveguide assembly.
Figure 16:
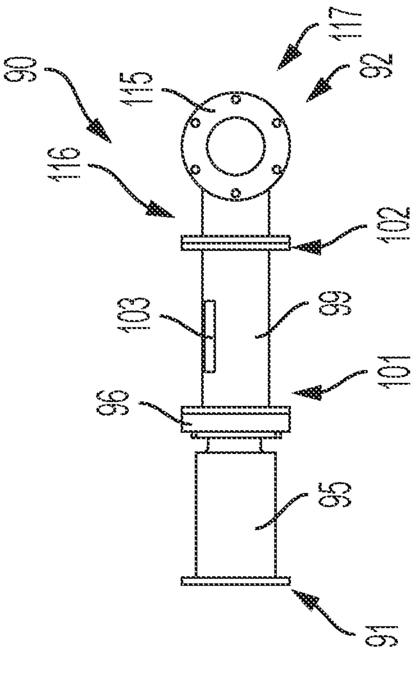
FIG. 16 is a bottom-up view of the waveguide assembly of FIG. 14.
Figure 18:
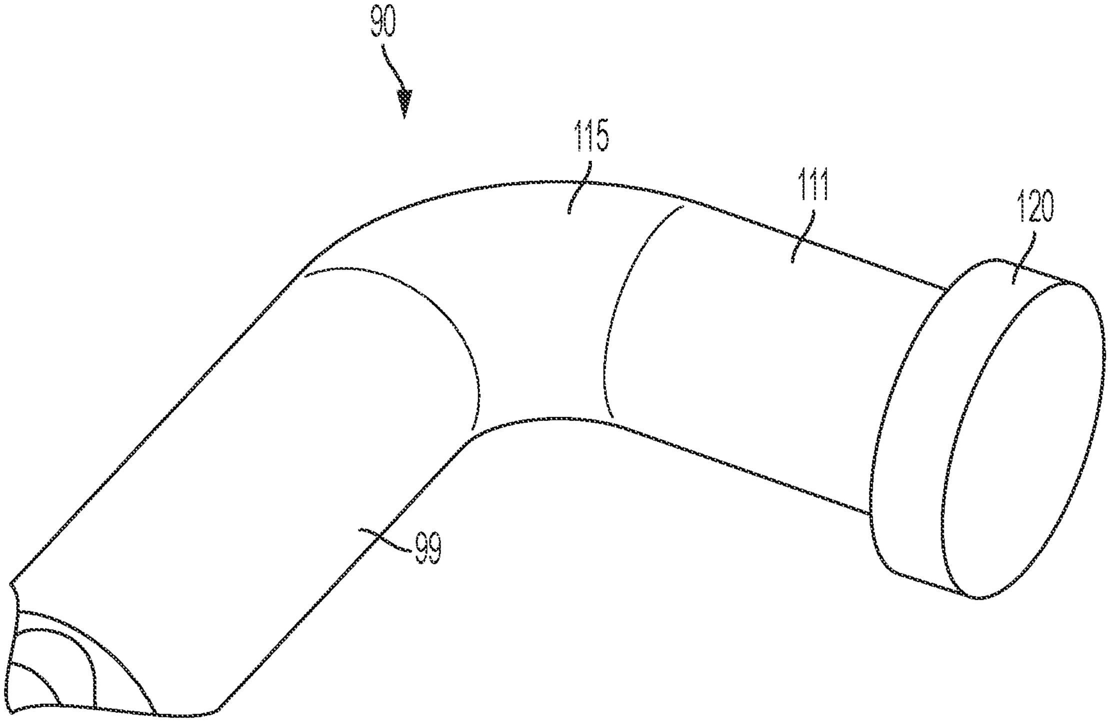
FIG. 18 is a perspective view of an example cap on an example waveguide assembly.
Figure 42:
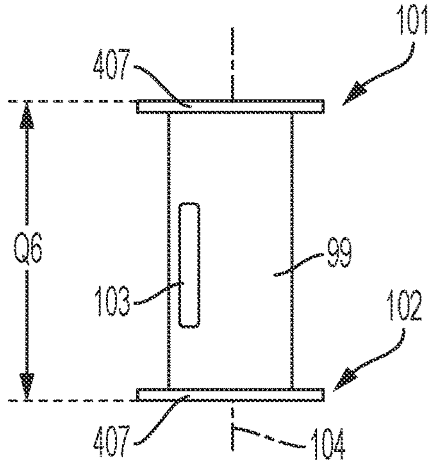
FIG. 42 is a side view of the circular waveguide and the flanges of FIG. 41.
Figure 43:
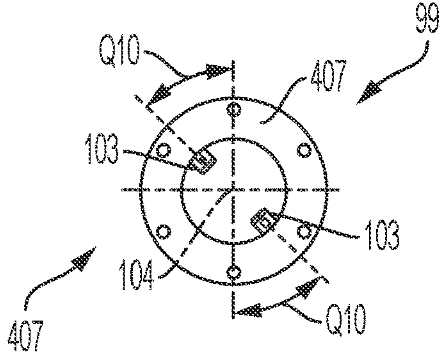
FIG. 43 is an end view of the circular waveguide and the flange of FIG. 41.
Figure 44:
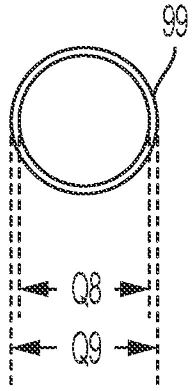
FIG. 44 is an end view of the circular waveguide of FIG. 41
Figure 45:
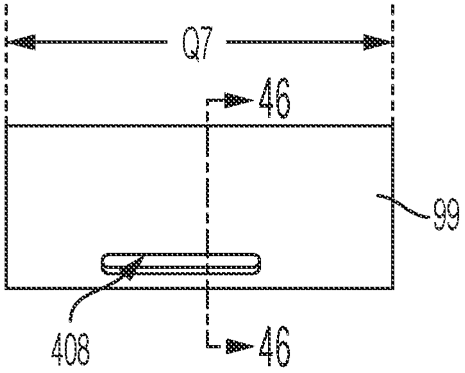
FIG. 45 is a side view of the circular waveguide of FIG. 44.
Figure 46:
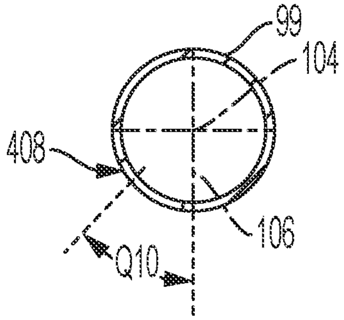
FIG. 46 is cross-sectional of the circular waveguide of FIG. 44 along line 46-46 on FIG. 45.
Figure 47:
FIG. 47 is a first end view of an example tuning block of the present disclosure.
Figure 48:
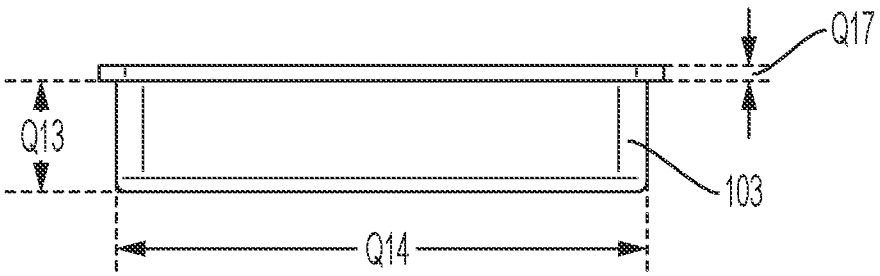
FIG. 48 is a side view of the tuning block of FIG. 47
Figure 49:
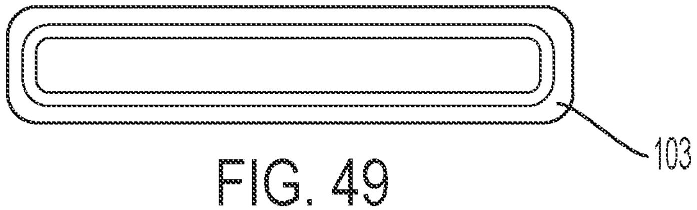
FIG. 49 is a second end view of the tuning block of FIG. 47.
Figure 50:
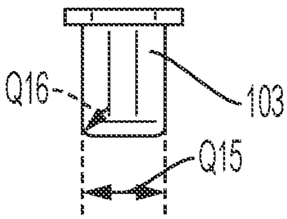
FIG. 50 is another side view of the tuning block of FIG. 47.

Referring to FIGS. 13 and 38, the circular waveguide 99 receives the microwave energy from the mode converter 96. In certain examples, the circular waveguide 99 is generally tubular and is designed to have the smallest diameter to support propagation of the microwave energy at 2450 MHz frequency. The circular waveguide 99 includes an upstream first end 101 that receives the microwave energy from the mode converter 96 and an opposite downstream second end 102 through which the microwave energy passes to a bent waveguide 115. Flanges 407 are coupled to each end 101, 102 of the circular waveguide 99. The overall outside length (see Q6 on FIG. 42) along the center axis 104 of the circular waveguide 99 including the thicknesses of the flanges is 10.04 inches.

FIGS. 41-46 depict the example circular waveguide 99 in greater detail. The circular waveguide 99 has a length of 9.62 inches (see Q7 on FIG. 45), an inside diameter of 3.548 inches (see Q8 on FIG. 44), and an outside diameter of 4.00 inches (See Q9 on FIG. 44). The thickness of the sidewall of the circular waveguide 99 is 0.226 inches. The circular waveguide 99 can be formed of any suitable material. In one example, the circular waveguide 99 is formed of aluminum. Slots 408 are defined in the sidewall of the circular waveguide 99 and receive tuning blocks 103. The centerline (major axis) of the slot 408 is 45.0 degree radially offset (see Q10 on FIG. 46) from an axis that extends through the circular waveguide 99 (e.g., this second axis 106 is perpendicular to the center axis 104 (FIG. 46)). The circular waveguide 99 includes pins 409 (FIG. 41) that are configured to align the circular waveguide 99 and the flanges 407 with the mode converter 96 and the bent waveguide 115 in a proper orientation to maximize the transmission of the microwave energy through the waveguide assembly 90. In this example, the components of the waveguide assembly 90 are in alignment with each other. For example, the opening 403 in the mode converter 96 and the tuning blocks 103 are aligned relative to each other. In one specific example, the slots 408 and the tuning blocks 103 are in the angular position noted above and the sides of the rectangular center portion 404 extend perpendicular to the second axis 106 (FIG. 40). Each pin 409 has an outside diameter of 0.125 inches and a length of 0.375 inches. Note that in certain examples, the 45.0 degree offset of the tuning blocks 103 noted above should be maintained to ensure that microwave energy effectively propagates into the chamber 47. In other examples, the tuning blocks 103 directly oppose each other.

Referring to FIGS. 17 and 41-43, two tuning blocks 103 are connected to and extend from the interior surface of the circular waveguide 99 into the interior space defined by the circular waveguide 99. Note that the tuning blocks 103 are received into the slots 408 (see FIG. 45). Each tuning block 103 is elongated along an axis that extends parallel to the center axis 104 (see also FIG. 17) of the circular waveguide 99. In certain examples, the tuning block 103 is connected to the interior surface at a 45.0 degree angle with respect to a symmetrical plane of tuning block 103. The plane radially extends relative to the center axis 104. As such, the tuning blocks 103 induce a variation in the field distribution of the microwave energy received from the mode converter 96 and thereby create an elliptic polarization of the microwave energy. In one example, the tuning blocks 103 cause the microwave energy received from the mode converter 96, which is generally linearly polarized TE11 mode, to depart from the linear polarization and become elliptically polarized microwave energy. Accordingly, the microwave energy passing through the second end 102 of the circular waveguide 99 is elliptically polarized microwave energy having an angle of polarization that continuously rotates. The rotation of the angle of polarization prevents the microwave energy from producing "hot spots" and uneven heating within the chamber 47.

FIGS. 47-50 are various views of the tuning block 103. The tuning block 103 has a first end 411 with a flange 413 that is fastened to the exterior surface of the circular waveguide 99 (see FIG. 17) and a second end 412 that extends through the slot 408 into the circular waveguide 99 (see FIGS. 43 and 45). The width of the flange 413 is 0.10 inches (see Q17 on FIG. 48). A body 414 extends between the ends 411, 412 and is generally a rectangular prism with rounded surfaces and edges. The body 414 has a depth of 0.826 inches (see Q13 on FIG. 48), a length of 3.90 inches (see Q14 on FIG. 48), and a width of 0.60 inches (see Q15 on FIG. 50). The rounded edges have a radius of 0.10 inches (see Q16 on FIG. 50). In one specific example, the circular waveguide 99 and the tuning blocks 103 include all the specific dimensions noted above (+/− machining tolerances). In this specific example, deviations from the noted dimensions may cause poor matching of the microwave energy in the chamber 47 and/or reduce the efficiency of microwave energy transmission in the chamber 47.

In certain examples, the emission of polarized microwave energy into the chamber 47 advantageously improves and generates multiple modes within the chamber 47 such that the energy distribution is generally homogenous within the chamber 47. The polarized microwave energy further promotes isolation between multiple waveguide assemblies 90 (see FIG. 10). The polarized microwave energy also energizes the chamber 47 with a multi-mode field pattern that prevents the microwave energy coupling back into the waveguide assemblies 90.

Figure 11:
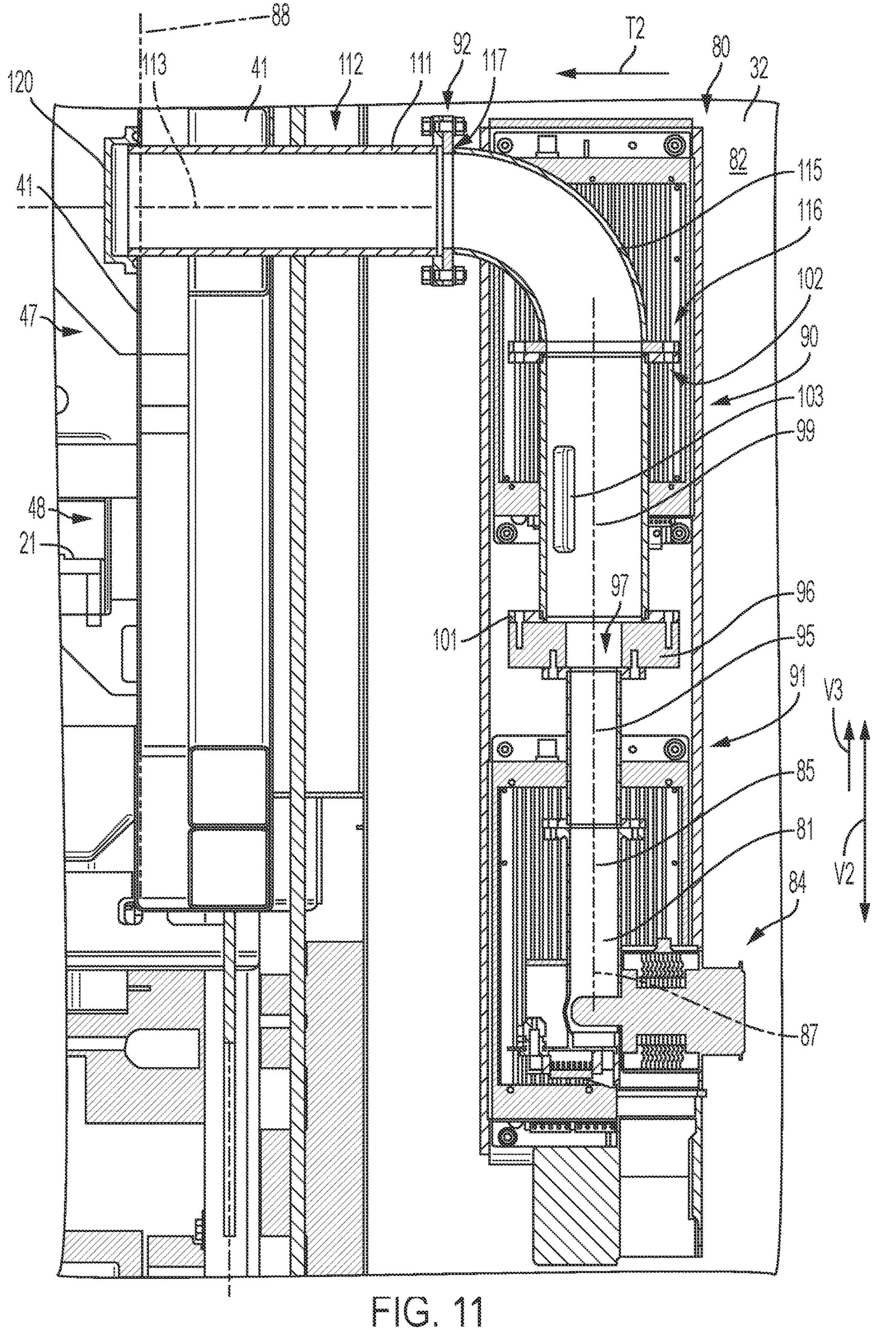
FIG. 11 is a cross-sectional view of an example microwave heating system on a sidewall of an example oven.
Figure 12:
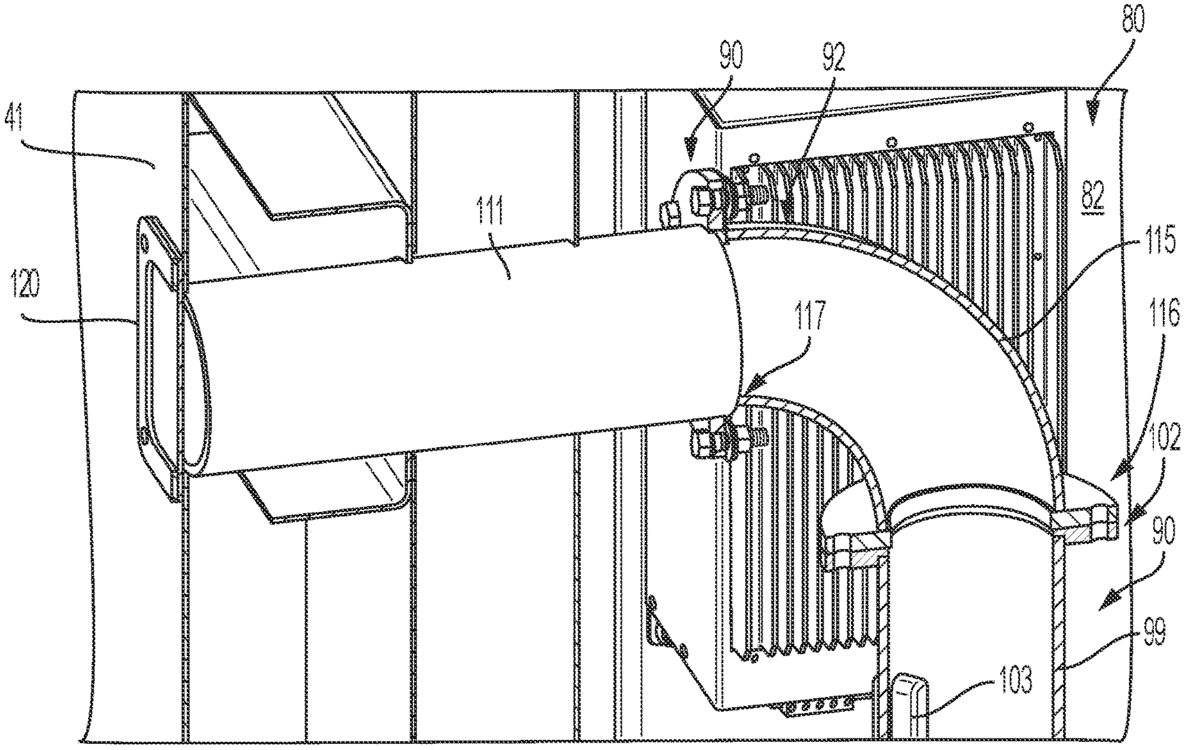
FIG. 12 is a view depicting a partial cross-section of an example waveguide assembly coupled to a sidewall of an example oven.
Figure 51:
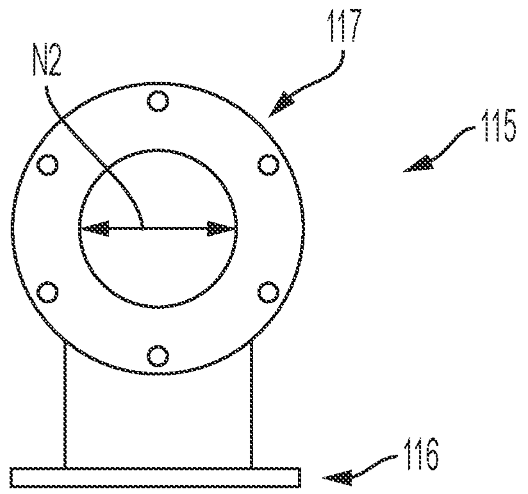
FIG. 51 is an end view of an example bent waveguide of the present disclosure.
Figure 52:
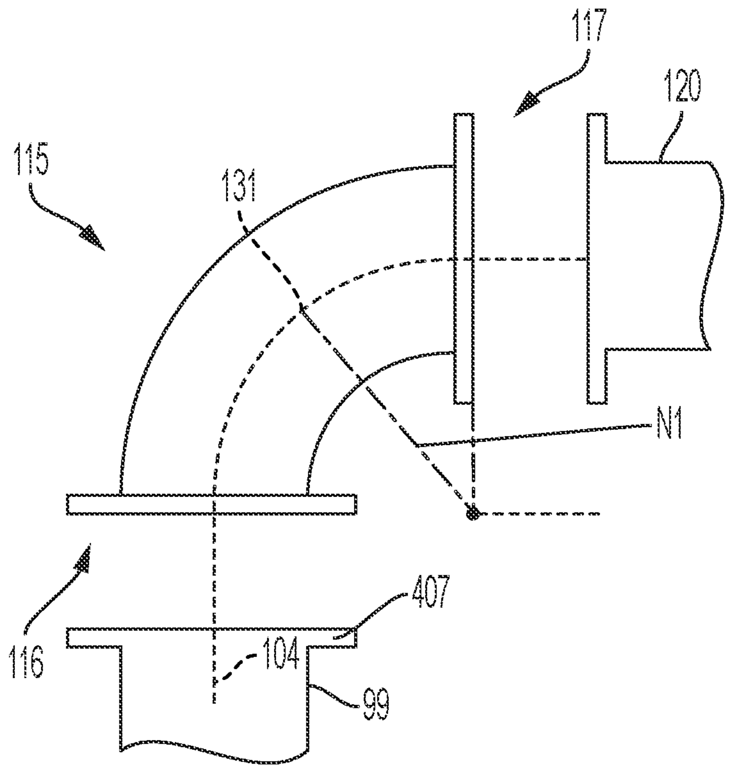
FIG. 52 is a side view of the bent waveguide of FIG. 51.

As noted above, the microwave energy passes from the circular waveguide 99 to the bent waveguide 115. The bent waveguide 115 has a first end 116 that receives the microwave energy from the circular waveguide 99 and a second end 117 through which the microwave energy passes into the chamber 47 (see FIGS. 11-12). In one example, bent waveguide 115 is a ninety-degree bent waveguide. In other examples, the second end 102 of the circular waveguide through which the microwave energy passes into the chamber 47. Note that the second end 117 can be connected to the cap 120, the sidewall 41 of the oven 10, or the waveguide extension 111. In certain examples, the waveguide assembly 90 includes a waveguide extension 111 that extends from the second end 117 of the bent waveguide 115 to the first sidewall 41 and/or into the chamber 47 (note that the waveguide extension 111 depicted in FIG. 12 is not depicted in cross-section like the other components of the waveguide assembly 90). Also note that two different example caps 120 (described herein below) are depicted in FIGS. 11-12. The waveguide extension 111 allows for an air passage 112 (see FIG. 11) to be defined between the cabinet 82 and the first sidewall 41. FIGS. 51-52 also depict an example bent waveguide 115. The bent waveguide 115 has flanges at the ends 116, 117. The bent waveguide 115 has a flange to flange length of 8.168 inches along the centerline 131 of the bent waveguide 115, a radius of 5.20 inches to the centerline 131 (see N1 on FIG. 52), and an inside diameter of 3.548 inches (see N2 on FIG. 51). Referring back to FIG. 11, note that the head waveguide 85 receives the microwave energy from the magnetron 81 and directs the microwave energy vertically along a waveguide axis 87 that aligns with the above-noted center axis 104 (see FIG. 17). The waveguide axis 87 extends vertically through the head waveguide 85 (see vertical arrow V2 on FIG. 11). As such, the microwave energy generally propagates in a vertical direction (see arrow V3 on FIG. 11) through the head waveguide 85. The waveguide axis 87 aligns with the center axes of the rectangular waveguide 95, mode converter 96, and the circular waveguide 99 and thus, the waveguide assembly 90, including the rectangular waveguide 95, mode converter 96, and/or circular waveguide 99, direct the microwave energy vertically therethrough and along the waveguide axis 87. The sidewall 41 extends vertically along a sidewall axis 88 (FIG.

11) that intersects with the center axis 113 of the waveguide extension 111, and the sidewall axis 88 of the sidewall 41 is parallel and offset from the waveguide axis 87 of the head waveguide 85. Further note that the bent waveguide 115 is configured to direct the microwave energy in a transverse direction (see arrow T2 on FIG. 11) toward the sidewall 41. The transverse direction (T2) is transverse to the vertical direction (V3). In one example, the angle between the transverse direction (T2) and the vertical direction (V3) is ninety degrees. In another example, the angle between the transverse direction (T2) and the vertical direction (V3) is seventy-five degrees.

Figure 20:
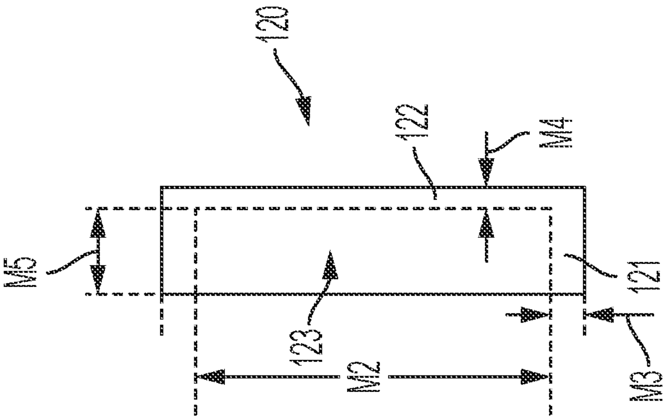
FIG. 20 is a side view of the cap of FIG. 19.
Figure 19:
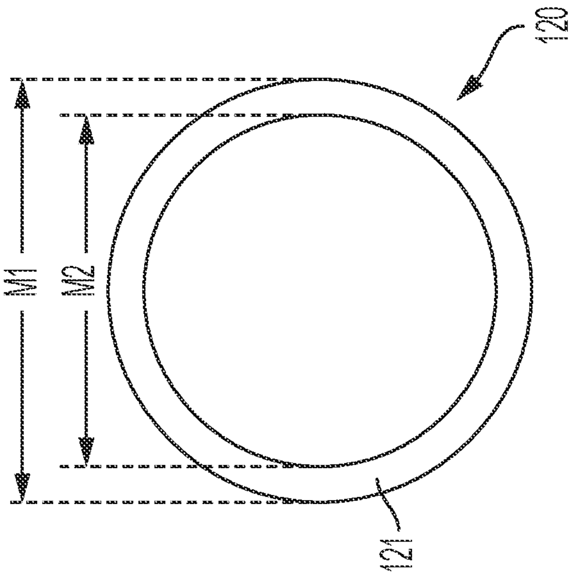
FIG. 19 is an end view of an example cap.
Figure 21:
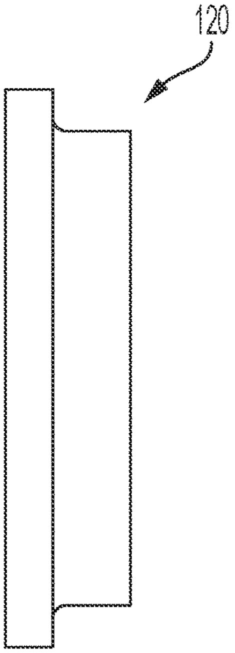
FIG. 21 is a side view of an example cap.
Figure 22:
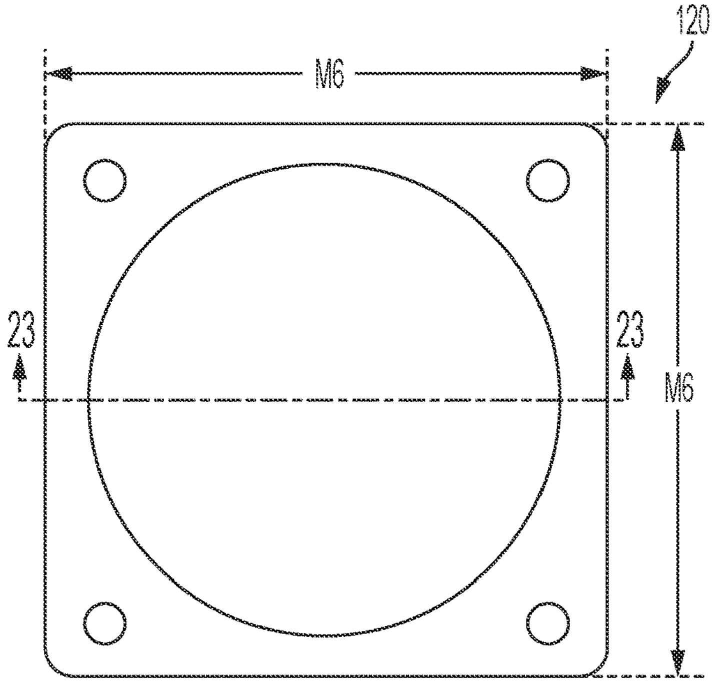
FIG. 22 is an end view of the cap of FIG. 21.

Referring to FIGS. 18-24, the second end 117 of the bent waveguide 115 is coupled to the first sidewall 41 (see FIG. 1), and a cap 120 covers the second end 117 or the opening in the waveguide extension 111 to thereby prevent moisture and debris from entering the waveguide assembly 90. An example cap 120 is depicted in FIGS. 19-20, and another example cap 120 is depicted in FIGS. 21-24. The cap 120 also advantageously prevents fluids from a clean-in-place system (not depicted) from entering the waveguide assembly 90. The clean-in-place system (not depicted) is configured to wash, clean, and/or sanitize the chamber 47 and/or the belt 21 by spraying cleaning solutions into the chamber 47 (see FIG. 9). The cap 120 is formed of low-loss material that reduces or eliminates absorption or reflection microwave energy. The material forming the cap 120 may have a dielectric constant impacting the propagation of microwave energy into the chamber 47. In certain examples, the cap 120 helps to maintain the polarization of the microwave energy by better matching to free space impedance of the chamber 47. In certain examples, the cap 120 is an additional matching element from the impedance of the circular waveguide 99 to that of the free space impedance of the chamber 4. Thus, in this example the cap 120 promotes improved microwave energy transfer into the chamber 47 by reducing reflection of the microwave energy back into the waveguide assembly 90.

FIGS. 19-24 depict example caps 120. The cap 120 depicted in FIGS. 19-20 has an outside diameter of 5.0 inches (see M1 on FIG. 19) and an inside diameter of 4.165 inches (see M2 on FIG. 19). The cap 120 has a cap sidewall 121 with a thickness of 0.418 inches (see M3 on FIG. 20), an end plate 122 with a thickness of 0.250 inches (see M4 on FIG. 20), and a cavity 123 with a depth of 1.0 inches (see M5 on FIG. 20). In this example, the microwave energy passes from the bent waveguide 115 or the waveguide extension 111 through the plate 122 into the chamber 47.

Figure 23:
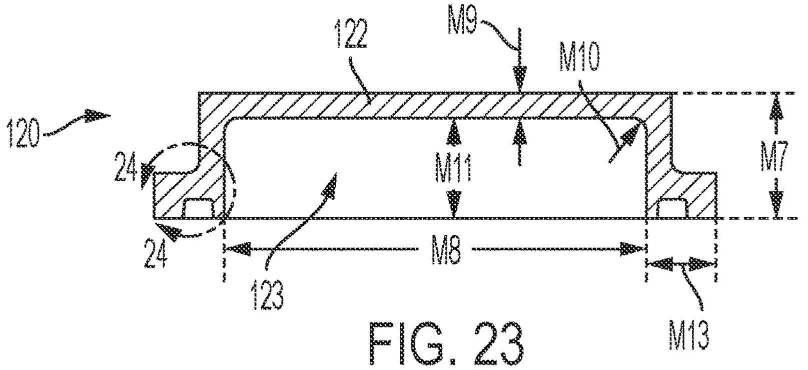
FIG. 23 is a cross-sectional view of the cap of FIG. 21 along line 23-23 on FIG. 22.
Figure 24:
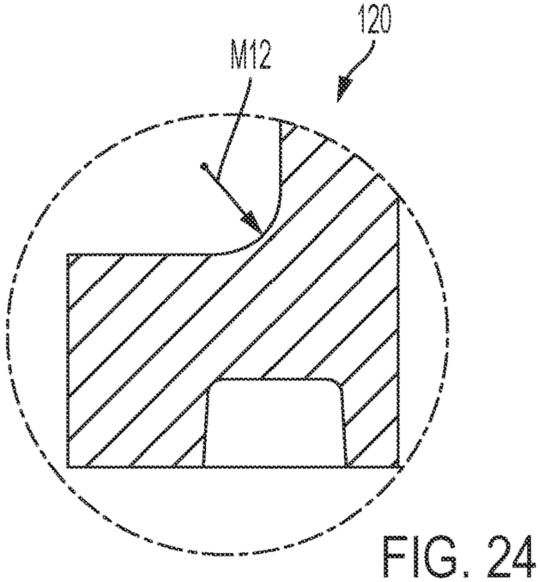
FIG. 24 is an enlarged view of the cap of FIG. 21 within line 24-24 on FIG. 23.

The cap 120 depicted in FIGS. 21-24 has a length and width of 5.5 inches (see M6 on FIG. 22) and a depth of 1.22 inches (see M7 on FIG. 23). The cavity 123 has an inside diameter of 4.162 inches (see M8 on FIG. 23) and the thickness of the end plate 122 is 0.25 inches (see M9 on FIG. 22). The cavity 123 has a depth of 0.970 inches (see M11 on FIG. 23) and a rounded edge near the end plate 122 that has a radius of 0.125 inches (see M10 on FIG. 23). The cap 120 also has a round edge opposite the cavity 123 having radius of 0.125 inches (see M12 on FIG. 24). The cap 120 also has an edge width of 0.669" (see M13 on FIG. 23). In this example, the microwave energy passes from the bent waveguide 115 or the waveguide extension 111 through the plate 122 into the chamber 47.

Referring back to FIGS. 5-6, the oven 10 optionally includes a downstream processing module 32 configured to cool the food products (note that this processing module 32 is downstream from the transition module 35 described below). This processing module 32 includes a cooling system 50 that cools the air within the processing module 32 to thereby cool the food products on the belt 21. The processing module 32 includes air ducts 62 that supply and/or exhaust air from the processing module 32 and a fan (not depicted) that circulates the air in the processing module 32. The cooling system 50 includes a refrigeration system (not depicted) that cools the air in the processing module 32. The refrigeration system can include known components such as evaporators, condensers, expansion values, cooling coils, and the like. Note that the oven 10 can include any number of processing modules 32 that are spaced apart along the conveyor 20. As noted above, each processing module 32 can process the food product in different ways. In another example, a processing module 32 includes slicing equipment that slice the food products. In another example, a processing module 32 includes injection equipment that is configured inject edible materials into the food products. Note that the oven 10 includes a transition module 35 between the processing module 32 and the downstream processing module 32. The belt 21 extends through the transition module 35, and in certain examples, one or more components of the microwave suppression system 200 are included with the transition module 35 instead of the outfeed module 33 because the transition module 35 is located next to the processing module 32 that utilizes microwave energy to process the food products.

Referring back to FIGS. 1-2, the oven 10 also includes a microwave suppression system 200 that is for preventing microwave energy from leaking out of the oven 10. The present inventors recognized that microwave energy emitting into the chamber 47 from the microwave heating system 80 may leak out through various openings in the processing module 32, such as the openings 48 in the end walls 43, 44. The leaked microwave energy can be harmful to workers working near the oven 10, and in some jurisdictions, governmental rules and standards dictate the maximum amount of microwave energy that can leak from equipment, such as ovens. Accordingly, the present inventors developed the microwave suppression system 200 (and components and assemblies thereof) to reduce or eliminate the amount of microwave energy that may otherwise leak from the oven 10.

Figure 27:
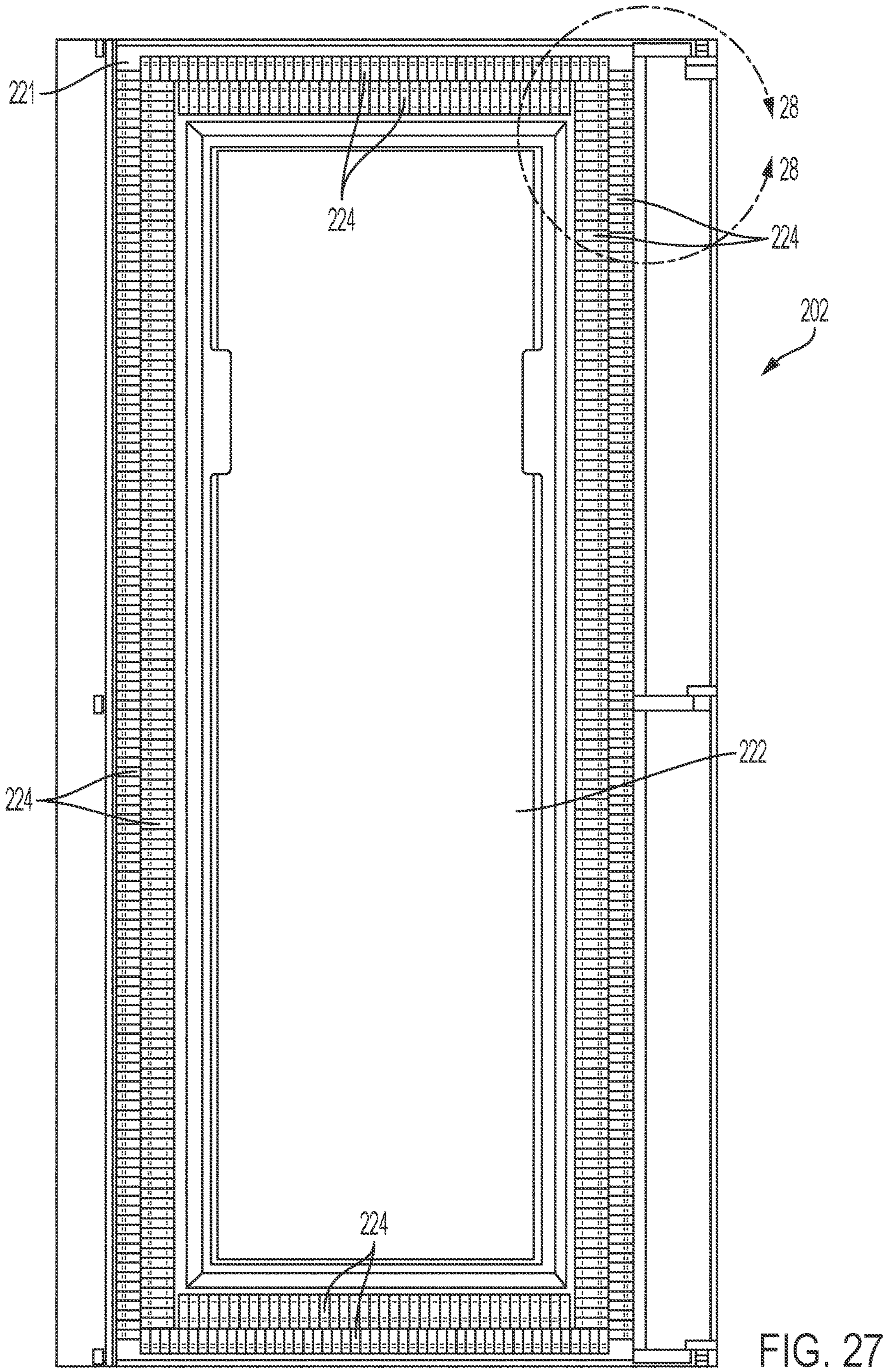
FIG. 27 is a front, inside view of an example access door of the present disclosure.
Figure 28:
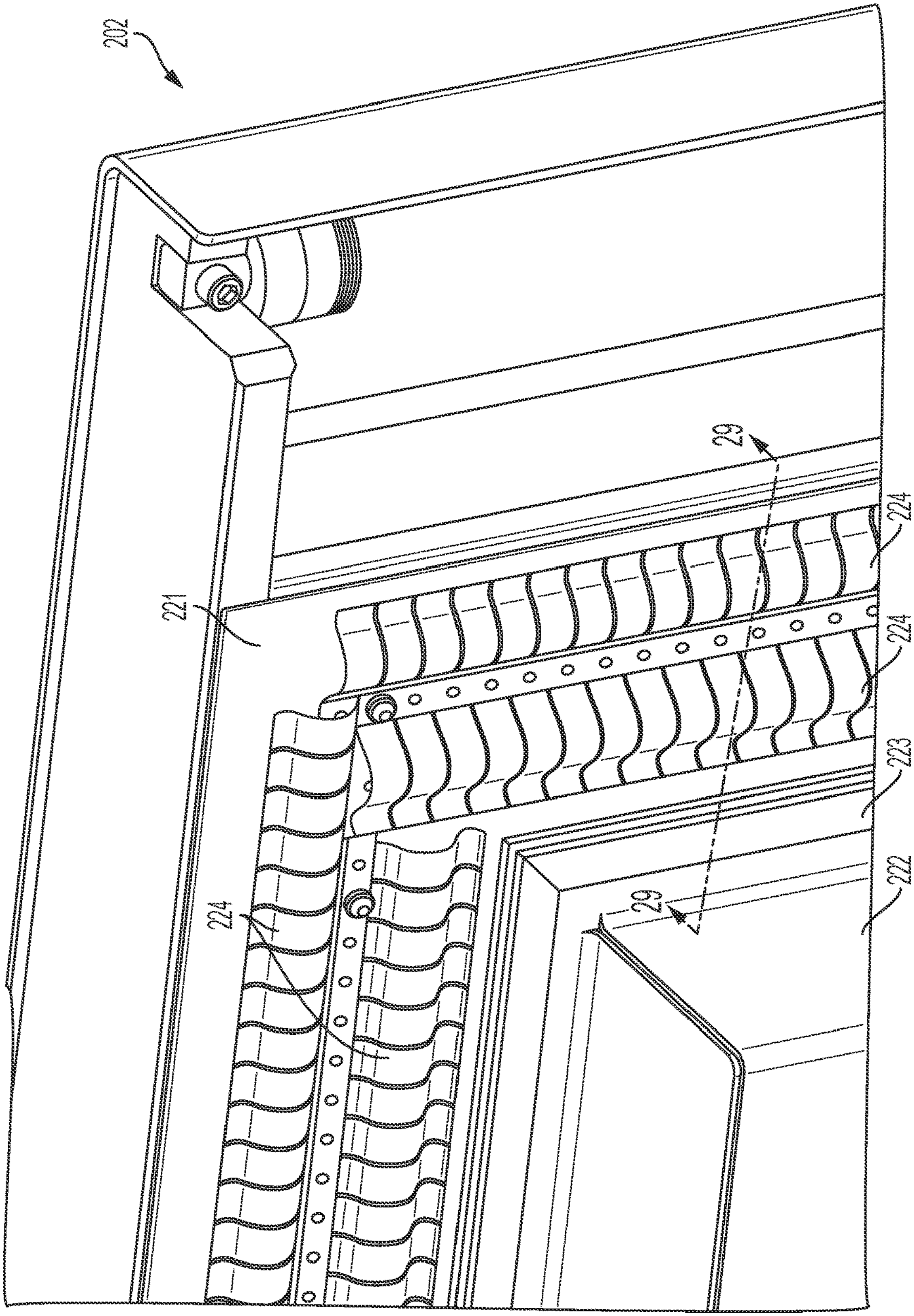
FIG. 28 is an enlarged view of the access door of FIG. 27 within line 28-28 on FIG. 27.
Figure 29:
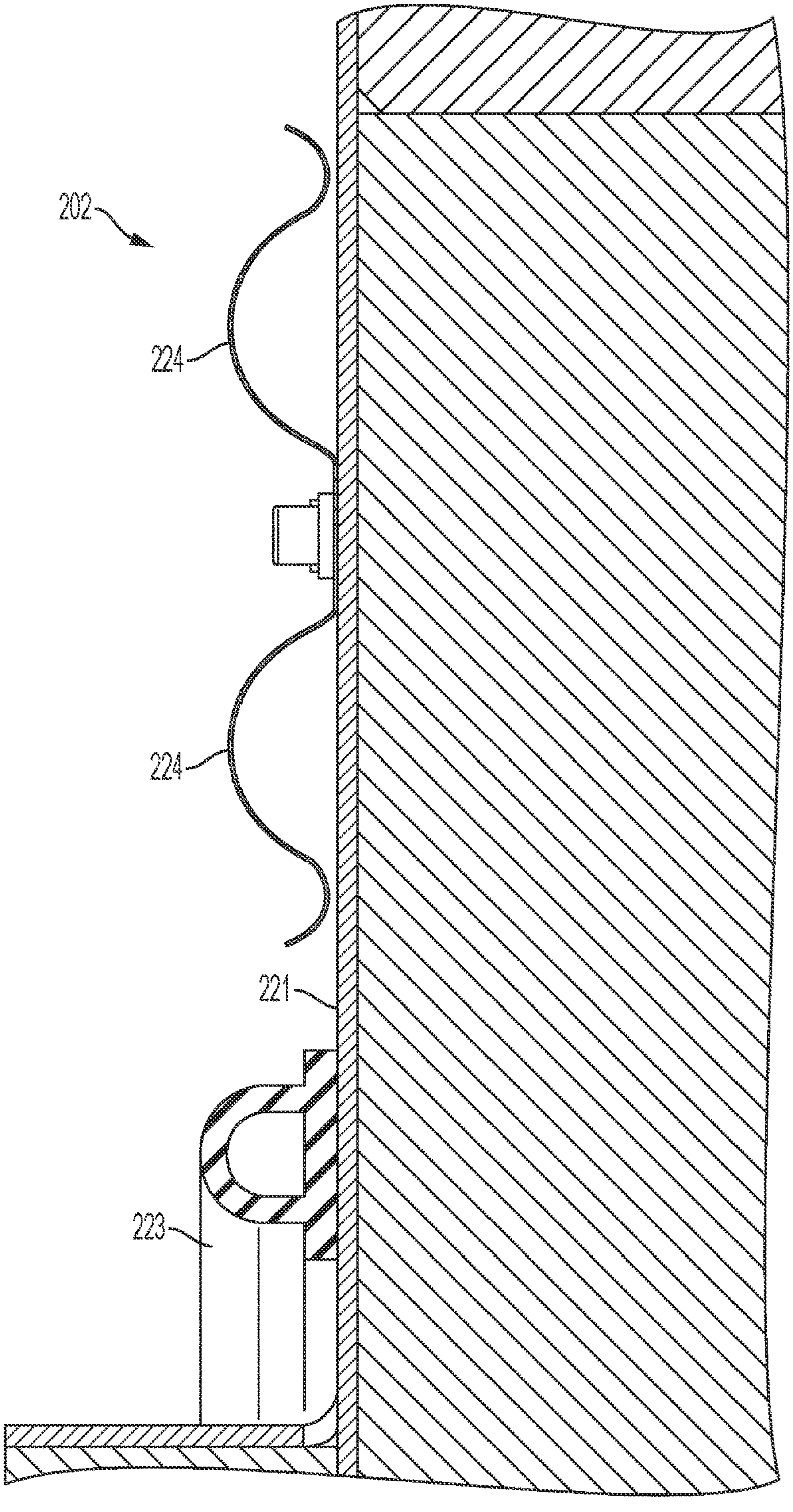
FIG. 29 is a cross-sectional view of the access door of FIG. 27 along line 29-29 on FIG. 28
Figure 30:
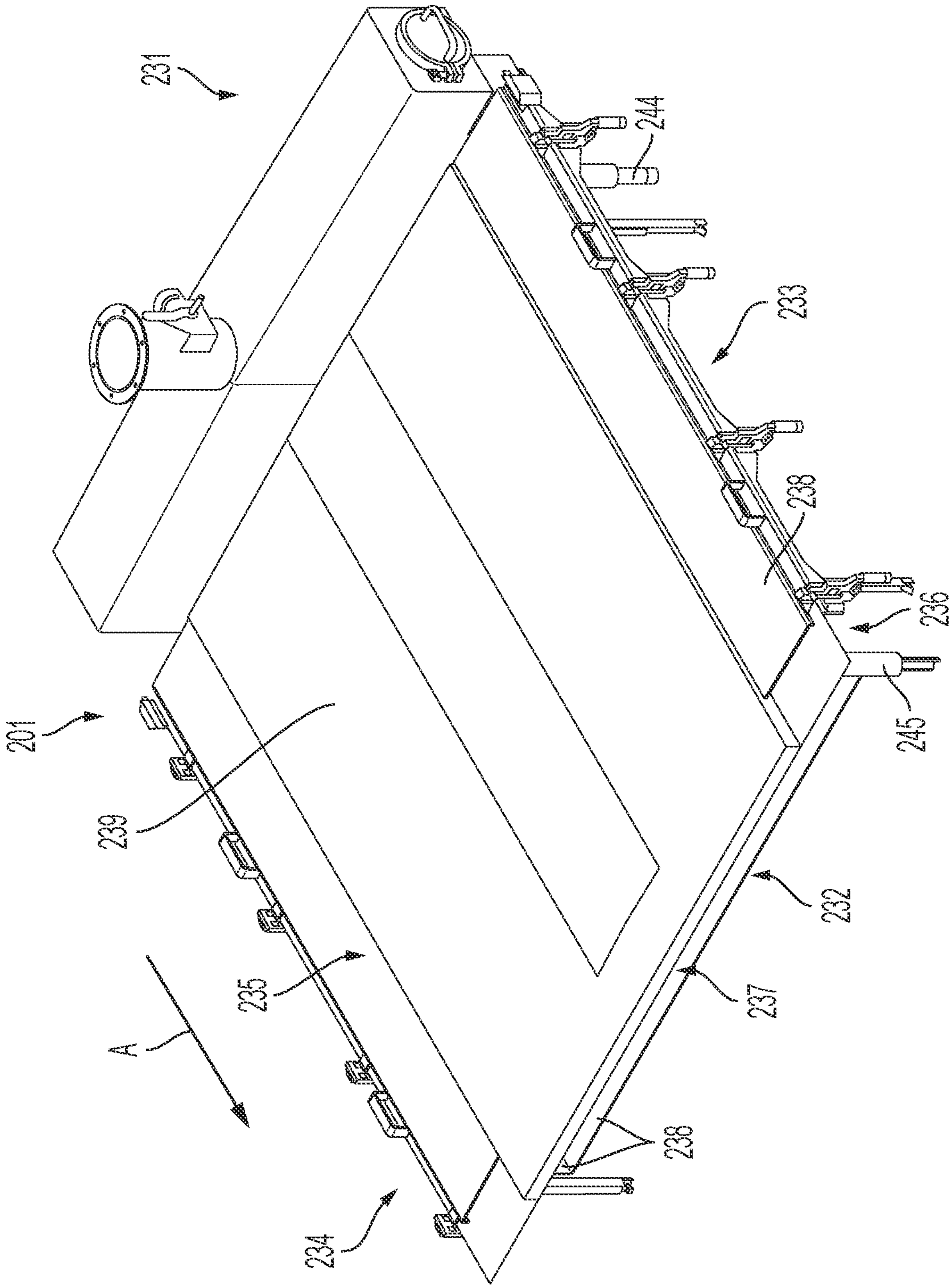
FIG. 30 is a perspective view of a suppression tunnel of the present disclosure. A cover is depicted in a closed position in which other components of the suppression tunnel are covered.
Figure 31:
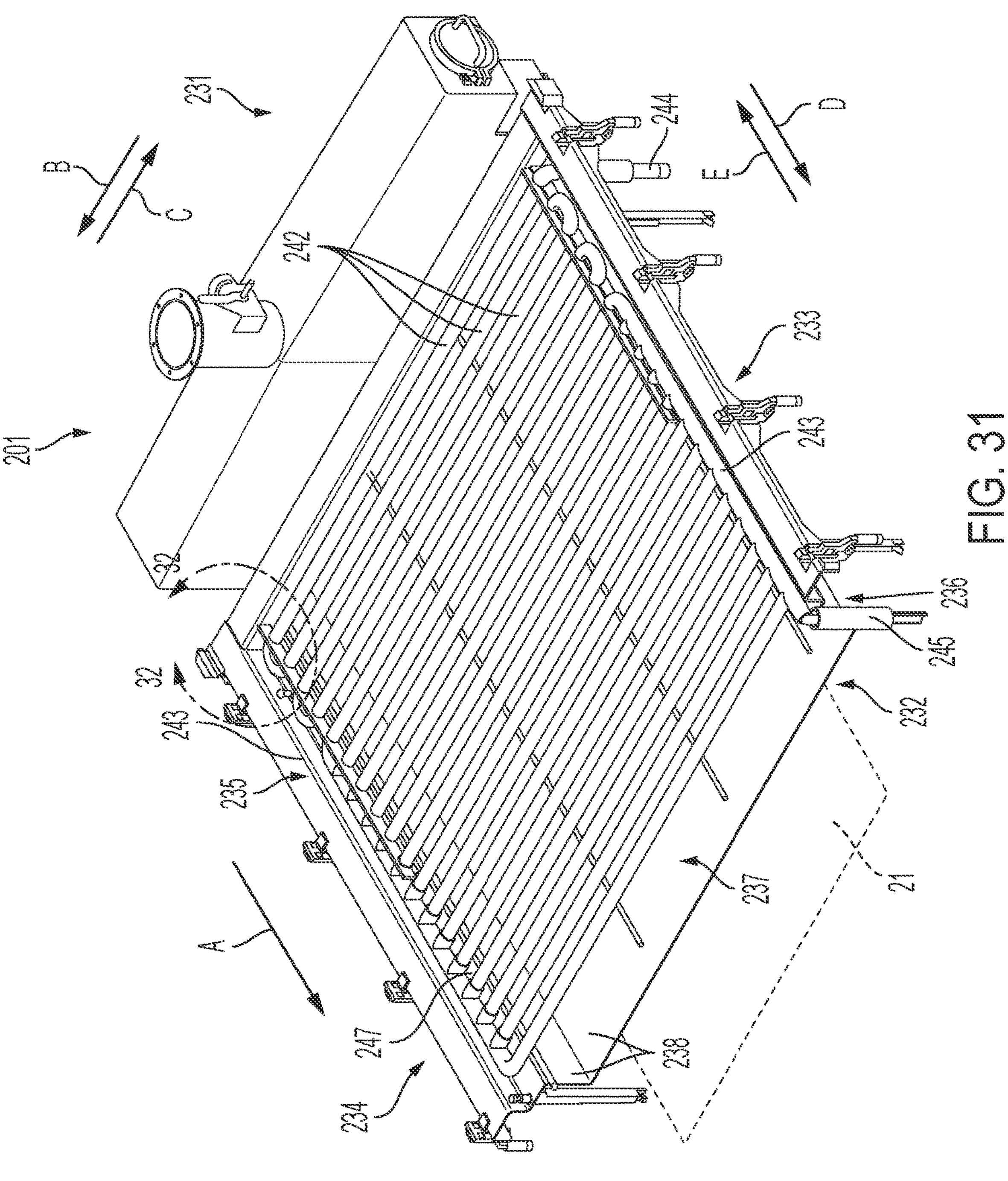
FIG. 31 is another perspective view like FIG. 30 with the cover depicted in an open position thereby exposing components of the suppression tunnel.
Figure 32:
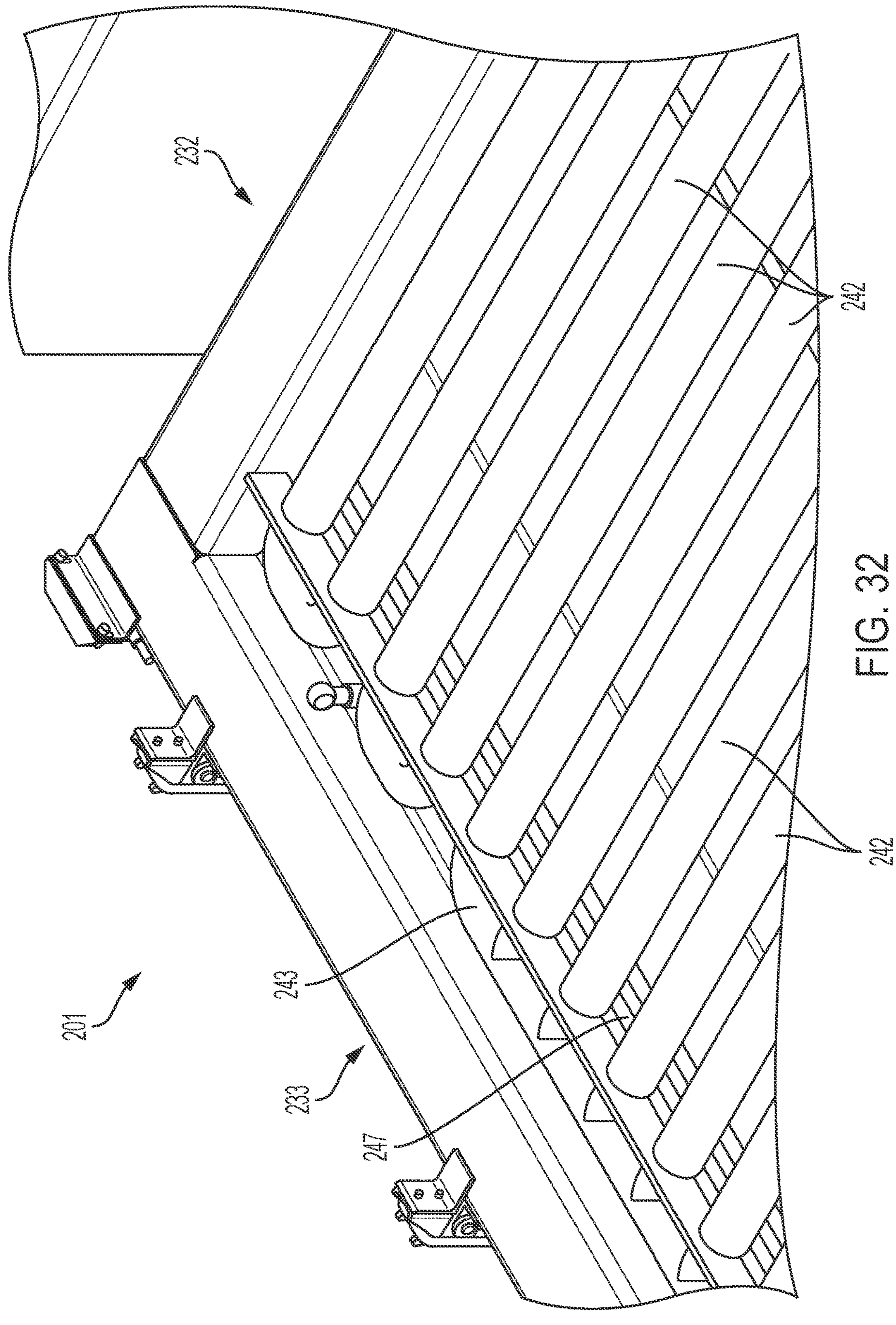
FIG. 32 is an enlarged view of the suppression tunnel of FIG. 30 within line 32-32 on FIG. 31.
Figure 33:
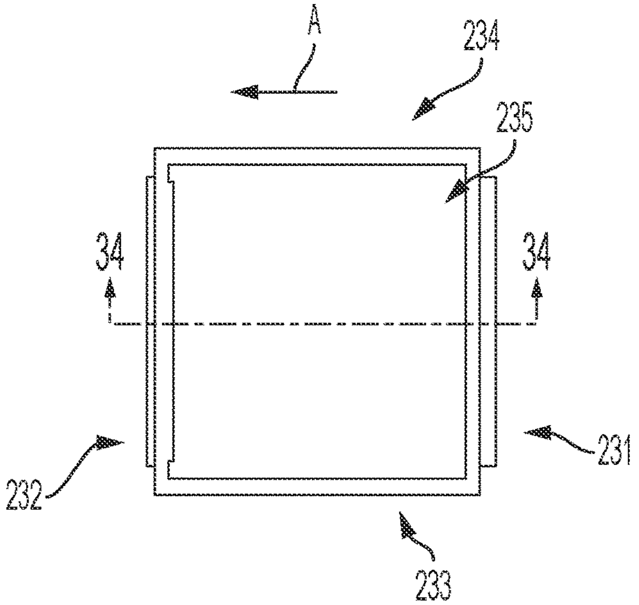
FIG. 33 is a top-down plan view of an example suppression tunnel.

Referring now to FIGS. 27-29, the system 200 can include microwave choke assemblies 204 that are connected to one or more access doors 202 that are operably coupled to the first sidewall 41 and/or the second sidewall 42 (see FIG. 1). The access door 202 permits access into the chamber 47 (FIG. 9). The access door 202 can include microwave absorbing or reflecting materials, however, the joint or space between the perimeter edge of the access door 202 and an opening edge (not depicted) of the sidewall 41 can inadvertently permit microwave energy to leak therethrough. Accordingly, the microwave choke assembly 204 is configured to function as a choke that prevents the microwave energy from leaking from the joint around the access doors 202. The choke assembly can include one or more Raytheon chokes or finger stock strips.

The access door 202 includes a center projection 222 configured to extend into the opening (not depicted) in the sidewall 41, 42 (see FIG. 1). A perimeter surface 221 of the access door 202 surrounds the projection 222. When the access door 202 is closed, the perimeter surface 221 faces and overlaps the sidewall 41 (FIG. 1). A gasket 223 is coupled to the perimeter surface 221, and the gasket 223 encircles the projection 222. The gasket 223 is for contacting the sidewall 41 to thereby form a fluid-tight seal between the sidewall 41 and the access doors 202. One or more microwave chokes, such as finger stock strips 224, are coupled to the perimeter surface 221. The finger stock strips 224 collectively encircle the projection 222. The finger stock strips 224 prevent microwave energy from leaking from the joint around the access door 202. Example finger stock strips are manufactured by Tech-Etch (part number: SS500A).

In certain examples, the system 200 includes perforated panels (not depicted) suspended within the chamber 47 above the belt 21 (see FIG. 9). The perforated panels shield components within the upper half of the chamber 47 from the microwave energy. The panels are removable from the chamber 47 via the access doors 202 for repair, cleaning, and/or replacement. In certain examples, the perforated panels include holes that each have a diameter less than or equal to 6.0 millimeters. In certain examples, the air within the chamber 47 passes through the holes of the perforated panels such that the air is evenly distributed onto the belt 21 therefore the products thereon. In other examples, the system 200 includes faraday cages (not depicted) within the chamber 47 that surround internal components (e.g., sensors, fans) and protect the internal components from microwave energy.

The system 200 can also include linking enclosures 203 between adjacent processing modules 32 (see FIG. 2 for the approximate location of the linking enclosure 203). The linking enclosure 203 extends between the end walls 43, 44 of the adjacent processing modules 32, and the linking enclosure 203 encircles the belt 21. The linking enclosures 203 prevent any microwave energy propagating through the openings 48 (see FIG. 9) from leaking out of the oven 10. Instead, the microwave energy is reflected back into the chamber 47 of the processing module 32 from which the microwave energy propagates or the microwave energy propagates through the linking enclosures 203 into the chamber 47 of the adjacent processing module 32. Thus, in certain examples the linking enclosures 203 can also be configured to permit the microwave energy to pass between the processing modules 32.

The system 200 can also include covers (not depicted) that cover any other opening in the processing module 32 or any equipment coupled to the processing module 32 to thereby prevent leakage of microwave energy that may pass out through or around these components. In one example, the cover could comprise a series of tubes that act as air waveguides having dimensions that are chosen to have a cutoff frequency greater than the microwave energy (e.g., greater than 2450 MHz).

Referring now to FIGS. 30-34, the microwave suppression system 200 includes one or more suppression and/or absorption tunnels 201 that suppression and/or absorb microwave energy that passes through the openings 48 defined in the end walls 43 (see FIGS. 7-8). In the example oven 10 depicted in FIG. 1, a first suppression and/or absorption tunnel 201 is provided with the infeed module 31 and a second suppression and/or absorption tunnel 201 is provided with the outfeed module 33 (see also FIG. 1). Note that suppression tunnel 201 can be provided with other modules that may be located adjacent to the processing modules 32. The present inventors determined that known enclosure devices for absorbing microwave energy were commonly designed for microwave energy having frequency of 915 MHz and the known enclosure devices were inefficient due to the size of the wavelength and insufficient coupling in a responsible length to attenuate the energy to a safe level. Thus, such known enclosure devices would likely need to be very long to absorb microwave energy having higher frequencies (e.g., 2450 MHz). Furthermore, the present inventors recognized that the size of the openings 48 in the end walls 43, 44 influences the amount of microwave energy that may leak from the oven 10. Thus, the present inventors developed the suppression tunnels 201 described herein below that are more efficient, lower cost, and/or have shorter lengths in comparison to known suppression enclosure devices.

Figure 34:
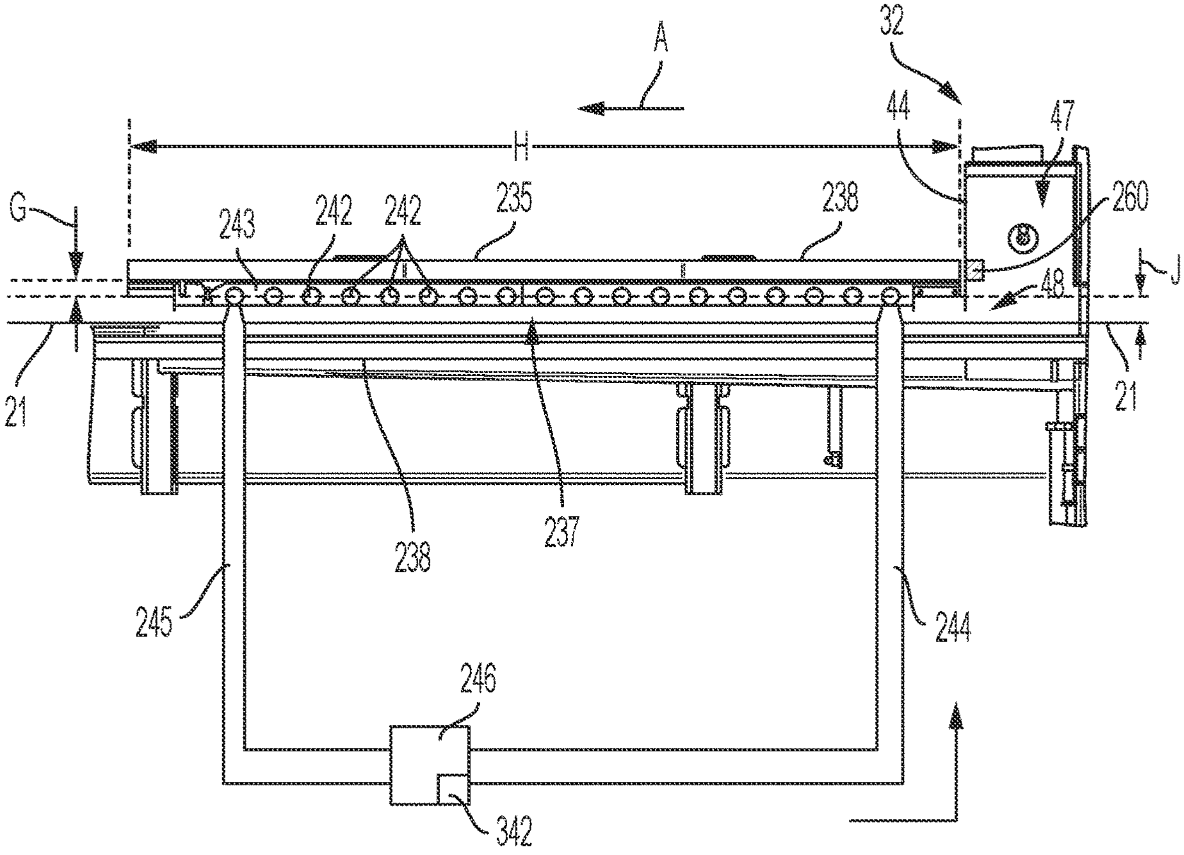
FIG. 34 is a cross-sectional view of the suppression tunnel of FIG. 33 along line 34-34 on FIG. 33.

The tunnel 201 of the present disclosure includes a first end 231 that is adjacent to the opening 48 (see FIG. 9), an opposite second end 232, a first side 233, an opposite second side 234, a top 235, an opposite bottom 236. The tunnel 201 defines a passageway 237 through which the belt 21 extends and the food products are conveyed. Enclosure panels 238 from the shape of the tunnel 201, and one or more of the panels 238 are coupled to the end wall 44 (note that FIG. 34 depicts the end wall 44 spaced apart from the panels 238 for clarity). The panels 238 constrain the microwave energy in the passageway 237 as the microwave energy moves in a direction away from the opening 48 (note that in the example depicted in FIG. 34 the microwave energy generally moves in the direction of conveyance noted by arrow A). Note that the conveyor 20 and belt 21 extend through the passageway 237 and in the direction of conveyance (arrow A). An operable cover 239 is coupled to the top 235 and permits access to the passageway 237. Note that in certain examples, an actuator (not depicted; e.g., gas spring assist device) assists an operator in moving the cover 239 to gain access to the pipes 242, 243 and the belt 21. A latch (not depicted) is used to lock the cover 239 in a closed position.

A pipe assembly 240 is located within the passageway 237. The pipe assembly 240 includes a plurality of cross pipes 241 that extend between the sides 233, 234 of the tunnel 201 (see first direction B and second direction C). The cross pipes 241 terminate at and are connected to end pipes 242 that extend between the ends 231, 232 of the tunnel 201 (see third direction D and fourth direction E) and are positioned along the sides 233, 234 of the tunnel 201. Note that the end pipes 243 extend along the belt 21 and in a direction parallel to the direction of conveyance (arrow A, e.g., the direction of conveyance). The cross pipes 241 extend transverse to the belt 21 and in the direction of conveyance (arrow A). The end pipes 243 can be supported on lips 247 (FIG. 31) that extend into the passageway 237 such that the cross pipes 242 are supported above the belt 21 and lie in a plane that is generally parallel to the belt 21. An inlet pipe 244 is connected to one of the end pipes 243, and an outlet pipe 245 is connected to one of the end pipes 243.

The cross pipes 242 are consistently spaced apart from each other, and in one example, the cross pipes 242 are spaced apart at 3.35 inches on-center. In another example, the cross pipes 242 are spaced apart at 3.00 inches on-center. In certain examples, each cross pipe 243 has an interior diameter of approximately 1.25 inches, an outside diameter of approximately 1.34 inches, and a thickness of approximately 0.12 inches. The pipes 242, 243, 244, 245 can be formed of any suitable material such as polypropylene, UHMW/PE, PTFE, and/or Polycarbonate. Note that in certain examples, the pipes 242, 243, 244, 245 have a non-black color so as to avoid absorption of the microwave energy by the material of the pipes. Instead, the microwave energy is absorbed by the coolant within the pipes.

A refrigeration system 246 (see FIG. 34) is connected to the inlet pipe 244 and the outlet pipe 245 such that the refrigeration system 246 circulates coolant through the pipes 242, 243, 244, 245, as will be described further therein. The refrigeration system 246 and the pipes 242, 243, 244, 245 form a closed-loop fluid circulation path. The refrigeration system 246 can include known components such as pumps, evaporators, condensers, expansion values, cooling coils, chillers, and the like. The refrigeration system 246 can be a stand-alone system (e.g., the refrigeration system 246 is independent of other refrigeration systems of the oven 10 and the surrounding building), or the refrigeration system 246 could be part of a larger refrigeration system of the oven 10 or the refrigeration system of the building in which the oven 10 is located. The flow rate of the coolant circulated by the refrigeration system 246 through the pipes 242, 243, 244, 245 can vary, and in one example the flow rate of the coolant flowing through the inlet pipe 244 and the outlet pipe 245 is 2.0 gallons per minute.

During operation of the oven 10, microwave energy may pass through the opening 48 (see FIG. 34) into the passageway 237. As the microwave energy moves away from the opening 48 and through the passageway 237, the microwave energy passes into the cross pipes 242 and is absorbed by the coolant. The cross pipes 242 are spaced apart from each other based on the frequency of the microwave energy (e.g., microwave energy at 2450 Mhz). The spacing between the cross pipes 242 was determined by the inventors through research, simulation, and experimentation, and in one example, the present inventors determined that the spacing between the cross pipes 242 should be 1.25 times greater than half the free-space wavelength of the microwave energy being emitted into the chamber 47 by the microwave heating system 80 (see FIGS. 1 and 9). The increased spacing relative to half the free-space wavelength of the microwave energy can be determined (at least in part) based on the high dielectric constant of the coolant flowing through the cross pipes 242. Note that the coolant (e.g., a water-glycol mixture, salt water, propylene glycol water mixture) is a microwave absorptive media used to dissipate the microwave energy power coupling of the microwave energy. Preferably, the coolant is a propylene glycol water mixture due to its approval by the Food and Drug Administration for use in the food industry and its non-corrosive and inert qualities. In one example, the coolant includes water and glycol, and in one specific example, the coolant includes fifty percent water and fifty percent glycol.

The distance (see distance G on FIG. 34) between the panel 238 forming the top 235 of the tunnel 201 and the center axis of the cross pipes 242 and the distance (see distance J on FIG. 34) between the center axis of the cross pipes 242 and the belt 21 can be optimized to reflect the microwave energy into the coolant flowing through the cross pipes 242 and minimize the overall length (see distance H on FIG. 34) of the tunnel. The inventors further observed that the distance (distance G) between the center line of the cross pipes 242 and the panel 238 along the top 235 may cause the microwave energy to be "trapped" above the cross pipes 242 before reflecting back down toward the belt 21. Thus, the coolant in the cross pipes 242 further absorbs the reflected microwave energy. In one example, the distance between the top 235 of the tunnel 201 and each center axis of the cross pipes 242 (distance G) is 1.130 inches and the distance between each center axis of the cross pipes 242 and the belt 21 (distance J) is 3.125 inches.

As the coolant in the cross pipes 242 absorbs the microwave energy, the temperature of the coolant increases. As noted above, the refrigeration system 246 circulates the coolant through the pipes 242, 243, 244, 245, and accordingly, the heated coolant is circulated back to the refrigeration system 246 where the coolant is cooled. The refrigeration system 246 then recirculates the cooled coolant through the pipes 243, 243, 244, 245. The refrigeration system 246 continuously cools the coolant, and thus, the tunnel 201 is capable of continuously absorbing the microwave energy that passes into the tunnel 201.

The present inventor discovered that the cross pipes 242 near the first end 231 of the tunnel 201 absorb more microwave energy than the cross pipes 242 near the second end 232 of the tunnel 201. Accordingly, in certain examples the flow rate of the coolant in the cross pipes 242 near the first end 231 of the tunnel 201 is greater than the flow rate of the coolant in the cross pipes 242 near the second end 232 of the tunnel 201. In one example, the flow rate in the cross pipes 242 near the first end 231 of the tunnel 201 is 2.0 gallons per minute (GPM) and the flow rate of the coolant in the cross pipes 242 near the second end 232 of the tunnel 201 is less than 2.0 GPM (e.g., 0.15 GMP). In one example, the temperature of the coolant entering the inlet pipe 244 is 25.0 degrees Celsius. In other examples, the flow rate is based on the amount of heat absorbed by the coolant. For instance, when the temperature of the coolant entering the refrigeration system 246 is greater than a preselected threshold temperature, the refrigeration system 246 increases the flow rate of the coolant conveyed to the pipe assembly 240 to thereby decrease the temperature of the warmed coolant reentering the refrigeration system 246.

Figure 35:
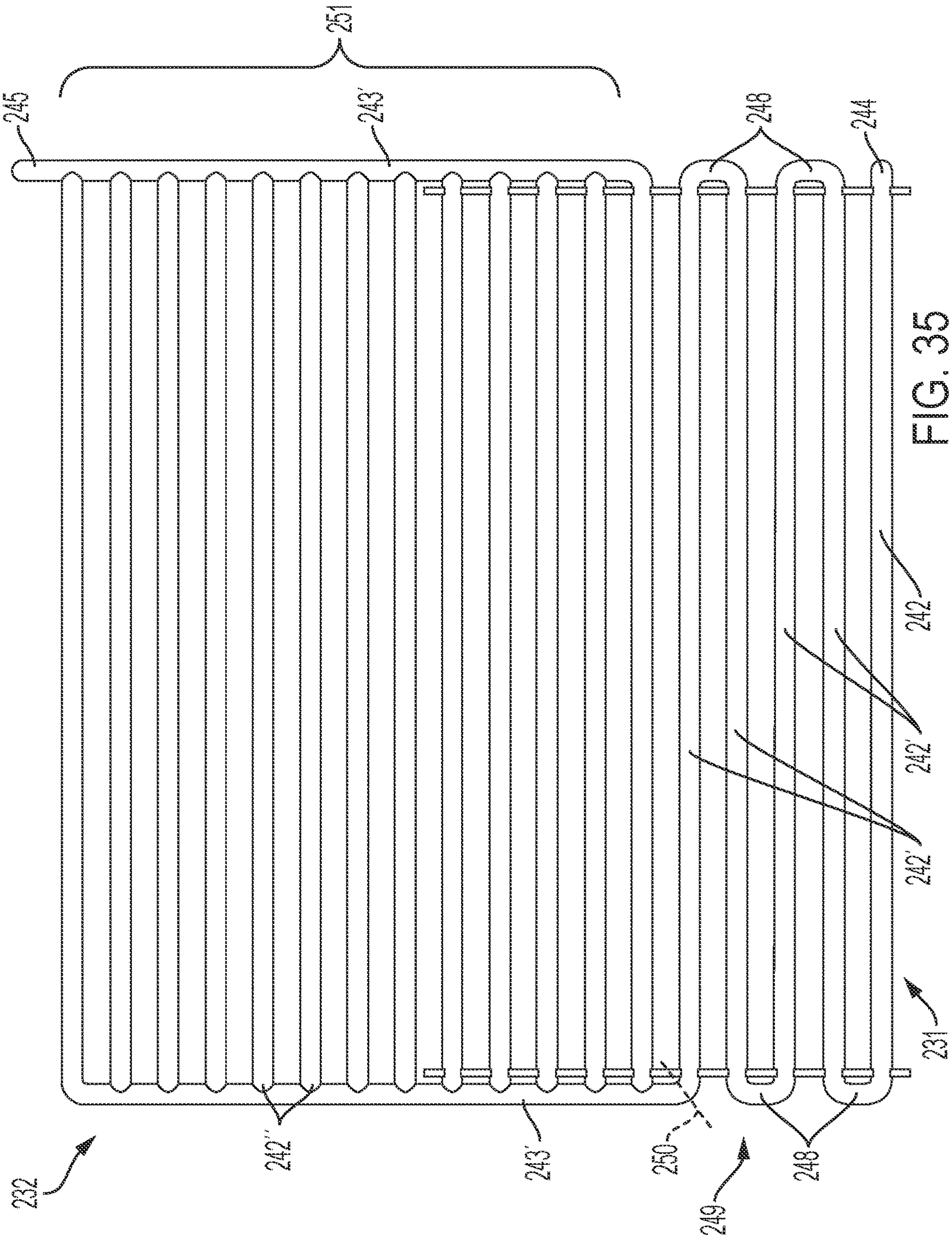
FIG. 35 is a top-down plan view of an example arrangement of pipes of a suppression tunnel of the present disclosure.
Figure 36:
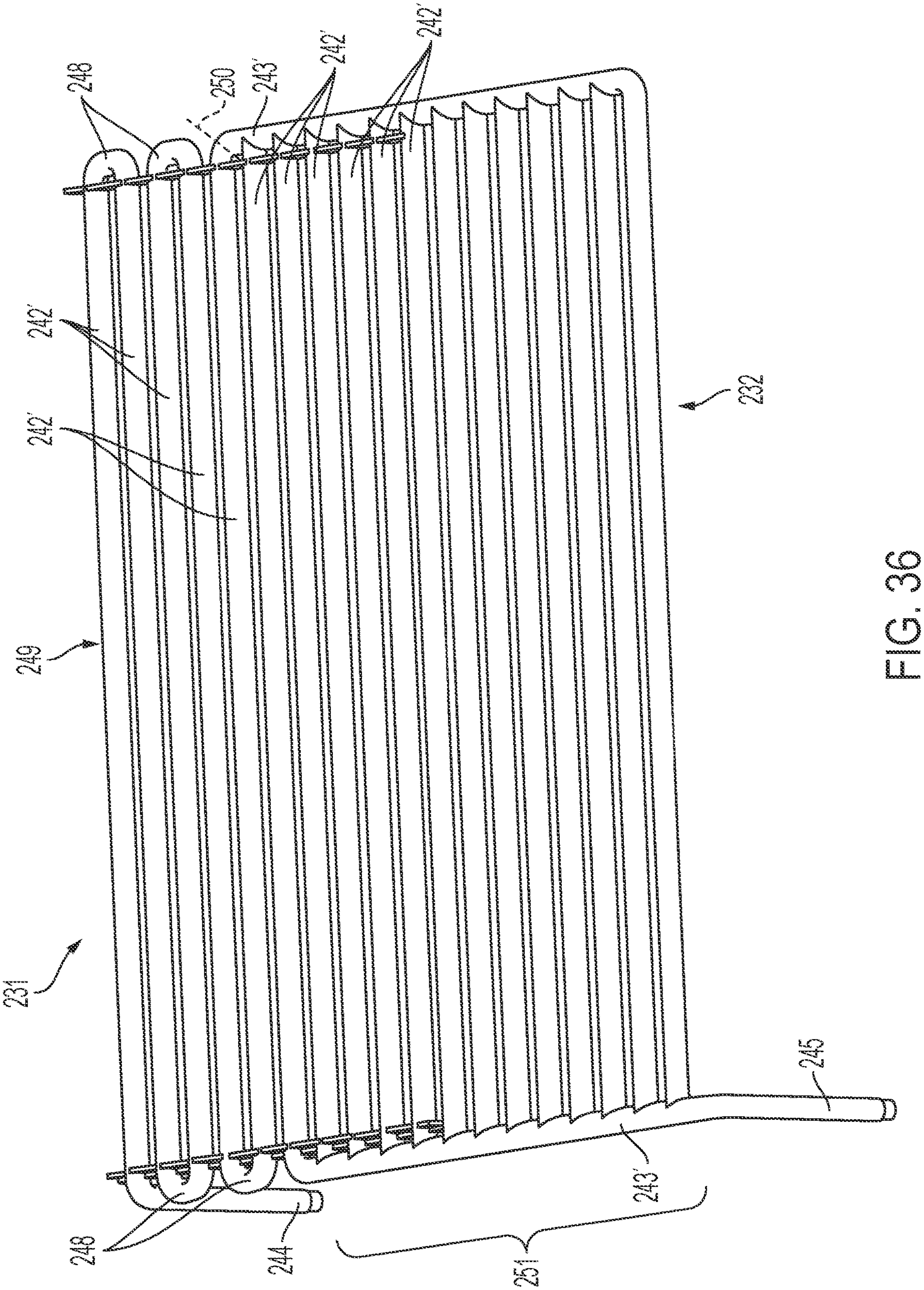
FIG. 36 is a perspective view of the arrangement of pipes of FIG. 35.
Figure 37:
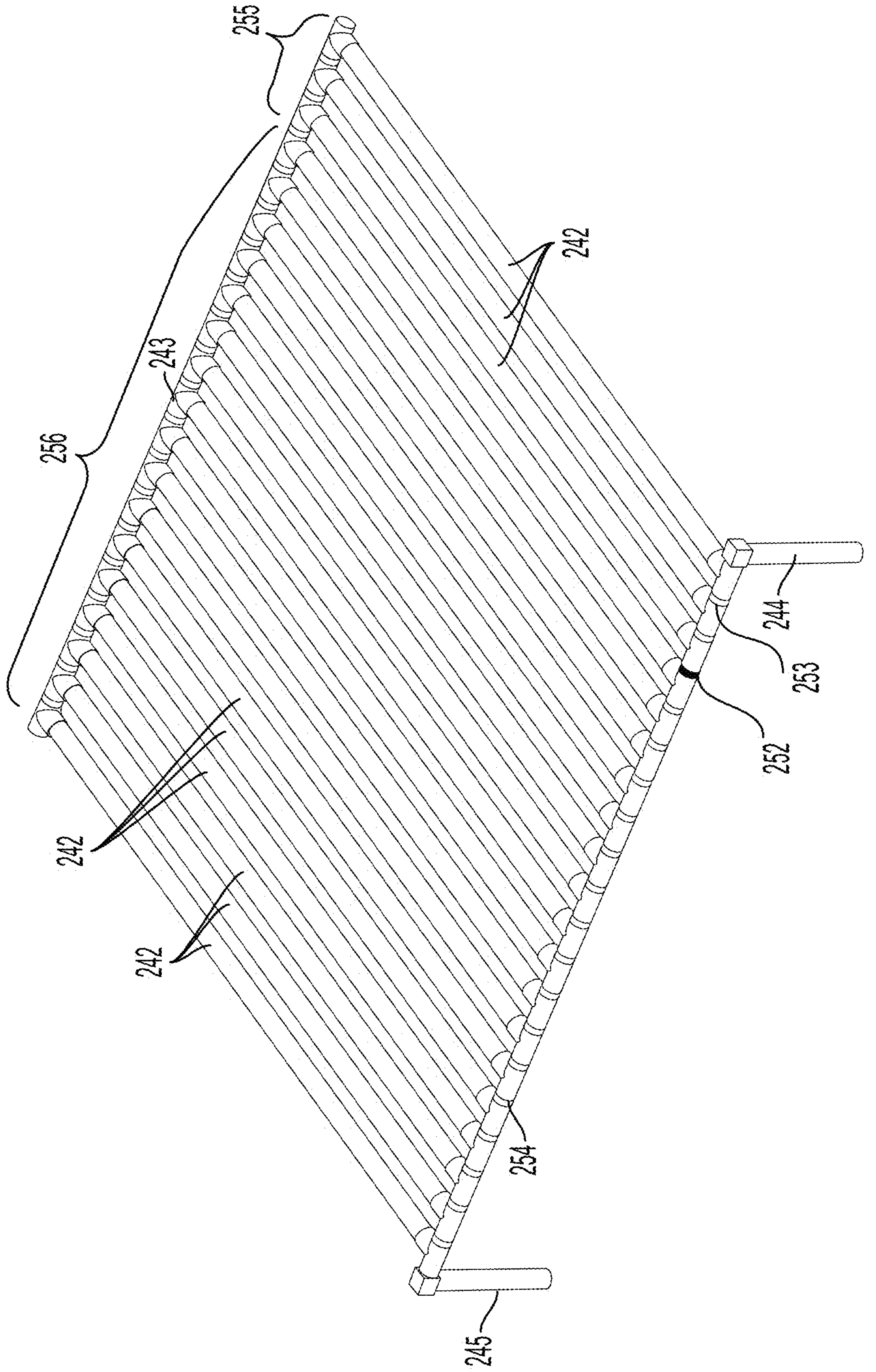
FIG. 37 is a perspective view of another example arrangement of pipes of a suppression tunnel of the present disclosure

Referring now to FIGS. 35-36, in certain examples, the cross pipes 242 are connected to the end pipes 243 to thereby define a flow path that results in greater flow rate of the coolant through the cross pipes 242 near the first end 231 of the tunnel 201 than the flow rate of the coolant through the cross pipes 242 near the second end 232 of the tunnel 201. In the example depicted in FIGS. 35-36, the five cross pipes 242' near the first end 231 of the tunnel 201 are connected to short end pipe segments 248 such that the coolant flows in a generally serpentine flow path 249 through the pipes 242', 248. In one example, the flow rate of the coolant received via the inlet pipe 244 is equal to the flow rate of the coolant flowing in the serpentine flow path 249 and the connected cross pipes 242'. The serpentine flow path 249 terminates at the end pipe 243' (see path break line 250), and the coolant continues to flow toward the outlet pipe 245 in a parallel flow path 251. That is, the coolant flows through any of the cross pipes 242" and/or the end pipes 243', 243" to the outlet pipe 245. The flow rate of the coolant flowing along the cross pipes 242" will be less than the flow rate of the coolant flowing along the cross pipes 242' in the serpentine flow path 249. Thus, the coolant flows faster through the cross pipes 242' than the coolant flowing through the other cross pipes 242". The present inventors observed that the coolant in the cross pipes 242 near the first end 231 absorb a large number of microwaves because of the proximity of these cross pipes to the first end 231 (in comparison to the cross pipes 242 in the middle or near the second end 232 of the tunnel). Thus, a greater flow rate of coolant through the serpentine flow path 249 (in comparison to the flow rate of coolant through the parallel flow path 251) is needed to help quickly convey coolant warmed in the serpentine flow path 249 downstream and thus introduce new, cooler coolant into the serpentine flow path 249 to absorb additional microwave energy. In one example, the pressure of the coolant at the inlet pipe 244 is 122.0 N/m2 and the pressure of the coolant at the outlet pipe 245 is 23.0 N/m2 (i.e. a 99.0 N/m2 pressure drop). In one example, the temperature of the coolant at the inlet pipe 244 is 25.0 degrees Celsius and the temperature of the coolant at the outlet pipe 245 is 36.0 degrees Celsius (i.e. a 11.0 degrees Celsius increase in temperature) FIG. 37 depicts another example arrangement of the cross pipes 242 and the end pipes 243. In this example, a cap 252 separates one of the cross pipes 242 into a first section 253 and a second section 254 such that coolant flows along a first parallel pipe flow path 255 at a first flow rate and further along a second parallel pipe flow path 256 at a second flow rate that is less than the first flow rate.

Referring back to FIG. 34, in certain examples a device 260 is positioned in the chamber 47 at the opening 48 and is for coupling the microwave energy passing through the opening 48. This device 260 increases the microwave energy absorbed by the tunnel 201 (described above). Note that the device 260 can be a panel.

Figure 25:
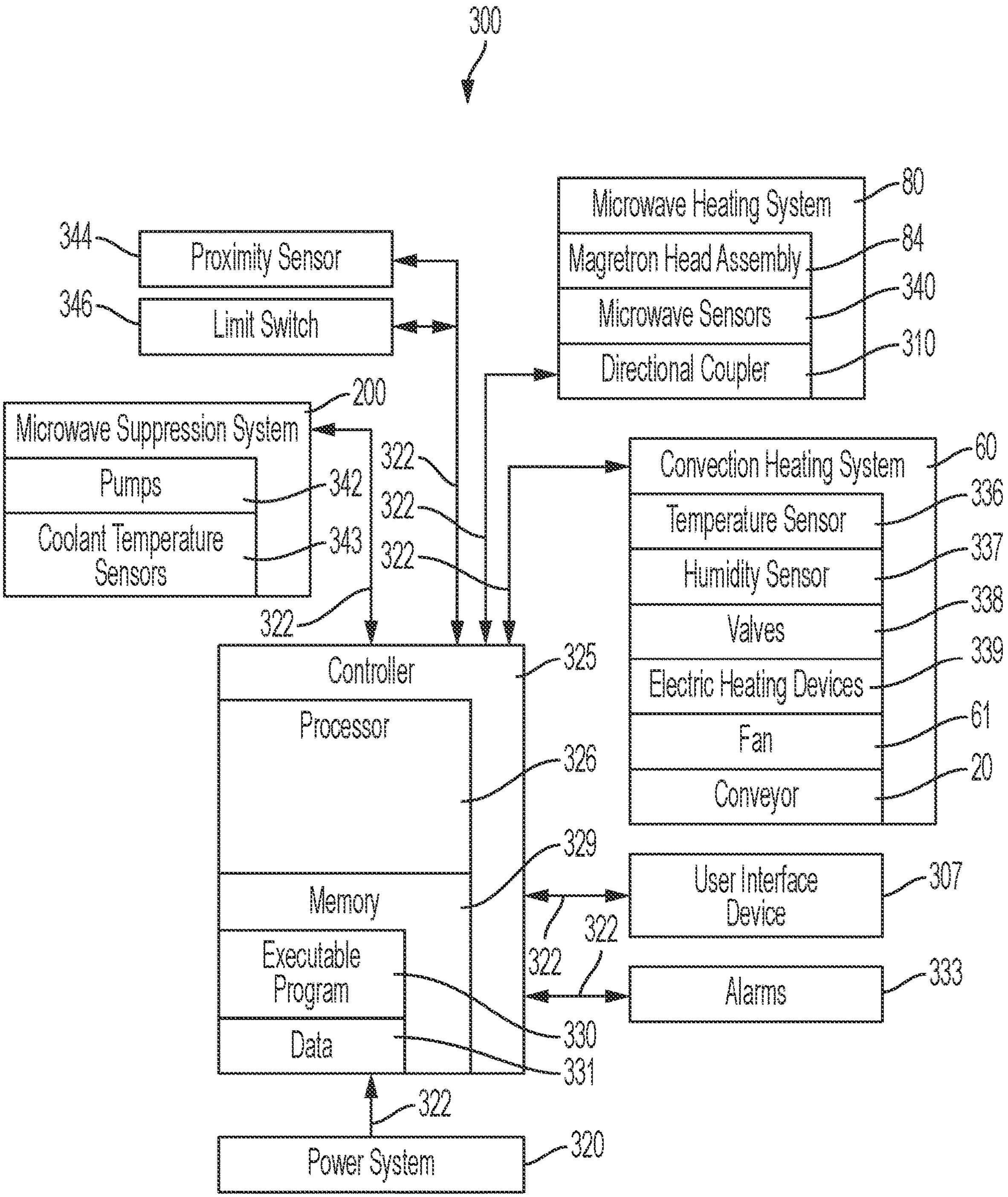
FIG. 25 is a schematic diagram of an example control system of an example oven.

Referring now to FIG. 25, an example control system 300 of the oven 10 (FIG. 1) is depicted. The control system 300 is for controlling the operation of the oven 10 and the various components, systems, and features noted above and described below. The control system 300 can include various components, modules, and/or subsystems, some of which are described herein below. In the example depicted in FIG. 25, the control system 300 includes a controller 325 that controls the oven 10. In one specific example, the controller 325 is a programmable logic controller (PLC).

The controller 325 receives power from a power system 320, which in certain examples includes an electrical connection to the power systems of the facility or building in which the oven 10 is assembled, batteries, and/or other energy storage systems known in the art. The power system 320 can also provide power to other components of the oven 10.

The controller 325 includes a processor 326, which may be implemented as a microprocessor or the circuitry, or be disturbed across multiple processing devices or sub-systems that cooperate to execute an executable program 330 from a memory 329. Note that the example depicted in FIG. 25 includes one controller 325 in association with other components of the oven 10. However, other configurations of the control system 300 are possible including configurations having multiple controllers or sub-controllers. Note that the controller 325 can be located anywhere on the oven 10.

The memory 329 can include any storage media readable by the processor 326 and capable of storing the executable program 330 and/or data 331. The memory 329 may be implemented as a single storage device, or be distributed across multiple storage devices or sub-systems that cooperate to store computer readable instructions, data structures, program modules, or other data.

Peripheral devices, such as user interface devices 307, and output devices such as alarms 333 (e.g., audible alarms, visual light alarms), are in communication with the controller 325 (described further herein). In practice, the processor 326 loads and executes an executable program 330 from the memory 329, accesses data 331 stored within the memory 329, and directs the oven 10 to operate as described in further detail below. Furthermore, additional systems of the oven 10 or components related to the oven, the cooling system 50, the infeed machines 25, a belt washing system 140 (described herein below), and clean-in-place (CIP) system 150 (described herein below), can be in communication with the controller 325.

The control system 300 communicates with the systems and/or components of the oven 10 via communication links 322, which can be any wired or wireless links. The illustrated communication links 322 between functional and logical block components are merely exemplary, which may be direct or indirect, and may follow alternate pathways. In one example, the communication link 322 is a controller area network (CAN) bus; however, other types of links could be used.

As will be discussed further below, the control system 300 communicates with the user interface device 307 that is configured to receive input data from the operator and/or a remote device via a network (not depicted). The user interface device 307 is also capable of displaying data and other information (e.g., maintenance alerts) to the operator. The user interface device 307 can be any suitable device such as a touch screen or a peripheral computer. The control system 300 also communicates and/or receives data from the various systems of the oven 10, such as the processing module 32, the convection heating system 60, the microwave heating system 80, and the microwave suppression system 200, and components thereof (e.g., directional coupler 310, sensors). Note that while some of the components described herein below are depicted in FIG. 25 as part of various systems (e.g., the convection heating system 60), the components can be independent of the systems or part of different systems.

The convection heating system 60 can include a temperature sensor 336 for sensing the temperature within the chamber 47 of the processing module 32. The temperature sensor 336 can be any suitable sensor, and in one example, the temperature sensor 336 is manufactured by SensorTec Incorporated. The temperature sensor 336 is preferably a dry bulb temperature sensor that senses the dry bulb temperature within the chamber 47. The temperature sensor 336 is configured to send temperature data to the controller 325. Note that any number of temperature sensors 336 may be utilized with the oven 10.

A humidity sensor 337 is included for sensing the humidity of the air within the chamber 47 of the processing module 32. The humidity sensor 337 can be any suitable sensor, and in one example, the humidity sensor 337 is manufactured by Humidity 2 Optimization (e.g., DMC 300 series sensor, DMC303STD). The humidity sensor 337 is configured to send humidity sensor data to the controller 325. In one example, the humidity sensor 337 senses characteristics (e.g., humidity) of the air within the chamber 47 and communicates the humidity sensor data to the controller 325. In this example, the humidity sensor data includes data related to the mass per unit volume (e.g., grams per cubic meter) of water or percent volume of water in the air within the chamber 47. In another example, the humidity sensor 337 sends a 4.0 mA to 20.0 mA analog signal to the controller 325, and the controller 325 determines a percent volume of water in the air in the chamber 47. In this example, the controller 325 determines the percent volume of water in the air by processing the analog signal from humidity sensor 337 with equations or algorithms stored on the memory 329. The controller 325 could alternatively compare the analog signal to a lookup table and thereby determine the percent volume of water in the air from the lookup table.

Once the controller 325 determines the percent volume of water in the air within the chamber 47, the controller 325 may display the percent volume of water in the air to the operator via the user interface device 307 and/or control various functions of the oven 10 based on the percent volume of water in the air. The controller 325 could further determine other characteristics of the air within the chamber 47 based on the determined percent volume of water in the air using equations or algorithms stored on the memory 329 such that the oven 10 can be further controlled. For instance, the controller 325 could determine wet bulb temperature, the relative humidity, and/or the dew point based on the determined percent volume of water in the air and/or additional data, such as atm pressure, temperature, vapor pressure, saturation pressure, and/or the like. Note that some of the additional data noted above could be sensed by other sensors or entered into the controller 325 by the operator during calibration of the oven 10.

In other examples, the humidity sensor data includes data corresponding to the absolute humidity of air within the chamber 47. The controller 325 displays humidity sensor data and/or uses the humidity sensor data to further control operation of the oven 10. The controller 325 can further process the humidity sensor data with algorithms and/or formulas to thereby determine the other characteristics or properties of the air within the chamber 47, such as the wet bulb temperature of the air within the chamber 47. The present inventors have recognized that in certain examples, calculating characteristics of the air in the chamber 47, such as dry bulb temperature, wet bulb temperature, or absolute humidity, based on (or at least in part) the percent volume of water in the air in the chamber 47 often provides increased accuracy (in comparison to other devices and methods for determining characteristics of the air in the chamber 47) due to the temperature limits on other conventional humidity sensors.

Operable valves 338 are for controlling (indirectly or directly) heat and moisture (steam) provided to the processing module 32 to thereby change the temperature and humidity of the air within the chamber 47, respectively. In an example in which the convection heating system 60 uses gas flame heating, a valve 338 is configured to control flow of the propane or natural gas which is burned to thereby control the heat provided to the oven 10. In another example in which the convection heating system 60 uses thermal oil or steam supplied by the facility, a valve 338 is configured to control flow of the oil or steam that flows through coils in the oven 10 to thereby control the heat provided to the oven 10. In another example, a valve 338 is configured to control flow of steam into the chamber 47 to thereby control moisture and humidity in the chamber 47.

The controller 325 receives valve data from valves 338, and the valve data corresponds to the status of the valve 338 (e.g., open, closed, percent open). The controller 325 further outputs control signals to the valves 338 to thereby control operation of the valves 338 (e.g., the controller 325 sends a control signal to the valves 338 to thereby close the valves 338). Example methods of operating the valves 338 are described further herein. Note that in another example in which the convection heating system 60 utilizes electric heating devices 339, the controller 325 is in communication with the electric heating devices and controls the electric heating devices to heat the oven 10. The electric heating device can be any suitable device, and in one example, the electric heating device includes inductive heating elements.

The controller 325 is in communication with the fan 61 (FIG. 9) and thereby controls the speed of the fan 61. The controller 325 sends control signals to the fan 61 and the controller 325 can also receive fan speed data from the fan 61. The controller 325 is also in communication with the conveyor 20 and controls the speed of the belt 21. The controller 325 sends control signals to the conveyor 20 to thereby control motors or drives (e.g., variable frequency drive) that drive the belt 21. The controller 325 can also receive belt speed data from the conveyor 20. The belt speed data can include: data pertaining to the output of the motor that further corresponds to the belt speed; data corresponding to the speed of the belt 21 based on encoders in the belt 21; and/or data from a control system (not depicted) of the conveyor 20 (e.g., the control system of the conveyor 20 could send data corresponding to the speed of the belt 21 feet per minute directly to the controller 325). In another example, the belt speed selected or inputted by the operator is related to a frequency at which a variable frequency drive operates (e.g., the belt speed is selected by selecting a frequency in the range of 20.0-60.0 Hertz). In this example, a selected frequency correlates to the desired belt speed.

The microwave generating device (e.g., magnetron 81) is in communication with the controller 325 such that operation of the microwave generating device and thereby the microwave energy generated can be controlled (described further herein). The microwave heating system 80 can include microwave sensors 340 configured to sense microwave energy propagating through the waveguide assemblies 90 (FIG. 10), in the chamber 47 (FIG. 9), and/or from the oven 10 into the exterior space around the oven 10. The microwave sensors 340 provide microwave data to the controller 325 that corresponds to the amount of microwave energy within the chamber 47. The controller 325 can process the microwave data and/or provide control signals to the microwave generating device to thereby adjust microwave energy emitted into the chamber 47. The directional coupler 310 is in communication with the controller 325, and the directional coupler 310 also provides microwave data to the controller 325. Note that while the microwave sensor 340 are depicted in FIG. 25 as part of the microwave heating system 80, in other examples, the microwave sensor(s) 340 can be independent from the microwave heating system 80. Also note that any number of microwave sensors 340 may be utilized with the oven 10. In another example, the operator selects a preprogrammed microwave energy power level (e.g., levels 0-10) that corresponds to a specific percent of the maximum energy output of the microwave generating device. For instance, when the operator selects "Level 5", the controller 325 will control the microwave generating devices such that the microwave generating devices output 50.0% of the maximum energy output. Note that the microwave energy power level can be part of the recipe (noted below) for cooking the food products.

The oven 10 can include one or more sensors, such as proximity sensors 344, for sensing presence of the infeed module 31 and/or the outfeed module 33 adjacent to the processing module 32. Note that the infeed module 31 or the outfeed module 33 include microwave suppression tunnels 201. When the proximity sensors 344 sense the presence of the infeed module 31 and/or the outfeed module 33, the proximity sensors 344 send proximity signals or data to the controller 325 that corresponds to the presence of the infeed module 31 and/or the outfeed module 33 and thus the presence of the corresponding suppression tunnels 201. Accordingly, the controller 325 determines that the microwave heating system 80 can be operated because the suppression tunnels 201 are present and can therefore absorb microwave energy that may leak from the oven 10. If however, the proximity sensors 344 do not sense the presence of the infeed module 31 and/or the outfeed module 33, the proximity sensors 344 do not send proximity data to the controller 325 and the controller 325 determines that the infeed module 31 and/or the outfeed module 33 are not present. This is an indication that the suppression tunnels 201 are not in place and therefore, the controller 325 prevents the microwave heating system 80 from generating microwave energy to protect the operator from being exposed to potentially harmful microwave energy. Note that in certain examples, the proximity sensors 344 are substituted with limit switches 348 that are configured to determine presence of the infeed module 31 and/or the outfeed module 33 and generate the proximity data noted above.

In certain examples, the controller 325 can be in communication with components of the microwave suppression system 200. In one example, the controller 325 is in communication with pumps 342 that pump coolant through the suppression tunnels 201. The pumps 342 may output signals to the controller 325 that correspond to the operational status of the pumps 342, i.e. ON or OFF. If the pumps 342 are OFF, the controller 325 could turn off components of the microwave heating system 80 and/or alert the operator via the alarms 333. In another example, the controller 325 is in communication with coolant temperature sensors 343 that sense the temperature of the coolant as the coolant absorbs microwave energy. The coolant temperature sensors 343 send data to the controller 325 and accordingly, the controller 325 may prevent the microwave heating system 80 from operating or reduce the microwave energy emitted into the chamber 47 if the temperature of the coolant is above a predetermined maximum coolant temperature.

As noted above, the user interface device 307 receives input data from the operator. The inputs received may be related to specific operations of the oven 10 and/or components thereof. For example, the operator may input data corresponding to a desired temperature within the oven 10. The controller 325 processes the data and controls the convection heating system 60 to thereby adjust the temperature within the oven 10. The temperature sensors 336 can provide feedback signals to the controller 325 such that that controller 325 further controls the convection heating system 60. In other examples, the operator inputs data corresponding to a desired belt speed. Accordingly, the controller 325 processes the data and controls the conveyor 20 accordingly.

The operator can enter a recipe into the controller 325. The recipe includes cooking input data for processing the food product conveyed through the oven 10. Operating the oven 10 according to the recipe will result in the food products being cooked to a desired specification. The recipe can include input data corresponding to cooking time, belt speed, fan or blower speed, temperature within the processing module 32 (FIG. 1), humidity within the processing module 32 (FIG. 1), microwave energy power level, and the like.

The recipe can also be pre-saved onto the memory 329 such that an operator simply selects a recipe via the user interface device 307. Note that other inputs related to operation of specific components of the oven 10 and/or the recipe itself can be transmitted to the controller 325 over a network (not depicted) from a remote computer, cellular phone, control panel, and/or terminal. Further note that one or more recipes can be stored on the memory 329 such that the operator can select the desired recipe. In certain examples, the recipe includes cooking data for operating multiple processing modules 32. In certain examples, a single recipe is used for controlling each processing module 32 of the oven 10. In other examples, the recipe includes different cooking data for each processing module 32 of the oven 10.

Figure 26:
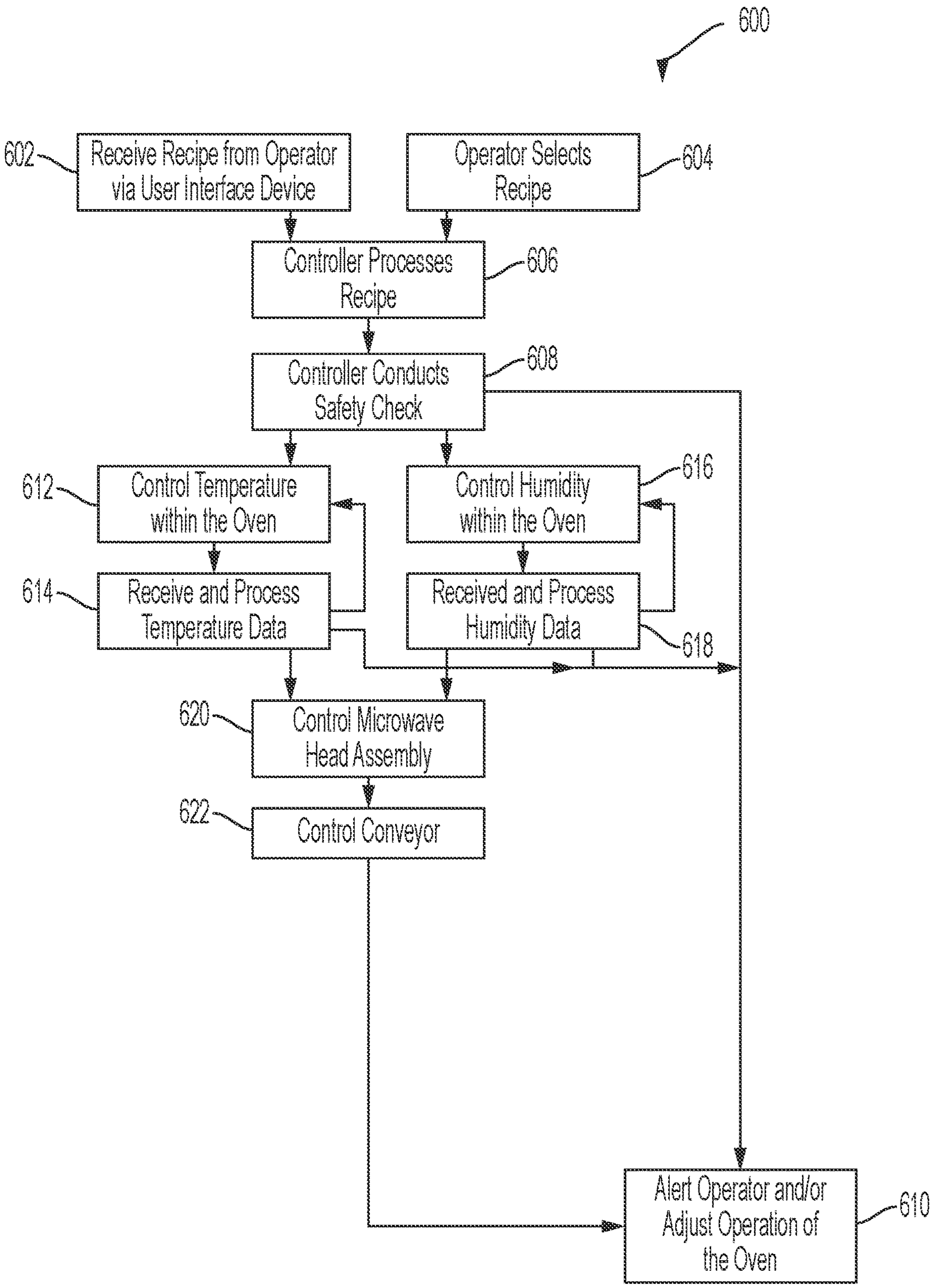
FIG. 26 is a schematic diagram of an example method.

Referring now to FIG. 26, an example method 600 for controlling operation of the oven 10 (FIG. 1) is depicted. Note that the components mentioned in this method are depicted in FIG. 25. The method begins with receiving a recipe from the operator (as shown at 602) or the operator selecting a recipe stored on the memory 329 (as shown at 604). At 606, the controller 325 processing the data of the recipe to begin operation of the oven 10. Note that the method may move to the next step of method depicted at 606 immediately or after a preselected amount of time. Note that a timer (not depicted) may be included in the controller 325.

At 608, the controller 325 conducts a safety check of the oven 10 by reviewing inputs from different components of the oven 10 and/or sending signals to different components of the oven 10. The safety check can include one or more steps and an example safety check sub-method is described hereinbelow. In this example, the controller 325 determines the status of the microwave generating device (e.g., if the microwave generating device is generating microwave energy) by processing signals from the microwave generating device. If the controller 325 determines that the microwave generating device is ON (and generating microwave energy), the controller 325 alerts the operator and/or adjusts operation of the oven 10 as depicted at 610. The manner in which the controller 325 adjusts operation of the oven 10 can vary and may include turning off the microwave heating system 80, slowing down the speed of the belt 21, and the like. Thus, the operator can inspect the microwave generating device. If the controller 325 determines that the microwave generating device is OFF (and therefore not generating microwave energy), the controller 325 proceeds with checking other components of the oven 10.

The controller 325 next determines if the infeed module 31 and/or the outfeed module 33 are properly positioned next to the processing module 32 by processing data from the proximity sensors 344. As noted above, presence of the infeed module 31 and/or the outfeed module 33 corresponds to presence of the suppression tunnels 201 (FIG. 9). If the controller 325 determines that the infeed module 31 and/or the outfeed module 33 are not present, the controller 325 alerts the operator and/or adjusts operation of the oven 10 as depicted at 610. Thus, the operator can inspect the oven 10. If the controller 325 determines that the infeed module 31 and/or the outfeed module 33 are present, the controller 325 proceeds to the next step in the method. Presence of the suppression tunnels 201 prevents the operator from being exposed to high levels of microwave energy if the suppression tunnels 201 are not present.

The controller 325 can also determine if the access doors 202 (FIG. 5) are open or closed based on signals or data from sensors or limit switches connected to or located near the access doors 202. If the controller 325 determines that the access doors 202 are open, the controller 325 will alert the operator and/or stop operation of the oven 10 to prevent harmful microwave energy from reaching the operator. The controller 325 can also determine if the belt 21 is jammed or stuck based on signals or data from the conveyor 20. If the controller 325 determines that the belt 21 is jammed (e.g., a food product is preventing movement of the belt, a hand of operator is trapped in the opening 48) the controller 325 will alert the operator and/or stop operation of the oven 10 prevent harm to the operator.

After the controller 325 clears the safety checks (as depicted at 608) and thereby determines that the oven 10 is safe to operate, the controller 325 controls the convection heating system 60 (e.g., the valves 338) to thereby heat the air within the chamber 47 of the oven 10 to the preselected temperature set forth in the recipe, as depicted at 612. The controller 325 receives temperature data from the temperature sensor 336 such that the controller 325 continuously monitors the temperature of the air in the chamber 47, as depicted at 614. This feedback loop permits the controller 325 to reach the preselected temperature and maintain the temperature at the preselected temperature. Note that in other examples, the controller 325 continuously conducts safety checks (such as the safety checks noted above) throughout operation of the oven 10 (e.g., the safety checks are part of a continuous safety loop sub-method). As such, the controller 325 can alert the operator to any problems that may occur during operation of the oven 10 after the initial startup of the oven 10.

The controller 325 also controls the convection heating system 60 (e.g., the valves 338) to thereby bring the humidity of the air within the chamber 47 to the preselected humidity set forth in the recipe, as depicted at 616. The controller 325 receives humidity sensor data from the humidity sensor 337 such that the controller 325 continuously monitors the humidity of the air in the chamber 47, as depicted at 618. This feedback loop permits the controller 325 to reach the preselected humidity and maintain the humidity at the preselected humidity. Note that the controller 325 may continuously monitor and control the temperature and the humidity within the oven 10 as described above throughout the entire operation of the oven 10.

Once the temperature is at the preselected temperature and the humidity is at the preselected humidity, the controller 325 sends control signals to the microwave generating device to thereby generate microwave energy and emit the microwave energy into the chamber 47, as depicted at 620. The microwave energy emitted into the chamber 47 is determined by the recipe. In certain examples, the recipe indicates that a certain number (e.g., 8, 4, 2) of microwave generating devices should be activated. In other examples, the recipe includes the microwave energy power level output (e.g., 75% of maximum output) or setting (e.g., low output, medium output) of each microwave generating device.

The controller 325 also sends control signals to the conveyor 20 to thereby control the speed of the belt 21 (e.g., 10.0 feet per minute), as depicted at 622. The speed of the belt 21 is determined by the recipe, and the controller 325 may receive data from the conveyor 20 such that the speed of the belt 21 is continuously monitored by the controller 325. The speed of the belt may correspond to the cook time of the food products in the chamber 47.

The oven 10 continues to operate until the operator inputs data in the user interface device 307 to thereby adjust or stop operation of the oven 10, as depicted at 610. The controller 325 may also adjust or stop operation of the oven 10 after a preselected time period expires (using a timer) or after a preselected time passes (using a clock). The controller 325 can also adjust or stop operation of the oven 10 (and/or alert the operator) if the temperature, humidity, and/or microwave energy sensed by the sensors 336, 337, 340, respectively, is outside predetermined maximum thresholds that are part of the recipe or programmed on the memory as preselected operational data. For example, if the temperature of the air in the oven 10 is below a minimum threshold temperature (e.g., 100.0 degrees Fahrenheit), is above a maximum threshold temperature (e.g., 600.0 degrees Fahrenheit), or is outside a preselected temperature range (e.g., 350.0-375.0 degrees Fahrenheit), the controller 325 alert the operator operation of the oven 10 to thereby prevent damage to the components of the oven 10 and/or the products on the belt 21. Alternatively (or additionally), the controller 325 may alert the operator via the alarms 333.

In another example, if the humidity of the air in the oven 10 is below a minimum threshold humidity (e.g., 30.0% relative humidity, 12.0 grams per cubic member)), is above a maximum threshold humidity (e.g., 40.0% relative humidity, 20.0 grams per cubic member), or is outside a preselected humidity range (e.g., 35.0-55.0% relative humidity), the controller 325 adjusts or stops operation of the oven 10 to thereby prevent damage to the components of the oven 10 and/or the products on the belt 21. Alternatively (or additionally) the controller 325 may alert the operator via the alarms 333. In another example, if the microwave energy in the oven 10 falls below a minimum threshold energy power, is above a maximum threshold energy power, or is outside a preselected energy power range, the controller 325 adjusts or stops operation of the oven 10 to thereby prevent damage to the components of the oven 10 and/or the products on the belt 21. Alternatively (or additionally) the controller 325 may alert the operator via the alarms 333.

In still another example, the controller 325 can receive data from microwave sensors (not depicted) that are configured to sense microwave energy that may leak from the oven 10. If the controller 325 determines (based on data from the sensors) that microwave energy is above a maximum threshold valve (e.g., a maximum milliwatts per square centimeter value that corresponds with safety laws or regulations), the controller 325 alerts the operator via the alarms that the microwave energy is reaching unsafe levels. The controller 325 may further reduce the power output of the microwave generating devices and/or shut down certain microwave generating devices to thereby prevent damage to components of the oven 10 and/or the operator.

Referring back to FIG. 1, the oven 10 includes a belt washing system 140 near the downstream end 12 of the oven 10 that washes the belt 21. The belt washing system 140 can include pumps that pump cleaning fluids (e.g., water, cleaning solution, sanitizing solution) to nozzles (not depicted) that spray the cleaning fluids onto the belt 21. The system 140 can include brushes (not depicted) that scrub the belt 21 and/or a dip trough/tub (not depicted) that contains an amount of the cleaning fluid and through which the belt 21 is conveyed. In other examples, the system 140 includes ultrasonic energy generators (not depicted) that emit ultrasonic energy onto the belt 21 to remove debris on the belt 21.

The oven 10 can further include a clean-in-place (CIP) system 150 (FIG. 1) that is configured to clean the interior surfaces of the oven 10. The CIP system 150 includes a series of pipes and/or nozzles though which cleaning fluids are pumped to thereby clean the interior surfaces of the oven 10. The CIP system 150 can also be configured to spray a rinse solution on the interior surfaces of the oven 10. The CIP system 150 can be configured to clean multiple sections of the oven 10 simultaneously or to clean individual sections of the oven 10 in sequence.

Figure 53:
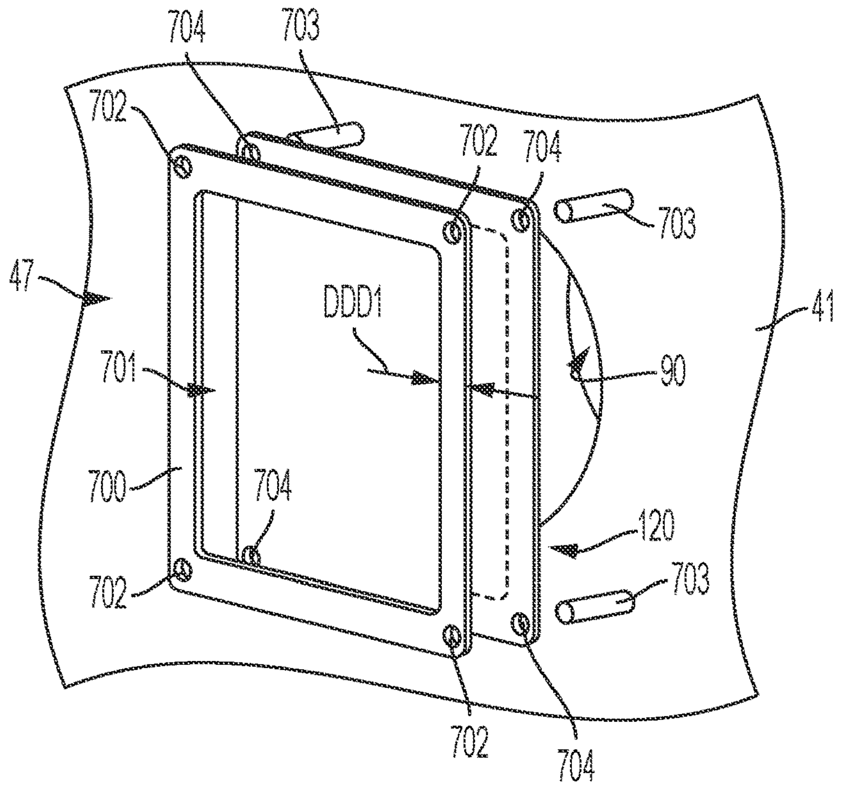
FIG. 53 is an exploded view of another example cap according to the present disclosure.
Figure 54:
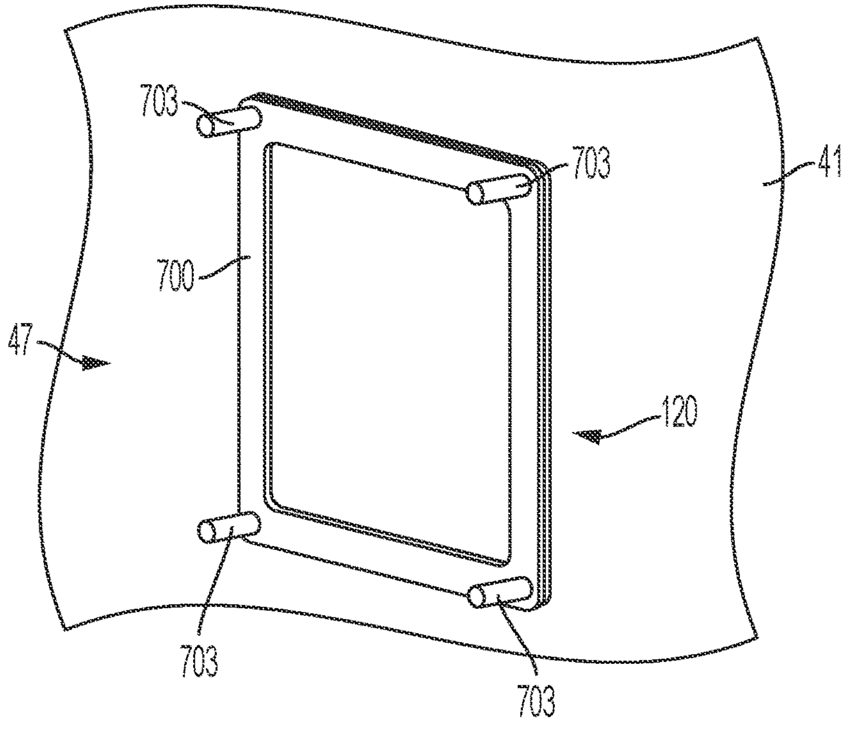
FIG. 54 is a perspective view of the cap depicted in FIG. 53 coupled to the side wall.

Referring to FIGS. 53-54, another example cap 120 is depicted. Note that the components and features of the cap 120 described above with respect to FIGS. 18-24 can be combined with the cap 120 described with respect to FIGS. 53-54, and vice versa. The cap 120 prevents moisture and debris from entering the waveguide assembly 90 (FIG. 11). The cap 120 in this example includes a planar sheet of material that permits microwaves to pass therethrough. In one specific example, the cap 120 is formed of silicone rubber sold by Gaskets, Inc. (part #G76). In other examples, the cap 120 is formed of plastic such as polyetheretherketone (PEEK). The thickness of the cap 120 can vary, and in one example, the cap 120 is ⅛" thick. The shape of the cap 120 can also vary, and in the example depicted in FIGS. 53-54 the cap 120 is rectangular. In other examples, the cap 120 is circular.

The cap 120 is coupled to the sidewall 41 with a mounting frame 700. The mounting frame 700 includes a cutout 701 such that the mounting frame 700 does not obstruct the microwaves passing through the cap 120. The mounting frame 700 can be formed of any suitable material, and in one example, the mounting frame 700 is formed of stainless steel. The shape of the mounting frame 700 can vary, and in the example depicted in FIGS. 53-54 the mounting frame 700 is generally rectangular.

The mounting frame 700 also includes holes 702 through which studs 703 are received. The studs 703 are coupled to the sidewall 41. In one example, the studs 703 are welded to the sidewall 41. In one exemplary installation sequence, a technician aligns holes 704 of the cap 120 with the studs 703 and pushes the cap 120 toward the sidewall 41 and onto the studs 703. The technician then pushes the mounting frame 700 onto the studs 703 (e.g., the studs 703 are received in the holes 702 of the mounting frame 700) to thereby sandwich the cap 120 between the sidewall 41 and the mounting frame 700. As such, the cap 120 is compressed between the sidewall 41 and the mounting frame 700 and a seal is formed between the cap 120 and the sidewall 41. Thus, the cap 120 prevents moisture and debris from entering the waveguide assembly 90. The technician can apply further compression to the cap 120 by using fasteners (not shown; clamps, nuts) to securely fasten the mounting frame 700 and the cap 120 to the sidewall 41. Note that in certain examples, the studs 703 are threaded and receive a nut. Note that the mounting frame 700 overlaps the cap 120 by a distance DDD1, and also note that section of the cap 120 that is overlapped by the mounting frame 700 is compressed between the sidewall 41 and the mounting frame 700.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is coupled to the sidewall and configured to generate microwave energy, and a head waveguide is configured to receive the microwave energy from the microwave generating device and direct the microwave energy in a vertical direction along a waveguide axis. A waveguide assembly is configured to receive the microwave energy from the head waveguide, direct the microwave energy along the waveguide axis, and subsequently direct the microwave energy in a transverse direction that is transverse to the vertical direction through the sidewall and into the chamber such that the microwave energy heats the food products.

In certain examples, the sidewall has a vertical sidewall axis that is parallel and offset from the waveguide axis. In certain examples, an angle between the transverse direction and the vertical direction is ninety degrees. In certain examples, the waveguide assembly includes a rectangular waveguide, a mode converter, and a circular waveguide, each of which has a center axis. Each center axis aligns with the waveguide axis. In certain examples, a rectangular waveguide, a mode converter, and a circular waveguide each extend along the waveguide axis. In certain examples, the waveguide assembly includes a bent waveguide having a centerline that at one end aligns with the transverse direction. In certain examples, the microwave generating device, the head waveguide, and the waveguide assembly are contained within a cabinet that is coupled to and extends away from the sidewall.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is coupled configured to generate microwave energy, and a waveguide assembly is configured to direct the microwave energy through the sidewall and into the chamber such that the microwave energy heats the food products. The waveguide assembly includes a rectangular waveguide; a mode converter downstream from the rectangular waveguide and configured to convert the mode of the microwave energy; a circular waveguide downstream from the mode converter, the circular waveguide having one or more tuning blocks configured to change the polarization of the microwave energy; and a bent waveguide downstream from the circular waveguide and configured to direct the microwave energy toward the sidewall and the chamber, wherein an end of the bent waveguide is coupled to the sidewall.

In certain examples, the mode converter has opposing ends and the distance between the ends is 1.70 inches. The mode converter can also have an opening with a center portion and opposing rounded portions such that the center portion has a width of 1.20 inches and the rounded portion has a radius of 1.00 inches. In certain examples, the bent waveguide has a centerline and the centerline lies along a curved path having a radius of 5.20 inches. In certain examples, the circular waveguide has opposing ends and the distance between the ends is 9.62 inches. In certain examples, the tuning block has a length of 3.90 inches.

In certain examples, a food processing machine for processing a food product includes a processing module having a housing with a sidewall, opposing end walls, and a chamber between the end walls and a conveyor extending through the end walls and the chamber and configured to convey the food product through the chamber. A microwave generating device is configured to generate microwave energy, and a waveguide assembly is configured to direct the microwave energy through the sidewall and into the chamber such that the microwave energy heats the food products. The waveguide assembly includes a bent waveguide that directs the microwave energy toward the sidewall and the chamber and a cap covering an end of the bent waveguide. The cap is configured to prevent moisture and debris in the chamber from entering the waveguide assembly and the cap is further configured to maintain the polarization of the microwave energy passing therethrough.

In certain examples, the waveguide assembly further includes a waveguide extension extending between the bent waveguide and the cap such that the cap covers an end of the waveguide extension. In certain examples, the cap is configured to be a microwave energy matching element between the impedance of a circular waveguide of the waveguide assembly and free-space impedance of the chamber to thereby improve microwave energy transfer into the chamber and reduce reflection of the microwave energy back into the waveguide assembly. In certain examples, the cap has an end plate having a thickness of 0.25 inches. In certain examples, the cap has an inside diameter of 4.162 inches. In certain examples, the cap has a cavity having a depth of 0.970 inches.

In certain examples, a food processing machine for processing a food product includes a processing module having a housing with opposing end walls and a chamber between the end walls and a conveyor extending through the end walls and the chamber and configured to convey the food product through the chamber. A microwave generating device is configured to generate microwave energy and a waveguide assembly is configured to direct the microwave energy through the sidewall and into the chamber such that the microwave energy heats the food products. A suppression tunnel is configured to absorb microwave energy passing through one of the end walls and thereby reduce leakage of microwave energy from the food processing machine. The suppression tunnel includes a passageway that extends in a direction of the conveyance of the conveyor such that the conveyor extends through the passageway and the food products are conveyed through the passageway and a plurality of cross pipes each extending transverse to the direction of the conveyance and are positioned vertically above the conveyor. A pump is configured to convey coolant through the cross pipes such that the coolant absorbs microwave energy passing into the cross pipes.

In certain examples, the plurality of cross pipes extends perpendicular to the direction of conveyance. In certain examples, the pump is part of a refrigeration system configured to circulate the coolant through the cross pipes and cool the coolant after the coolant absorbs and is warmed by the microwave energy passing into the cross pipes. In certain examples, the suppression tunnel further comprises one or more pipes that extend in the direction of the conveyance and fluidly connect to one or more cross pipes of the plurality of cross pipes, and wherein the cross pipes and the end pipes define a serpentine flow path and a parallel pipe flow path. In certain examples, the serpentine flow path is adjacent to the end wall and the parallel flow path is downstream from the serpentine flow path. In certain examples, the flow rate of the coolant in the serpentine flow path is greater than the flow rate of the coolant in the parallel flow path. In certain examples, the suppression tunnel further comprises a panel defining a top of the suppression tunnel. The panel is vertically above and spaced apart from the plurality of cross pipes, and the panel is configured to reflect microwave energy propagating through the passageway back toward the plurality of cross pipes. In certain examples, the distance between the panel and center axes of the cross pipes is 1.130 inches.

In certain examples, a sensor senses the presence of the suppression tunnel adjacent to the end wall of the processing module and a controller is in communication with and the microwave generating device and the sensor. The controller is configured to receive signals from the sensor corresponding to the presence or absence of the suppression tunnel adjacent to the end wall of the processing module, and when the controller determines based on signals from the sensor that the suppression tunnel is not adjacent to the end wall of the processing module, the controller is further configured to stop operation of the microwave generating device to prevent generation of the microwave energy and protect an operator from being exposed to harmful microwave energy.

In certain examples, a controller is in communication with the microwave generating device and the pump and configured to receive signals from the pump that correspond to the operational status of the pump. When the controller determines based on signals from the pump that the pump is not operating, the controller is further configured to stop operation of the microwave generating device to prevent generation of the microwave energy and protect an operator from being exposed to harmful microwave energy.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food processing machine for processing a food product, the food processing machine comprising:

- a processing module having a housing with a first end wall and a second end wall and a chamber between the first and the second end walls;
- a conveyor extending through the first and the second end walls and the chamber and configured to convey the food product through the chamber;
- a microwave generating device configured to generate microwave energy;
- a waveguide assembly configured to direct the microwave energy into the chamber such that the microwave energy heats the food product;
- a suppression tunnel located upstream of the first end wall or downstream of the second end wall and configured to absorb microwave energy passing through one of the end walls to thereby reduce leakage of microwave energy from the food processing machine, the suppression tunnel includes:
  - a passageway that extends in a direction of the conveyance of the conveyor such that the conveyor further extends through the passageway and the food product is conveyed through the passageway;
  - a plurality of cross pipes each extending transverse to the direction of the conveyance and positioned vertically above the conveyor; and
  - an end pipe coupled to at least two of the cross pipes in the plurality of cross pipes; and
- a pump configured to convey coolant through the cross pipes and the end pipe such that the coolant absorbs microwave energy passing into the cross pipes.

2. The food processing machine according to claim 1, wherein the plurality of cross pipes extend perpendicular to the direction of conveyance.

3. The food processing machine according to claim 1, wherein the pump is part of a refrigeration system configured to circulate the coolant through the cross pipes and cool the coolant after the coolant absorbs and is warmed by the microwave energy passing into the cross pipes.

4. A food processing machine for processing a food product, the food processing machine comprising:

a processing module having a housing with opposing end walls and a chamber between the end walls;

a conveyor extending through the end walls and the chamber and configured to convey the food product through the chamber;

a microwave generating device configured to generate microwave energy;

a waveguide assembly configured to direct the microwave energy into the chamber such that the microwave energy heats the food product;

a suppression tunnel configured to absorb microwave energy passing through one of the end walls and thereby reduce leakage of microwave energy from the food processing machine, the suppression tunnel includes:

a passageway that extends in a direction of the conveyance of the conveyor such that the conveyor further extends through the passageway and the food product is conveyed through the passageway; and a plurality of cross pipes each extending transverse to the direction of the conveyance and positioned vertically above the conveyor; and a pump configured to convey coolant through the cross pipes such that the coolant absorbs microwave energy passing into the cross pipes;

wherein the suppression tunnel further comprises one or more end pipes that extend in the direction of the conveyance and fluidly connect to one or more cross pipes of the plurality of cross pipes, and wherein the cross pipes and the end pipes define a serpentine flow path and a parallel flow path.

5. The food processing machine according to claim 4, wherein the serpentine flow path is adjacent to one of the end walls and the parallel flow path is downstream from the serpentine flow path.

6. The food processing machine according to claim 4, wherein flow rate of the coolant in the serpentine flow path is greater than flow rate of the coolant in the parallel flow path.

7. The food processing machine according to claim 4, wherein the suppression tunnel further comprises a panel defining a top of the suppression tunnel, the panel is vertically above and spaced apart from the plurality of cross pipes, and wherein the panel is configured to reflect microwave energy propagating through the passageway toward the plurality of cross pipes.

8. The food processing machine according to claim 7, wherein distance between the panel and center axes of the cross pipes is 1.130 inches.

9. A food processing machine for processing a food product, the food processing machine comprising:

a processing module having a housing with opposing end walls and a chamber between the end walls;

a conveyor extending through the end walls and the chamber and configured to convey the food product through the chamber;

a microwave generating device configured to generate microwave energy;

a waveguide assembly configured to direct the microwave energy into the chamber such that the microwave energy heats the food product;

a suppression tunnel configured to absorb microwave energy passing through one of the end walls and thereby reduce leakage of microwave energy from the food processing machine, the suppression tunnel includes:

a passageway that extends in a direction of the conveyance of the conveyor such that the conveyor further extends through the passageway and the food product is conveyed through the passageway; and a plurality of cross pipes each extending transverse to the direction of the conveyance and positioned vertically above the conveyor;

a pump configured to convey coolant through the cross pipes such that the coolant absorbs microwave energy passing into the cross pipes;

a sensor that senses presence of the suppression tunnel adjacent to one of the end walls of the processing module; and a controller in communication with the microwave generating device and the sensor and configured to receive signals from the sensor corresponding to presence or absence of the suppression tunnel adjacent to the end wall of the processing module;

wherein when the controller determines based on signals from the sensor that the suppression tunnel is not adjacent to the end wall of the processing module, the controller is further configured to alert an operator or stop operation of the microwave generating device to prevent generation of the microwave energy and protect the operator from being exposed to harmful microwave energy.

10. A food processing machine for processing a food product, the food processing machine comprising:

a processing module having a housing with opposing end walls and a chamber between the end walls;

a conveyor extending through the end walls and the chamber and configured to convey the food product through the chamber;

a microwave generating device configured to generate microwave energy;

a waveguide assembly configured to direct the microwave energy into the chamber such that the microwave energy heats the food product;

a suppression tunnel configured to absorb microwave energy passing through one of the end walls and thereby reduce leakage of microwave energy from the food processing machine, the suppression tunnel includes:

a passageway that extends in a direction of the conveyance of the conveyor such that the conveyor further extends through the passageway and the food product is conveyed through the passageway; and a plurality of cross pipes each extending transverse to the direction of the conveyance and positioned vertically above the conveyor;

a pump configured to convey coolant through the cross pipes such that the coolant absorbs microwave energy passing into the cross pipes; and a controller in communication with the microwave generating device and the pump and configured to receive signals from the pump that correspond to operational status of the pump; and wherein when the controller determines based on signals from the pump that the pump is not operating, the controller is further configured to alert an operator or stop operation of the microwave generating device to prevent generation of the microwave energy and protect an operator from being exposed to harmful microwave energy.

11. A food processing machine for processing a food product, the food processing machine comprising:

a processing module having a housing with a first end wall and a second end wall and a chamber between the first and the second end walls;

a conveyor extending through the first and the second end walls and the chamber and configured to convey the food product through the chamber;

a microwave heating system configured to emit microwave energy into the chamber such that the microwave energy heats the food product;

a suppression tunnel located upstream of the first end wall or downstream of the second end wall and configured to absorb microwave energy passing through one of the first end wall and the second end wall to thereby reduce leakage of microwave energy from the food processing machine, the suppression tunnel includes a plurality of cross pipes and an end pipe that fluidly connects at least two cross pipes of the plurality of cross pipes; and a pump configured to pump coolant through the plurality of cross pipes such that the coolant absorbs microwave energy.

12. The food processing machine according to claim 11, wherein the conveyor extends in a direction of conveyance, and wherein the plurality of cross pipes extend transverse to the direction of conveyance.

13. The food processing machine according to claim 11, wherein the pump is part of a refrigeration system configured to circulate the coolant through the plurality of cross pipes and the end pipe and cool the coolant.

14. The food processing machine according to claim 11, wherein the plurality of cross pipes and the end pipe define a serpentine flow path.

15. A food processing machine for processing a food product, the food processing machine comprising:

a processing module having a housing with opposing end walls and a chamber between the end walls;

a conveyor extending through the end walls and the chamber and configured to convey the food product through the chamber;

a microwave heating system configured to emit microwave energy into the chamber such that the microwave energy heats the food product;

a suppression tunnel configured to absorb microwave energy passing through one of the end walls and thereby reduce leakage of microwave energy from the food processing machine, the suppression tunnel includes a pipe assembly; and a pump configured to pump coolant through the pipe assembly such that the coolant absorbs microwave energy;

wherein the pipe assembly defines a serpentine flow path and a parallel flow path located downstream from the serpentine flow path.

16. The food processing machine according to claim 15, wherein flow rate of the coolant in the serpentine flow path is greater than flow rate of the coolant in the parallel flow path.

17. A food processing machine for processing a food product, the food processing machine comprising:

a processing module having a housing with opposing end walls and a chamber between the end walls;

a conveyor extending through the end walls and the chamber and configured to convey the food product through the chamber;

a microwave heating system configured to emit microwave energy into the chamber such that the microwave energy heats the food product;

a suppression tunnel configured to absorb microwave energy passing through one of the end walls and thereby reduce leakage of microwave energy from the food processing machine, the suppression tunnel includes:

a passageway through which the conveyor extends; and a plurality of cross pipes and an end pipe that define a serpentine flow path above the conveyor and the food product thereon; and a pump configured to pump coolant through the cross pipes and the end pipe such that the coolant absorbs microwave energy.

18. A food processing machine for processing a food product, the food processing machine comprising:

a processing module having a housing with opposing end walls and a chamber between the end walls;

a conveyor extending through the end walls and the chamber and configured to convey the food product through the chamber;

a microwave heating system configured to emit microwave energy into the chamber such that the microwave energy heats the food product;

a suppression tunnel configured to absorb microwave energy passing through one of the end walls and thereby reduce leakage of microwave energy from the food processing machine, the suppression tunnel includes:

a passageway through which the conveyor extends; and a plurality of cross pipes and an end pipe that fluidly connects at least two cross pipes of the plurality of cross pipes with the plurality of cross pipes and the end pipe located vertically above the conveyor; and a pump configured to pump coolant through the cross pipes and the end pipe such that the coolant absorbs microwave energy.

* * * * *